United States Patent
Li et al.

(10) Patent No.: US 12,302,124 B2
(45) Date of Patent: *May 13, 2025

(54) BEAM DIRECTION SELECTION FOR HIGH PATHLOSS MODE OPERATIONS

(71) Applicant: QUALCOMM Incorporated, San Diego, CA (US)

(72) Inventors: Junyi Li, Fairless Hills, PA (US); Juergen Cezanne, Ocean Township, NJ (US); Vasanthan Raghavan, West Windsor Township, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/056,621

(22) Filed: Nov. 17, 2022

(65) Prior Publication Data

US 2023/0085790 A1    Mar. 23, 2023

Related U.S. Application Data

(63) Continuation of application No. 16/806,825, filed on Mar. 2, 2020, now Pat. No. 11,510,071.

(Continued)

(51) Int. Cl.
*H04W 16/28*    (2009.01)

(52) U.S. Cl.
CPC .................. *H04W 16/28* (2013.01)

(58) Field of Classification Search
None
See application file for complete search history.

(56) References Cited

U.S. PATENT DOCUMENTS 6,137,826 A    10/2000  Boesch
7,016,649 B1    3/2006  Narasimhan et al.
(Continued)

FOREIGN PATENT DOCUMENTS

CN    101341676 A    1/2009
CN    101569112 A    10/2009
(Continued)

OTHER PUBLICATIONS

3GPP TS 38.213: "3rd Generation Partnership Project; Technical Specification Group Radio Access Network; NR; Physical Layer Procedures for Control (Release 15)", 3GPP Draft, 38213-F50, 3rd Generation Partnership Project (3GPP), Mobile Competence Centre, 650, Route Des Lucioles, F-06921 Sophia-Antipolis Cedex, France, vol. RAN WG1, No. V15.5.0 (Mar. 2019), Mar. 27, 2019 (Mar. 27, 2019), 104 Pages, XP051722950, XP051686992, p. 12-p. 74, section 7.3.1.

(Continued)

*Primary Examiner* — Alpus Hsu
*Assistant Examiner* — Camquyen Q. Thai
(74) *Attorney, Agent, or Firm* — Holland & Hart/QUALCOMM Incorporated

(57)    ABSTRACT

Methods, systems, and devices for wireless communications are described. The described techniques enable a first wireless device (e.g., an integrated access and backhaul (IAB) node in an TAB system) or a network entity (e.g., a centralized unit (CU) in the TAB system) to select a set of wireless devices for communication. The first wireless device, the CU, or both may select the set of wireless devices for communication based on a pathloss mode of the first wireless device, whether an angular separation between a group of nodes (e.g., one or more of the set of wireless devices) is less than an angular separation threshold, or both. The first wireless device may communicate with the set of (Continued)

wireless devices with one or more communications beams. For example, the device may communicate with multiple wireless devices using a single communication beam if the angular separation between the multiple devices is relatively low.

60 Claims, 19 Drawing Sheets

Related U.S. Application Data

(60) Provisional application No. 62/835,414, filed on Apr. 17, 2019.

(56) References Cited

U.S. PATENT DOCUMENTS

| | | | |
|---|---|---|---|
| 8,327,002 | B1 | 12/2012 | Van Dussen et al. |
| 9,319,886 | B2 | 4/2016 | Jo et al. |
| 9,590,707 | B1 | 3/2017 | Baik et al. |
| 9,877,322 | B1 | 1/2018 | Sung et al. |
| 10,015,691 | B2 | 7/2018 | Damnjanovic et al. |
| 10,219,182 | B1 | 2/2019 | Hahn et al. |
| 10,334,588 | B2 | 6/2019 | Sadek |
| 10,736,054 | B2 | 8/2020 | Jiang et al. |
| 11,438,808 | B2 | 9/2022 | Li et al. |
| 11,445,408 | B2 | 9/2022 | Li et al. |
| 11,463,964 | B2 | 10/2022 | Li et al. |
| 11,477,747 | B2 | 10/2022 | Li et al. |
| 11,496,970 | B2 | 11/2022 | Li et al. |
| 11,510,071 | B2 | 11/2022 | Li et al. |
| 11,937,193 | B2 | 3/2024 | Rico Alvarino et al. |
| 2004/0192323 | A1 | 9/2004 | Valenzuela |
| 2005/0106910 | A1 | 5/2005 | Chiu |
| 2006/0285504 | A1 | 12/2006 | Dong et al. |
| 2008/0025254 | A1 | 1/2008 | Love et al. |
| 2008/0159203 | A1 | 7/2008 | Choi et al. |
| 2008/0189970 | A1 | 8/2008 | Wang et al. |
| 2008/0268786 | A1 | 10/2008 | Baker et al. |
| 2009/0028065 | A1 | 1/2009 | Iwai et al. |
| 2009/0046653 | A1* | 2/2009 | Singh ............... H04W 16/28 370/330 |
| 2009/0210474 | A1 | 8/2009 | Shao et al. |
| 2010/0040036 | A1 | 2/2010 | Ofuji et al. |
| 2010/0041413 | A1 | 2/2010 | Sumasu et al. |
| 2010/0091725 | A1 | 4/2010 | Ishii |
| 2010/0113041 | A1 | 5/2010 | Bienas et al. |
| 2010/0120360 | A1 | 5/2010 | Haustein et al. |
| 2010/0232352 | A1 | 9/2010 | Merlin et al. |
| 2010/0309803 | A1 | 12/2010 | Toh et al. |
| 2010/0329195 | A1 | 12/2010 | Abraham et al. |
| 2010/0331030 | A1 | 12/2010 | Nory et al. |
| 2011/0002227 | A1 | 1/2011 | Sampath et al. |
| 2011/0085502 | A1 | 4/2011 | Malladi |
| 2011/0125488 | A1 | 5/2011 | Birmingham |
| 2011/0143800 | A1 | 6/2011 | Han et al. |
| 2011/0188598 | A1 | 8/2011 | Lee et al. |
| 2011/0249578 | A1 | 10/2011 | Nayeb Nazar et al. |
| 2011/0261742 | A1 | 10/2011 | Wentink |
| 2012/0157108 | A1 | 6/2012 | Boudreau et al. |
| 2013/0003788 | A1 | 1/2013 | Marinier et al. |
| 2013/0028228 | A1 | 1/2013 | Nakayama et al. |
| 2013/0034066 | A1 | 2/2013 | Kakishima et al. |
| 2013/0089048 | A1 | 4/2013 | Damnjanovic et al. |
| 2013/0265916 | A1* | 10/2013 | Zhu ............... H04B 7/024 370/280 |
| 2013/0288695 | A1 | 10/2013 | Okino |
| 2013/0301454 | A1 | 11/2013 | Seol et al. |
| 2014/0071954 | A1 | 3/2014 | Au et al. |
| 2014/0092865 | A1 | 4/2014 | Heo et al. |
| 2014/0098761 | A1 | 4/2014 | Lee et al. |
| 2014/0105046 | A1 | 4/2014 | Tellado et al. |
| 2014/0105136 | A1 | 4/2014 | Tellado et al. |
| 2014/0153390 | A1 | 6/2014 | Ishii et al. |
| 2014/0206382 | A1* | 7/2014 | Shabtay ............... G01S 5/0284 455/456.1 |
| 2014/0226551 | A1 | 8/2014 | Ouchi et al. |
| 2014/0254537 | A1 | 9/2014 | Kim et al. |
| 2014/0274141 | A1 | 9/2014 | Gholmieh et al. |
| 2014/0314000 | A1 | 10/2014 | Liu et al. |
| 2014/0362716 | A1 | 12/2014 | Zhang et al. |
| 2015/0011236 | A1 | 1/2015 | Kazmi et al. |
| 2015/0358960 | A1 | 12/2015 | Zhang et al. |
| 2015/0365939 | A1 | 12/2015 | Zhang et al. |
| 2015/0373689 | A1 | 12/2015 | Tabet et al. |
| 2016/0066301 | A1 | 3/2016 | Zhu et al. |
| 2016/0088648 | A1 | 3/2016 | Xue et al. |
| 2016/0270116 | A1 | 9/2016 | Lin et al. |
| 2016/0286450 | A1 | 9/2016 | Badic et al. |
| 2016/0295595 | A1 | 10/2016 | Chae et al. |
| 2016/0308280 | A1 | 10/2016 | Shimizu |
| 2016/0315686 | A1 | 10/2016 | Song et al. |
| 2017/0034837 | A1 | 2/2017 | Lopez-Perez et al. |
| 2017/0048772 | A1 | 2/2017 | Gheorghiu et al. |
| 2017/0064743 | A1 | 3/2017 | Lei et al. |
| 2017/0070961 | A1 | 3/2017 | Bharadwaj et al. |
| 2017/0086080 | A1 | 3/2017 | Sun et al. |
| 2017/0086137 | A1 | 3/2017 | Sun et al. |
| 2017/0093038 | A1 | 3/2017 | Li et al. |
| 2017/0215201 | A1 | 7/2017 | Kim et al. |
| 2017/0265169 | A1 | 7/2017 | Chen et al. |
| 2017/0238261 | A1 | 8/2017 | Benjebbour et al. |
| 2017/0290008 | A1 | 10/2017 | Tooher et al. |
| 2017/0310426 | A1 | 10/2017 | Fan et al. |
| 2017/0325164 | A1 | 11/2017 | Lee et al. |
| 2018/0007724 | A1 | 1/2018 | Kazmi et al. |
| 2018/0020452 | A1 | 1/2018 | Yerramalli et al. |
| 2018/0027437 | A1 | 1/2018 | Vitthaladevuni et al. |
| 2018/0042031 | A1 | 2/2018 | Hampel et al. |
| 2018/0049137 | A1 | 2/2018 | Li et al. |
| 2018/0054339 | A1 | 2/2018 | Sun et al. |
| 2018/0062770 | A1 | 3/2018 | Reial et al. |
| 2018/0092073 | A1 | 3/2018 | Nogami et al. |
| 2018/0098323 | A1 | 4/2018 | Zhang et al. |
| 2018/0124790 | A1 | 5/2018 | Yerramalli |
| 2018/0132197 | A1 | 5/2018 | Lin et al. |
| 2018/0145798 | A1 | 5/2018 | Suzuki et al. |
| 2018/0145819 | A1 | 5/2018 | Axmon et al. |
| 2018/0160401 | A1 | 6/2018 | Goto et al. |
| 2018/0176948 | A1 | 6/2018 | Islam et al. |
| 2018/0198181 | A1 | 7/2018 | Fukawawa |
| 2018/0199341 | A1 | 7/2018 | Baldemair et al. |
| 2018/0219590 | A1 | 8/2018 | Matsuda et al. |
| 2018/0220399 | A1 | 8/2018 | Davydov et al. |
| 2018/0220465 | A1 | 8/2018 | Zhang et al. |
| 2018/0234337 | A1 | 8/2018 | Goliya et al. |
| 2018/0242264 | A1 | 8/2018 | Pelletier et al. |
| 2018/0249492 | A1 | 8/2018 | Xu et al. |
| 2018/0262288 | A1 | 9/2018 | Gao et al. |
| 2018/0309553 | A1 | 10/2018 | Cao et al. |
| 2018/0324716 | A1 | 11/2018 | Jeon et al. |
| 2018/0324853 | A1 | 11/2018 | Jeon et al. |
| 2018/0367263 | A1 | 12/2018 | Ying et al. |
| 2018/0375619 | A1 | 12/2018 | Hwang et al. |
| 2018/0376464 | A1 | 12/2018 | Hosseini et al. |
| 2019/0007181 | A1 | 1/2019 | Marinier et al. |
| 2019/0044639 | A1 | 2/2019 | Ouchi et al. |
| 2019/0044647 | A1 | 2/2019 | Tomeba et al. |
| 2019/0053072 | A1 | 2/2019 | Kundargi et al. |
| 2019/0053205 | A1 | 2/2019 | Tomeba et al. |
| 2019/0075597 | A1 | 3/2019 | Yerramalli et al. |
| 2019/0082457 | A1 | 3/2019 | Zhou et al. |
| 2019/0089498 | A1 | 3/2019 | Pelletier et al. |
| 2019/0116605 | A1 | 4/2019 | Luo et al. |
| 2019/0182870 | A1 | 6/2019 | Shih et al. |
| 2019/0208538 | A1 | 7/2019 | Lee et al. |
| 2019/0215766 | A1 | 7/2019 | Wu et al. |
| 2019/0215896 | A1 | 7/2019 | Zhou et al. |
| 2019/0253136 | A1 | 8/2019 | Makki et al. |
| 2019/0260495 | A1 | 8/2019 | Nammi |
| 2019/0261399 | A1 | 8/2019 | Munier et al. |
| 2019/0288765 | A1 | 9/2019 | Lee et al. |
| 2019/0313406 | A1 | 10/2019 | Liu et al. |

(56) References Cited

U.S. PATENT DOCUMENTS

| | | |
|---|---|---|
| 2019/0327123 A1 | 10/2019 | Wang et al. |
| 2019/0349079 A1 | 11/2019 | Novlan et al. |
| 2020/0015209 A1 | 1/2020 | Zhang |
| 2020/0068497 A1 | 2/2020 | Gong et al. |
| 2020/0107335 A1 | 4/2020 | Xue et al. |
| 2020/0107355 A1 | 5/2020 | Zhou |
| 2020/0145860 A1 | 5/2020 | Koskela et al. |
| 2020/0146059 A1 | 5/2020 | Cirik et al. |
| 2020/0205083 A1 | 6/2020 | Chen et al. |
| 2020/0296673 A1 | 9/2020 | Ouchi et al. |
| 2020/0328850 A1 | 10/2020 | Feng |
| 2020/0337028 A1 | 10/2020 | Li et al. |
| 2021/0022091 A1 | 1/2021 | Li et al. |
| 2021/0037441 A1 | 2/2021 | Khalid et al. |
| 2021/0045076 A1 | 2/2021 | Tomeba et al. |
| 2021/0084693 A1 | 3/2021 | Zhang et al. |
| 2021/0136639 A1 | 5/2021 | Osawa |
| 2021/0143959 A1 | 5/2021 | Xu et al. |
| 2021/0168782 A1 | 6/2021 | Hamidi-Sepehr et al. |
| 2021/0195674 A1 | 6/2021 | Park et al. |
| 2021/0204307 A1 | 7/2021 | Lee et al. |
| 2021/0235386 A1 | 7/2021 | Zhang et al. |
| 2021/0314892 A1 | 10/2021 | Rico Alvarino et al. |
| 2021/0410084 A1 | 12/2021 | Li et al. |
| 2022/0174694 A1 | 6/2022 | Hwang et al. |
| 2022/0394561 A1 | 12/2022 | Li et al. |
| 2023/0027300 A1 | 1/2023 | Li et al. |
| 2023/0052171 A1 | 2/2023 | Li et al. |
| 2023/0069736 A1 | 3/2023 | Li et al. |
| 2023/0147731 A1 | 5/2023 | Li et al. |
| 2023/0247577 A1 | 8/2023 | Rico Alvarino et al. |
| 2024/0015757 A1 | 1/2024 | Li et al. |

FOREIGN PATENT DOCUMENTS

| | | |
|---|---|---|
| CN | 102792625 A | 11/2012 |
| CN | 103220702 A | 7/2013 |
| CN | 105052068 A | 11/2015 |
| CN | 105103467 A | 11/2015 |
| CN | 106688193 A | 5/2017 |
| CN | 107113902 A | 8/2017 |
| CN | 108028743 A | 5/2018 |
| CN | 108781103 A | 11/2018 |
| EP | 1515471 A1 | 3/2005 |
| EP | 1641188 A1 | 3/2006 |
| EP | 2120364 A1 | 11/2009 |
| EP | 2504942 A1 | 10/2012 |
| EP | 3179660 A1 | 6/2017 |
| KR | 20180136855 A | 12/2018 |
| WO | WO-2015089253 A2 | 6/2015 |
| WO | WO2016040290 A1 | 3/2016 |
| WO | WO-2016061382 | 4/2016 |
| WO | WO-2017040002 A1 | 3/2017 |
| WO | WO-2019032799 A1 | 2/2019 |
| WO | WO2019070579 A1 | 4/2019 |
| WO | WO-2019102065 A1 | 5/2019 |

OTHER PUBLICATIONS

AT&T: "Enhancements to Support NR Backhaul Links," 3GPP Draft, 3GPP TSG RAN WG1 Meeting #94bis, R1-1810690, 3rd Generation Partnership Project (3GPP), Mobile Competence Centre, 650, Route Des Lucioles, F-06921, Sophia-Antipolis Cedex, France, vol. RAN WG1, No. Chengdu, China, Oct. 8, 2018-Oct. 12, 2018, Sep. 29, 2018 (Sep. 29, 2018), XP051518094, 15 pages, Chapter 2.3 "Frame Structure Design andBackhaul Multiplexing".

Huawei, et al., "Physical Layer Enhancement on IAB", 3GPP TSG-RAN WG1 Meeting #92bis, 3GPP Draft; R1-1803695, 3rd Generation Partnership Project (3GPP), Mobile Competence Centre; 650, Route Des Lucioles; F-06921 Sophia-Antipolis Cedex; France, vol. RAN WG1, No. Sanya, China; Apr. 16, 2018-Apr. 20, 2018, Apr. 15, 2018 (Apr. 15, 2018), 6 Pages, XP051425992, Sections 2.1 and 2.2.

International Search Report and Written Opinion—PCT/US2020/020818—ISA/EPO—dated Jun. 8, 2020.

LG Electronics: "Discussions on Mechanisms to Support NR IAB Scenarios", 3GPP Draft, 3GPP TSG RAN WG1 Meeting #94bis, R1-1810273, Discussions on NR IAB Support_V0, 3rd Generation Partnership Project, Mobile Competence Centre, 650, Route Des Lucioles, F-06921, Sophia-Antipolis Cedex, France, vol. RAN WG1, No. Chengdu, China, Oct. 8, 2018-Oct. 12, 2018, Sep. 29, 2018, XP051517687, 7 pages, Chapter 6 "Access and Backhaul Timing" Chapter 7 "TDM Patterns", Paragraph [0007].

Qualcomm Incorporated: "Inter-IAB-Node Discovery", 3GPP Draft, 3GPP TSG RAN WG1 Meeting #93, R1-1807395, 3rd Generation Partnership Project (3GPP), Mobile Competence Centre, 650, Route Des Lucioles, F-06921 Sophia-Antipolis Cedex, France, vol. RAN WG1, No. Busan, Korea, May 21, 2018-May 25, 2018, May 12, 2018 (May 12, 2018), XP051463086, 8 Pages, paragraph [0003].

Qualcomm Incorporated: "Resource Allocation for PUCCH", 3GPP TSG RAN WG1 Meeting #90b, R1-1718806, 3rd Generation Partnership Project, Mobile Competence Centre, 650, Route Des Lucioles, F-06921 Sophia-Antipolis Cedex, France, vol. RAN WG1, No. Prague, CZ, Oct. 9, 2017-Oct. 13, 2017, Oct. 8, 2017, XP051341951, 10 Pages.

Spreadtrum Communications: "On RS Multiplexing", 3GPP TSG RAN WG1 Meeting #90, R1-1713051_On RS Multiplexing_Final, 3rd Generation Partnership Project, Mobile Competence Centre, 650, Route Des Lucioles, F-06921 Sophia-Antipolis Cedex, France, vol. RAN WG1, No. Prague, Czech Rep, Aug. 21, 2017-Aug. 25, 2017, Aug. 20, 2017, XP051315860, 8 Pages, Sections 4-5.

European Search Report—EP24187534—Search Authority—The Hague—Nov. 28, 2024).

* cited by examiner

BEAM DIRECTION SELECTION FOR HIGH PATHLOSS MODE OPERATIONS

CROSS REFERENCE

The present Application for Patent is a Continuation of U.S. patent application Ser. No. 16/806,825 by LI et al. entitled "BEAM DIRECTION SELECTION FOR HIGH PATHLOSS MODE OPERATIONS," filed Mar. 2, 2020, which claims the benefit of U.S. Provisional Patent Application No. 62/835,414 by LI et al., entitled "BEAM DIRECTION SELECTION FOR HIGH PATHLOSS MODE OPERATIONS," filed Apr. 17, 2019, and, each of which is assigned to the assignee hereof, and each of which is expressly incorporated by reference herein.

INTRODUCTION

The following relates generally to wireless communications, and more specifically to beam direction selection.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

SUMMARY

A method for wireless communications at a first wireless device is described. The method may include selecting a set of wireless devices as communication candidates based on a first mode for the first wireless device, where the set of wireless devices includes at least two wireless devices with an angular separation with reference to the first wireless device that is less than an angular separation threshold associated with the first mode, reporting, to a network entity, a candidate list including the set of wireless devices, receiving, from the network entity, a subset of the set of wireless devices based on the candidate list, and communicating with the subset of the set of wireless devices using one or more communication beams, where the communicating includes communicating with the at least two wireless devices using a single communication beam of the one or more communication beams based on the angular separation being less than the angular separation threshold.

An apparatus for wireless communications at a first wireless device is described. The apparatus may include a processor, memory coupled to the processor, the processor and memory configured to select a set of wireless devices as communication candidates based on a first mode for the first wireless device, where the set of wireless devices includes at least two wireless devices with an angular separation with reference to the first wireless device that is less than an angular separation threshold associated with the first mode, report, to a network entity, a candidate list including the set of wireless devices, receive, from the network entity, a subset of the set of wireless devices based on the candidate list, and communicate with the subset of the set of wireless devices using one or more communication beams, where the communicating includes communicating with the at least two wireless devices using a single communication beam of the one or more communication beams based on the angular separation being less than the angular separation threshold.

Another apparatus for wireless communications at a first wireless device is described. The apparatus may include means for selecting a set of wireless devices as communication candidates based on a first mode for the first wireless device, where the set of wireless devices includes at least two wireless devices with an angular separation with reference to the first wireless device that is less than an angular separation threshold associated with the first mode, reporting, to a network entity, a candidate list including the set of wireless devices, receiving, from the network entity, a subset of the set of wireless devices based on the candidate list, and communicating with the subset of the set of wireless devices using one or more communication beams, where the communicating includes communicating with the at least two wireless devices using a single communication beam of the one or more communication beams based on the angular separation being less than the angular separation threshold.

A non-transitory computer-readable medium storing code for wireless communications at a first wireless device is described. The code may include instructions executable by a processor to select a set of wireless devices as communication candidates based on a first mode for the first wireless device, where the set of wireless devices includes at least two wireless devices with an angular separation with reference to the first wireless device that is less than an angular separation threshold associated with the first mode, report, to a network entity, a candidate list including the set of wireless devices, receive, from the network entity, a subset of the set of wireless devices based on the candidate list, and communicate with the subset of the set of wireless devices using one or more communication beams, where the communicating includes communicating with the at least two wireless devices using a single communication beam of the one or more communication beams based on the angular separation being less than the angular separation threshold.

Some examples of the method, apparatuses, and non-transitory computer-readable medium described herein may further include operations, features, means, or instructions for receiving, from the network entity, an indication of the angular separation threshold associated with the first mode.

Some examples of the method, apparatuses, and non-transitory computer-readable medium described herein may further include operations, features, means, or instructions for discovering a set of wireless devices, measuring an angle of arrival (AoA) or angle of departure (AoD) or both for communications with each wireless device of the set of wireless devices, and determining angular separations for one or more pairs of wireless devices of the set of wireless devices based on the measured AoA or AoD or both, where the selecting may be based on the determined angular separations and the set of wireless devices may be a subset of the set of wireless devices.

In some examples of the method, apparatuses, and non-transitory computer-readable medium described herein, the selecting may further include operations, features, means, or instructions for selecting the set of wireless devices as communication candidates based on received power measurements for the set of wireless devices.

In some examples of the method, apparatuses, and non-transitory computer-readable medium described herein, the reporting the candidate list further may include operations, features, means, or instructions for reporting, to the network entity, a set of spatial separation metrics indicating with which wireless devices of the set of wireless devices the first wireless device supports communication using a same communication beam.

In some examples of the method, apparatuses, and non-transitory computer-readable medium described herein, the reporting the candidate list further may include operations, features, means, or instructions for reporting, to the network entity, one or more groups of wireless devices of the set of wireless devices, where each group of the one or more groups of wireless devices includes a set of wireless devices with which the first wireless device supports communication using a same communication beam.

In some examples of the method, apparatuses, and non-transitory computer-readable medium described herein, the communicating with the at least two wireless devices using the single communication beam may include operations, features, means, or instructions for frequency division multiplexing communications with the at least two wireless devices.

Some examples of the method, apparatuses, and non-transitory computer-readable medium described herein may further include operations, features, means, or instructions for activating the first mode for the first wireless device based on a pathloss measurement, where the first mode includes a high pathloss mode.

Some examples of the method, apparatuses, and non-transitory computer-readable medium described herein may further include operations, features, means, or instructions for deactivating the first mode for the first wireless device based on a pathloss measurement, selecting an updated set of wireless devices as communication candidates based on the deactivated first mode, where each wireless device of the updated set of wireless devices may have an angular separation with each other wireless device of the updated set of wireless devices with reference to the first wireless device that may be greater than an angular separation threshold associated with the deactivated first mode, and reporting, to the network entity, an updated candidate list including the updated set of wireless devices.

In some examples of the method, apparatuses, and non-transitory computer-readable medium described herein, the angular separation threshold associated with the activated first mode may be equal to the angular separation threshold associated with the deactivated first mode.

In some examples of the method, apparatuses, and non-transitory computer-readable medium described herein, each communication beam of the one or more communication beams corresponds to a different radio frequency (RF) chain of the first wireless device.

Some examples of the method, apparatuses, and non-transitory computer-readable medium described herein may further include operations, features, means, or instructions for determining a number of communication beams for the communicating with the subset of the set of wireless devices based on a number of RF chains at the first wireless device.

In some examples of the method, apparatuses, and non-transitory computer-readable medium described herein, the selecting further may include operations, features, means, or instructions for selecting the set of wireless devices as communication candidates based on a maximum number of communication candidates to report.

Some examples of the method, apparatuses, and non-transitory computer-readable medium described herein may further include operations, features, means, or instructions for receiving, from the network entity, an indication of the maximum number of communication candidates to report.

Some examples of the method, apparatuses, and non-transitory computer-readable medium described herein may further include operations, features, means, or instructions for determining the angular separation threshold associated with the first mode based on a beam characteristic of the one or more communication beams.

In some examples of the method, apparatuses, and non-transitory computer-readable medium described herein, the first wireless device, the set of wireless devices, or both include distributed units (DUs), mobile terminals or both in an integrated access and backhaul (TAB) system, and the network entity includes a centralized unit (CU) in the TAB system.

A method for wireless communications at a network entity is described. The method may include receiving, from a first wireless device, a candidate list including a set of wireless devices, selecting a subset of the set of wireless devices for communication with the first wireless device based on a first mode for the first wireless device, where the subset of the set of wireless devices includes at least two wireless devices with an angular separation with reference to the first wireless device that is less than an angular separation threshold associated with the first mode, and transmitting, to the first wireless device, the subset of the set of wireless devices.

An apparatus for wireless communications at a network entity is described. The apparatus may include a processor, memory in electronic communication with the processor, and instructions stored in the memory. The instructions may be executable by the processor to cause the apparatus to receive, from a first wireless device, a candidate list including a set of wireless devices, select a subset of the set of wireless devices for communication with the first wireless device based on a first mode for the first wireless device, where the subset of the set of wireless devices includes at least two wireless devices with an angular separation with reference to the first wireless device that is less than an angular separation threshold associated with the first mode, and transmit, to the first wireless device, the subset of the set of wireless devices.

Another apparatus for wireless communications at a network entity is described. The apparatus may include means for receiving, from a first wireless device, a candidate list including a set of wireless devices, selecting a subset of the set of wireless devices for communication with the first wireless device based on a first mode for the first wireless device, where the subset of the set of wireless devices includes at least two wireless devices with an angular separation with reference to the first wireless device that is less than an angular separation threshold associated with the first mode, and transmitting, to the first wireless device, the subset of the set of wireless devices.

A non-transitory computer-readable medium storing code for wireless communications at a network entity is described. The code may include instructions executable by a processor to receive, from a first wireless device, a candidate list including a set of wireless devices, select a subset of the set of wireless devices for communication with the first wireless device based on a first mode for the first wireless device, where the subset of the set of wireless devices includes at least two wireless devices with an angular separation with reference to the first wireless device that is less than an angular separation threshold associated with the first mode, and transmit, to the first wireless device, the subset of the set of wireless devices.

Some examples of the method, apparatuses, and non-transitory computer-readable medium described herein may further include operations, features, means, or instructions for transmitting, to the first wireless device, an indication of the angular separation threshold associated with the first mode, wherein the first mode comprises an activated high pathloss mode.

In some examples of the method, apparatuses, and non-transitory computer-readable medium described herein, the receiving the candidate list further may include operations, features, means, or instructions for receiving, from the first wireless device, a set of spatial separation metrics indicating with which wireless devices of the set of wireless devices the first wireless device supports communication using a same communication beam, where the selecting may be further based on the set of spatial separation metrics.

In some examples of the method, apparatuses, and non-transitory computer-readable medium described herein, the receiving the candidate list further may include operations, features, means, or instructions for receiving, from the first wireless device, one or more groups of wireless devices of the set of wireless devices, where each group of the one or more groups of wireless devices includes a set of wireless devices with which the first wireless device supports communication using a same communication beam, and where the selecting may be further based on the one or more groups of wireless devices.

In some examples of the method, apparatuses, and non-transitory computer-readable medium described herein, the receiving the candidate list further may include operations, features, means, or instructions for receiving, from the first wireless device, a set of received power measurements for the set of wireless devices, where the selecting may be further based on the set of received power measurements.

In some examples of the method, apparatuses, and non-transitory computer-readable medium described herein, the selecting may include operations, features, means, or instructions for selecting the subset of the set of wireless devices such that a number of communication beams for the first wireless device to communicate with the subset of the set of wireless devices may be less than or equal to a maximum number of supported communication beams for the first wireless device.

In some examples of the method, apparatuses, and non-transitory computer-readable medium described herein, the maximum number of supported communication beams for the first wireless device corresponds to a number of RF chains at the first wireless device.

In some examples of the method, apparatuses, and non-transitory computer-readable medium described herein, a number of wireless devices in the subset of the set of wireless devices may be greater than the maximum number of supported communication beams for the first wireless device.

Some examples of the method, apparatuses, and non-transitory computer-readable medium described herein may further include operations, features, means, or instructions for receiving, from the first wireless device, an updated candidate list including an updated set of wireless devices based on a second mode for the first wireless device, where the second mode includes a deactivated high pathloss mode, selecting an updated subset of the updated set of wireless devices for communication with the first wireless device based on the second mode for the first wireless device, where each wireless device of the updated subset of the updated set of wireless devices may have an angular separation with each other wireless device of the updated subset of the updated set of wireless devices with reference to the first wireless device that may be greater than an angular separation threshold associated with the second mode, and transmitting, to the first wireless device, the updated subset of the updated set of wireless devices.

In some examples of the method, apparatuses, and non-transitory computer-readable medium described herein, the angular separation threshold associated with the first mode may be equal to the angular separation threshold associated with the second mode.

Some examples of the method, apparatuses, and non-transitory computer-readable medium described herein may further include operations, features, means, or instructions for transmitting, to the first wireless device, an indication of a maximum number of communication candidates to report, where the candidate list may be based on the maximum number of communication candidates to report.

In some examples of the method, apparatuses, and non-transitory computer-readable medium described herein, the first wireless device, the set of wireless devices, or both include DUs, mobile terminals, or both in an IAB system, and the network entity includes a CU in the IAB system.

DETAILED DESCRIPTION

Figure 1:
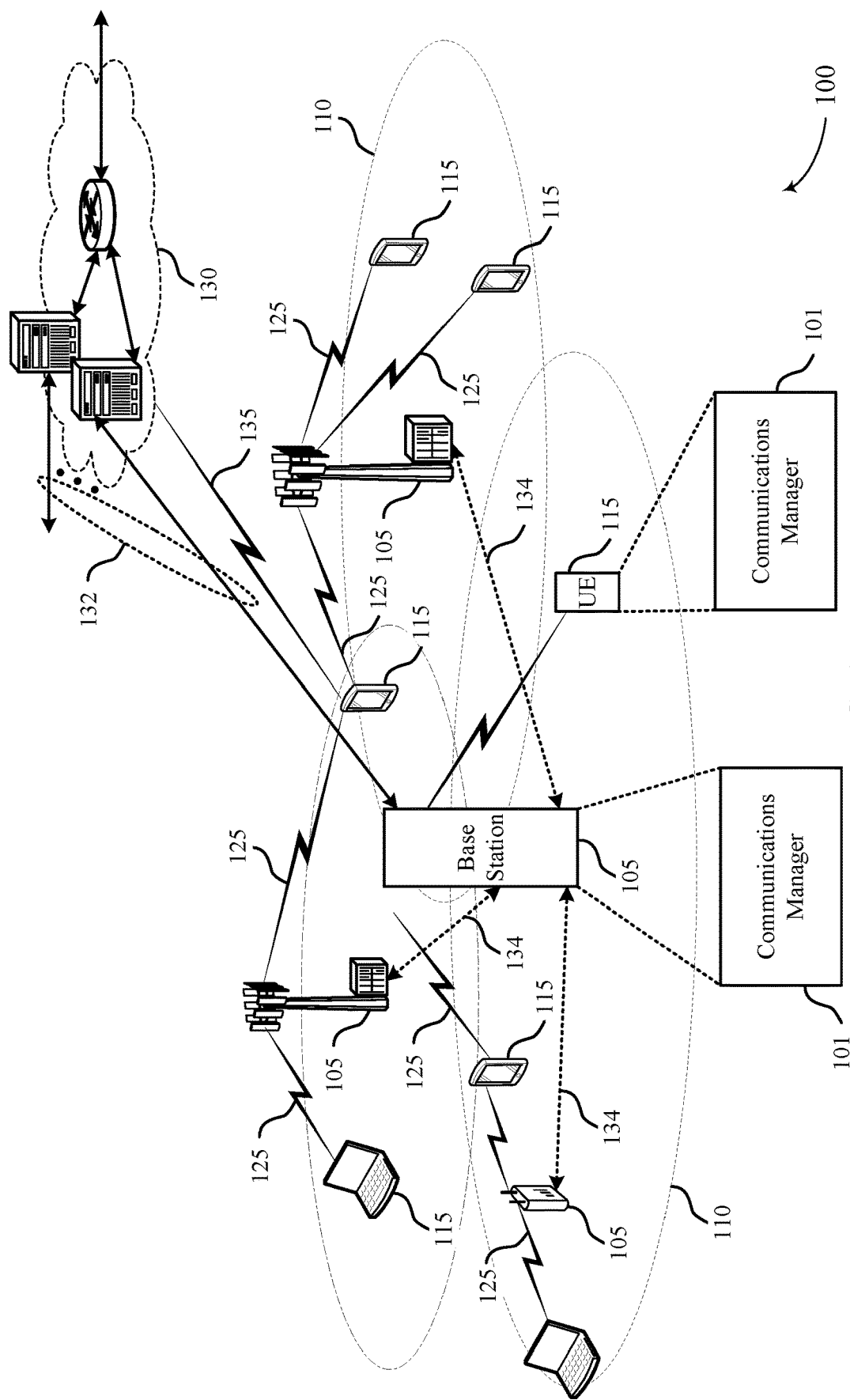
FIGS. 1-3 illustrate examples of wireless communications systems that support beam direction selection for high pathloss mode operations in accordance with one or more aspects of the present disclosure.

Some wireless communications systems may include access nodes (ANs) (e.g., base stations) to facilitate wireless communications between a UE and a network. In some cases, an anchor AN may have a high-capacity, wired, backhaul connection (e.g., fiber) to the network, while communicating with one or more ANs (e.g., relay devices) or UEs, which may be referred to as child nodes. In some examples, an anchor AN may be referred to as a donor node or a parent node. A network that supports communications between a base station and a UE may be referred to as an access network, while a network that supports communications between multiple base stations may be referred to as a backhaul network. Some wireless communications systems may support both an access network and a backhaul network (e.g., an IAB network). Additionally or alternatively, some wireless communication systems may operate in millimeter wave (mmW) frequency ranges (e.g., 28 gigahertz (GHz), 40 GHz, 60 GHz, etc.). Wireless communications at these frequencies may be associated with increased signal attenuation (e.g., pathloss). As a result, signal processing techniques, such as beamforming, may be used to coherently combine energy and overcome the pathlosses at these frequencies. Due to the increased amount of pathloss in mmW communication systems, transmissions between a base station and/or UE may be beamformed. A receiving device may also use beamforming techniques to configure antennas and/or antenna arrays such that transmissions are received in a directional manner. The wireless communication devices may implement beam management procedures to monitor the performance of active beams and identify candidate beams that can be utilized in the event the active beam becomes unavailable or otherwise unusable.

In deployments supporting both access and backhaul over wireless communication links (e.g., in an IAB network), an IAB node such as a parent node or a child node may experience communication failures. That is, conditions may exist that may cause interference, blockage, etc. on a communication beam (e.g., an active beam of an antenna element), which may result in a link failure, a reduced data rate, or both. These conditions may lead to reduced transmission energy between nodes, which may result in a reduced data rate (e.g., due to decoding errors, reduced transmission coherency, etc.). In some examples, to mitigate the effects of high pathloss, an IAB node (e.g., a parent node transmitting downstream in the IAB system, a child node transmitting upstream in the IAB system, or both) may monitor the link condition of a communication link between one or more other IAB nodes. If one or more IAB nodes determine that the link condition has fallen below a defined threshold, then the nodes may signal (e.g., to a network entity such as a base station CU) an indication of the poor link condition and activate or deactivate a pathloss operation mode. For example, a high pathloss operation mode may be activated. In some cases, based on the activated high pathloss mode, an IAB node may implement beam direction selection techniques for communications between the IAB node and other wireless devices (e.g., neighboring IAB nodes).

As described herein, techniques may enable wireless devices in a wireless communications system (e.g., an IAB network supporting communications in mmW frequencies) to use beam direction selection based on operating in a high pathloss mode. For example, an IAB node in the IAB system may discover neighboring IAB nodes and may perform measurements on communications (e.g., signals) between the nodes. The IAB node may determine a criterion for selecting a set of the neighboring IAB nodes as communication candidates. The node may determine whether the measurements (e.g., power metrics, spatial metrics, communication beam width, etc.) for the neighboring IAB nodes satisfy the selection criteria. For example, the node may determine that an angular separation between a group of neighboring IAB nodes satisfies an angular separation threshold, such that the angular separation between the group of IAB nodes with reference to the node is below a threshold separation (e.g., supporting communication with the group of IAB nodes using a common communication beam). The node may report, to a CU, the set of IAB nodes for communication. The CU may determine a subset of the set of IAB nodes (e.g., based on the pathloss operation mode and the set of candidate IAB nodes) and may transmit an indication of the selected subset of IAB nodes (e.g., the IAB nodes with which to communicate) to the node.

The node may determine correlations between the node's communication beams and the selected subset of IAB nodes (e.g., based on the indication of the subset of IAB nodes received from the CU). For example, the CU or the IAB node may determine that a group of IAB nodes (e.g., two or more IAB nodes of the subset of IAB nodes for communication) can be supported by the same communication beam (e.g., the same RF chain) at the node. Based on the angular separation of the group of IAB nodes with reference to the node being below an angular separation threshold, a single communication beam of a particular beam width may support transmitting and/or receiving signals with each of the IAB nodes in the group. Using the same communication beam for the group of IAB nodes may enable the node to coherently combine reception of transmissions from the group, which may enable higher data rates and more robust data reception in high pathloss mode operation, as well as mitigate limitations of the node based on the number of RF chains configured for the node (e.g., based on the hardware of the node). In some examples, the node, the CU, or both may determine the beam(s) for communication with the set of IAB nodes based on a pathloss operation mode, a selection scheme, selection factors, or a combination thereof.

Aspects of the disclosure are initially described in the context of wireless communications systems. Aspects of the disclosure are further illustrated by and described with reference to apparatus diagrams, system diagrams, and flowcharts that relate to beam direction selection for high pathloss mode operations.

FIG. 1 illustrates an example of a wireless communications system 100 that supports beam direction selection for high pathloss mode operations in accordance with one or more aspects of the present disclosure. The wireless communications system 100 includes base stations 105, UEs 115, and a core network 130. In some examples, the wireless communications system 100 may be an LTE network, an LTE-A network, an LTE-A Pro network, or an NR network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions. A UE 115 may communicate with the core network 130 through communication link 135.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARM) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RB s) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

As described herein, the devices of wireless communications system 100 (e.g., base stations 105, UEs 115, or both) may use techniques for beam direction selection (e.g., when operating in a high pathloss mode). For example, a base station 105 may select a set of neighboring base stations 105 for communication based on a pathloss operation mode, signal measurements (e.g., determined angular separation metrics), a criterion (e.g., an angular separation threshold), a selection scheme, selection factors, or any combination thereof. The base station 105 may also determine a pairing between the communication beams corresponding to RF chains of the base station 105 and the set of neighboring base stations 105.

One or more of the base stations 105 and the UEs 115 may include a communications manager 101. The communications manager 101 of a base station 105 or UE 115 may select a set of wireless devices as communication candidates based on an activated high pathloss mode, where the set of wireless devices includes at least two wireless devices with an angular separation with reference to the base station 105 or UE 115 that is less than an angular separation threshold associated with the activated high pathloss mode. The communications manager 101 may report, to a network entity (e.g., the core network 130, a base station CU, etc.), a candidate list including the set of wireless devices and receive, from the network entity, a subset of the set of wireless devices based on the candidate list. The communications manager 101 may then communicate with the subset of the set of wireless devices using one or more communication beams such that the base station 105 or UE 115 communicates with the at least two wireless devices using a single communication beam of the one or more communication beams based on the angular separation being less than the angular separation threshold.

In some examples, such as when a base station 105 is acting as a network entity such as a CU, the communications manager 101 may receive, from a first wireless device, a candidate list including a set of wireless devices and may select a subset of the set of wireless devices for communication with the first wireless device based on an activated high pathloss mode for the first wireless device, where the subset of the set of wireless devices includes at least two wireless devices with an angular separation with reference to the first wireless device that is less than an angular separation threshold associated with the activated high pathloss mode. The communications manager 101 may transmit, to the first wireless device, the subset of the set of wireless devices.

Figure 2:
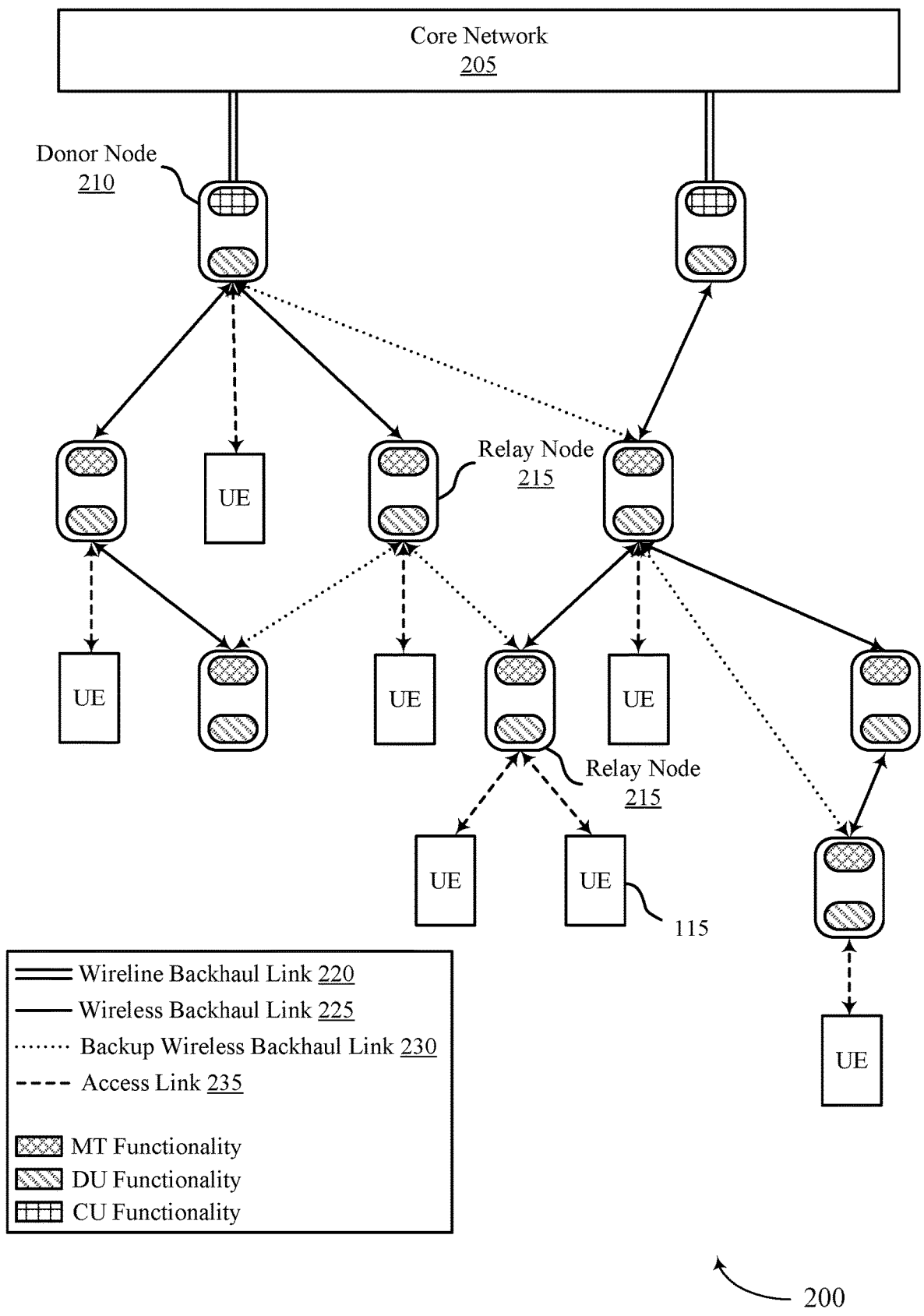

FIG. 2 illustrates an example of a wireless communications system 200 that supports acknowledgment messaging for resource reservations in accordance with one or more aspects of the present disclosure. Wireless communications system 200 (e.g., an NR system, an mmW system, etc.) may supplement wireline backhaul connections (e.g., wireline backhaul links 220) by sharing infrastructure and spectral resources for network access with wireless backhaul link capabilities, providing an IAB network architecture. Wireless communications system 200 may include a core network 205 and base stations 105 or supported devices split into one or more support entities (i.e., functionalities) for promoting wireless backhaul density in collaboration with communication access. Aspects of the supporting functionalities of the base stations 105 may be referred to as IAB nodes, such as IAB donor nodes 210 and IAB relay nodes 215. Wireless communications system 200 may additionally support a number of UEs 115, which may communicate on the uplink with one or more IAB donor nodes 210, IAB relay nodes 215, or a combination of these devices. In some examples, wireless communications system 200 may implement aspects of wireless communications system 100.

Wireless communications system 200 may include one or more IAB donor nodes 210, which may interface between a wireline network and a wireless network. In some cases, an IAB donor node 210 may be referred to as an anchor node, as the IAB donor node 210 anchors the wireless network to a wireline connection. For example, each IAB donor node 210 may include at least one wireline backhaul link 220 and one or more additional links (e.g., wireless backhaul links 225, backup wireless backhaul links 230, access links 235, etc.). An IAB donor node 210 may be split into associated base station CU and distributed unit (DU) entities, where one or more DUs associated with an IAB donor node 210 may be partially controlled by an associated CU. CUs of IAB donor nodes 210 may host layer 3 (L3) (e.g., radio resource control (RRC), service data adaption protocol (SDAP), packet data convergence protocol (PDCP), etc.) functionality and signaling. Furthermore, CUs of IAB donor nodes 210 may communicate with the core network 205 over a wireline backhaul link 220 (e.g., which may be referred to as an NG interface). DUs may host lower layer operations, such as layer 1 (L1) and/or layer 2 (L2) (e.g., radio link control (RLC), MAC, physical (PHY) layer, etc.) functionality and signaling. A DU entity of an IAB donor node 210 may support a serving cell within the network coverage area according to connections associated with wireless backhaul links 225 and access links 235 of the IAB network. DUs of the IAB donor nodes 210 may control both access and backhaul links within the corresponding network coverage and may provide controlling and scheduling for descendant (i.e., child) IAB relay nodes 215 and or UEs 115. For example, a DU may support an RLC channel connection with a UE 115 (e.g., via an access link 235) or with an IAB relay node 215 (e.g. via a backhaul link, such as a primary wireless backhaul link 225 or a backup wireless backhaul link 230).

IAB relay nodes 215 may be split into associated mobile terminal (MT) and base station DU entities, where MT functionality of the IAB relay nodes 215 may be controlled and/or scheduled by antecedent (i.e., parent) IAB nodes via wireless backhaul links. A parent node to a relay node 215 (i.e., a child node) may be another (antecedent) relay node 215 or a donor node 210. The MT functionality may be similar to functionality performed by UEs 115 in the system. An IAB relay node 215 may not be directly connected to a wireline backhaul 220. Instead, the IAB relay node 215 may connect to the core network 205 via other IAB nodes (e.g., any number of additional IAB relay nodes 215 and an IAB donor node 210) using wireless backhaul links. The IAB relay node 215 may transmit upstream (e.g., towards the core network 205) in the IAB system using MT functionality. In some cases, DUs of the IAB relay nodes 215 may be partially controlled by signaling messages from CU entities of an associated IAB donor node 210 (e.g., transmitted via an F1-application protocol (AP)). The DUs of the IAB relay nodes 215 may support serving cells of the network coverage area. For example, a DU of an IAB relay node 215 may perform the same or similar functions as a DU of an IAB donor node 210, supporting one or more access links 235 for UEs 115, one or more wireless backhaul links for downstream IAB relay nodes 215, or both.

Wireless communications system 200 may employ relay chains for communications within the IAB network architecture. For example, a UE 115 may communicate with an IAB node, and the IAB node may relay the data to a base station CU (e.g., a network entity or network device) or the core network 205 either directly or via one or more IAB relay nodes 215. Each IAB relay node 215 may include a primary wireless backhaul link 225 for relaying data upstream and/or receiving information from a base station CU or the core network 205. In some cases, an IAB relay node 215 may additionally include one or more backup wireless backhaul links 230 (e.g., for redundant connectivity and/or improved robustness). If the primary wireless backhaul link 225 fails (e.g., due to interference, malfunction at a connected IAB node, movement of IAB nodes, maintenance at IAB nodes, etc.), an IAB relay node 215 may utilize a backup wireless backhaul link 230 for backhaul communication within the IAB network. The first (e.g., primary) wireless backhaul link 225 may be associated with a coverage area and MT functionality may be controlled and/or scheduled by a first parent node. The one or more secondary backhaul links (e.g., backup wireless backhaul links 230) may be associated with a non-collocated coverage area and controlled and/or scheduled by one or more parent nodes. Each of the primary backhaul connections and the one or more secondary connections may support spectral capabilities to provide network communication over one or more RATs. The one or more IAB nodes may further support base station DU entities and may support multiple backhaul and access links within the relay chain. The DU entities may control and/or schedule descendant IAB relay nodes 215 and UEs 115 within the IAB network (e.g., downstream in the IAB network) via the configured backhaul and access links. That is, an IAB relay node 215 may act as a relay between an IAB donor node 210 and one or more descendant devices (e.g., other IAB relay nodes 215, UEs 115, etc.) in both communication directions based on established backhaul and access connections.

The operations performed by the wireless devices in the wireless communications system 200 may be static or dynamic. For example, in a dynamic IAB system, a wireless device may function as a donor node 210, a relay node 215, a parent node, a child node, or any combination of these. In some cases, wireless devices may dynamically switch between the different roles in the IAB system (e.g., based on configurations, channel conditions, neighboring devices, etc.). In other cases, wireless devices may function in multiple different roles at the same time (e.g., a single wireless device, such as a base station 105 or UE 115, may act as a parent node for one wireless device and a child node for another wireless device).

As described herein, the devices of wireless communications system 200 (e.g., IAB relay nodes 215, IAB donor nodes 210, a CU, a DU, or a combination thereof) may use techniques for beam direction selection (e.g., in a high pathloss mode). For example, a parent or child node may select a set of IAB nodes for communication based on a pathloss operation mode, performed measurements (e.g., measured angular separation metrics), a criterion (e.g., an angular separation threshold), a selection scheme, selection factors, or any combination thereof. The parent or child node may also determine a pairing between the RF chains (e.g., where each RF chain corresponds to a communication beam) of the parent or child node and the identified IAB nodes for communication. For example, the parent or child node may select a group of IAB nodes for communication based on whether an angular separation metric between the group of IAB nodes is below an angular separation threshold (e.g., such that a single communication beam of the parent or child node may be paired with the group of IAB nodes for communications).

Figure 3:
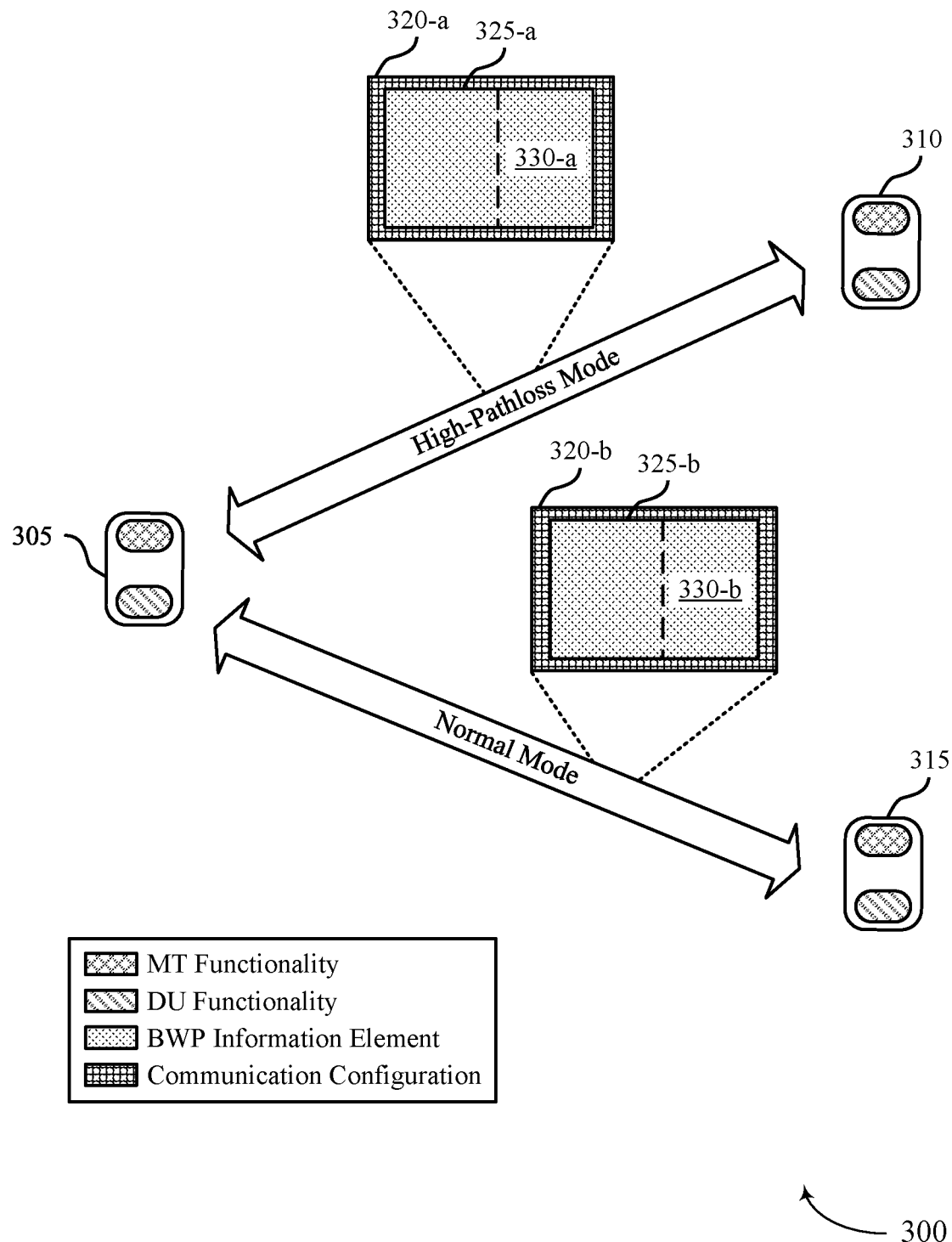

FIG. 3 illustrates an example of a wireless communications system 300 that supports beam direction selection for high pathloss mode operations in accordance with one or more aspects of the present disclosure. In some examples, wireless communications system 300 may implement aspects of wireless communications systems 100 or 200. In some aspects, wireless communications system 300 may operate within an IAB network. For example, IAB nodes 305, 310, and 315 may be nodes within a larger IAB network, and IAB node 305 may communicate with IAB node 310 or IAB node 315 over wireless or wired backhaul links. IAB nodes 305, 310, and 315 may be examples of wireless devices, relay nodes, donor nodes, or IAB nodes as described herein.

Aspects of the described techniques enable support for wireless communications over a radio frequency spectrum band in a high pathloss environment by utilizing a high pathloss mode. The high pathloss mode may utilize various parameters (e.g., modulation and coding scheme (MCS), HARQ, aggregation level, reference signals, etc.) that are configured or otherwise selected to support wireless communications over the radio frequency spectrum band experiencing a pathloss that satisfies (or exceeds) a threshold pathloss value.

In some cases, wireless devices (e.g., IAB nodes 305, 310, or 315) may operate in one of more pathloss modes such as a high pathloss mode when the pathloss value satisfies (or exceeds) a threshold pathloss value or a normal (e.g., low) pathloss mode when the pathloss value is below the threshold pathloss value. For instance, one or more wireless devices may perform wireless communications in the wireless communications system 300 over a radio frequency spectrum band. In some aspects, this may include the wireless device(s) operating in a first pathloss mode (e.g., a low pathloss mode or normal mode) in the wireless communications system 300. The wireless device(s) may receive a signal that indicates that the pathloss value has satisfied (or exceeded) a threshold pathloss value. As one example, the wireless device(s) may monitor a channel of the radio frequency spectrum band (e.g., monitor signals being communicated over the channel) and determine that the pathloss value has satisfied (or exceeded) the threshold pathloss value. In another example, the wireless device(s) may receive a signal from another wireless device indicating that the pathloss value has satisfied (or exceeded) the threshold pathloss value. Accordingly, the wireless device(s) may switch from the first pathloss mode (e.g., a low pathloss mode) to a second pathloss mode (e.g., high pathloss mode) and continue to perform wireless communications. The second pathloss mode (e.g., the high pathloss mode) may include one or more parameters to support continued wireless communications in the high pathloss environment. Examples of the parameters that may be adjusted may include, but are not limited to, the length of the synchronization signal block (SSB) in the high pathloss mode being longer, the length of a reference signal in the high pathloss mode being longer, an MCS in the high pathloss mode being lower, and the like. Accordingly, the wireless devices may continue to perform wireless communications in the wireless communications system 300 in the high pathloss environment according to the second pathloss mode (e.g., the high pathloss mode).

As shown, IAB node 305 may communicate with IAB node 310 in a high pathloss mode (e.g., if the high pathloss mode is activated at IAB node 305 for these communications) and may communicate with IAB node 315 in a normal mode (e.g., if the high pathloss mode is deactivated at IAB node 305 for these other communications). An indication of which mode to use for communication may be transmitted from IAB node 305 to one or both of IAB nodes 310 and 315. For example, IAB node 305 may transmit a communication configuration 320-a to IAB node 310 to communicate in high pathloss mode. The communication configuration 320-a may instruct IAB node 310 to operate in the high pathloss mode for communications with IAB node 305. The communication configuration 320-a may also include a bandwidth part (BWP) information element 325-a that indicates BWP parameters for the BWP used for communication between IAB node 305 and IAB node 310. In some example, the communication configuration 320-a may include one or more additional bits 330-a, which may indicate that the BWP identified by BWP information element 325-a is configured for high pathloss communications. As shown, the one or more additional bits 330-a may be a part of the BWP information element 325-a.

For normal mode operations, IAB node 305 may transmit a communication configuration 320-b to IAB node 315. The communication configuration 320-b may include a BWP information element 325-b, and one or more additional bits 330-b, which may be a part of the BWP information element 325-b. The one or more additional bits 330-b may indicate that the BWP identified by BWP information element 325-b is configured for normal mode communications. Based on the communication configuration(s) 320, the DU and/or MT functionality of an IAB node 305, 310, or 315 may be configured with different downlink or uplink BWPs for high pathloss mode and normal mode that are activated based on the communication configuration(s) 320 sent to the respective IAB node 310 or 315. For example, IAB node 310 may perform communications using the high pathloss BWP identified by BWP information element 325-a upon reception (or after a duration following reception) of communication configuration 320-a.

In some cases, IAB node 305 may enter a high pathloss mode and may communicate with IAB node 310 after a given time interval. For example, the communication configuration 320-a may include timing information (e.g., an indication of a time interval that IAB node 310 is to wait before operating in high pathloss mode), and IAB node 305 may instruct IAB node 310 to activate a high pathloss BWP based on this timing information. In some cases, the BWP information element 325-a may include additional information (e.g., via the one or more additional bits 330-a) which indicates that the BWP has been configured for the high pathloss mode, which signals to the MT of IAB node 310 to fully enter the high pathloss mode after a specific time and no additional signaling may be used for entering or exiting high pathloss mode.

In some aspects, configuration parameters of the communication configuration 320 may be configured differently between pathloss modes (e.g., a first subset of configuration parameters may be variable between high pathloss mode and normal mode, while a second subset of configuration parameters may be configured to be the same between high pathloss mode and normal mode). For example, control resource set (CORESET) parameters, channel state information (CSI) resources, and sounding reference signal (SRS) resources may be different between high pathloss mode and normal mode. Further, if the one or more additional bits 330 correspond to a high pathloss mode (such as the one or more additional bits 330-a), a longer time duration for TTIs may be implemented for communications in the high pathloss mode as compared to the time duration associated with TTIs for normal mode. Additionally, or alternatively, rules specific to the high pathloss mode may be invoked (e.g., rules relating to procedures for interrupting data channels, such as a shared data channel, with a reference signal (RS), such as a tracking RS (TRS)).

In some cases, other parameters (e.g., a second subset of configuration parameters) may be configured to be the same between high pathloss and normal mode operations. For example, processing time related control parameters (e.g., latency parameters related to scheduling, parameters related to control operations) may remain the same for normal and high pathloss modes.

As described herein, the devices of wireless communications system 300 (e.g., IAB nodes 305, 310, 315, or a combination thereof) may use techniques for beam direction selection (e.g., in a high pathloss mode). For example, a parent or child node may select a set of IAB nodes for communication based on a pathloss operation mode, performed measurements (e.g., measured angular separation metrics), a criterion (e.g., an angular separation threshold), a selection scheme, selection factors, or any combination thereof. The parent or child node may also determine a pairing between the RF chains (e.g., where each RF chain corresponds to a communication beam) of the parent or child node and the identified IAB nodes for communication. For example, the parent or child node may select a group of IAB nodes for communication based on whether an angular separation metric between the group of IAB nodes is below an angular separation threshold (e.g., such that a single communication beam of the parent or child node may be paired with the group of IAB nodes for communications).

Figure 4:
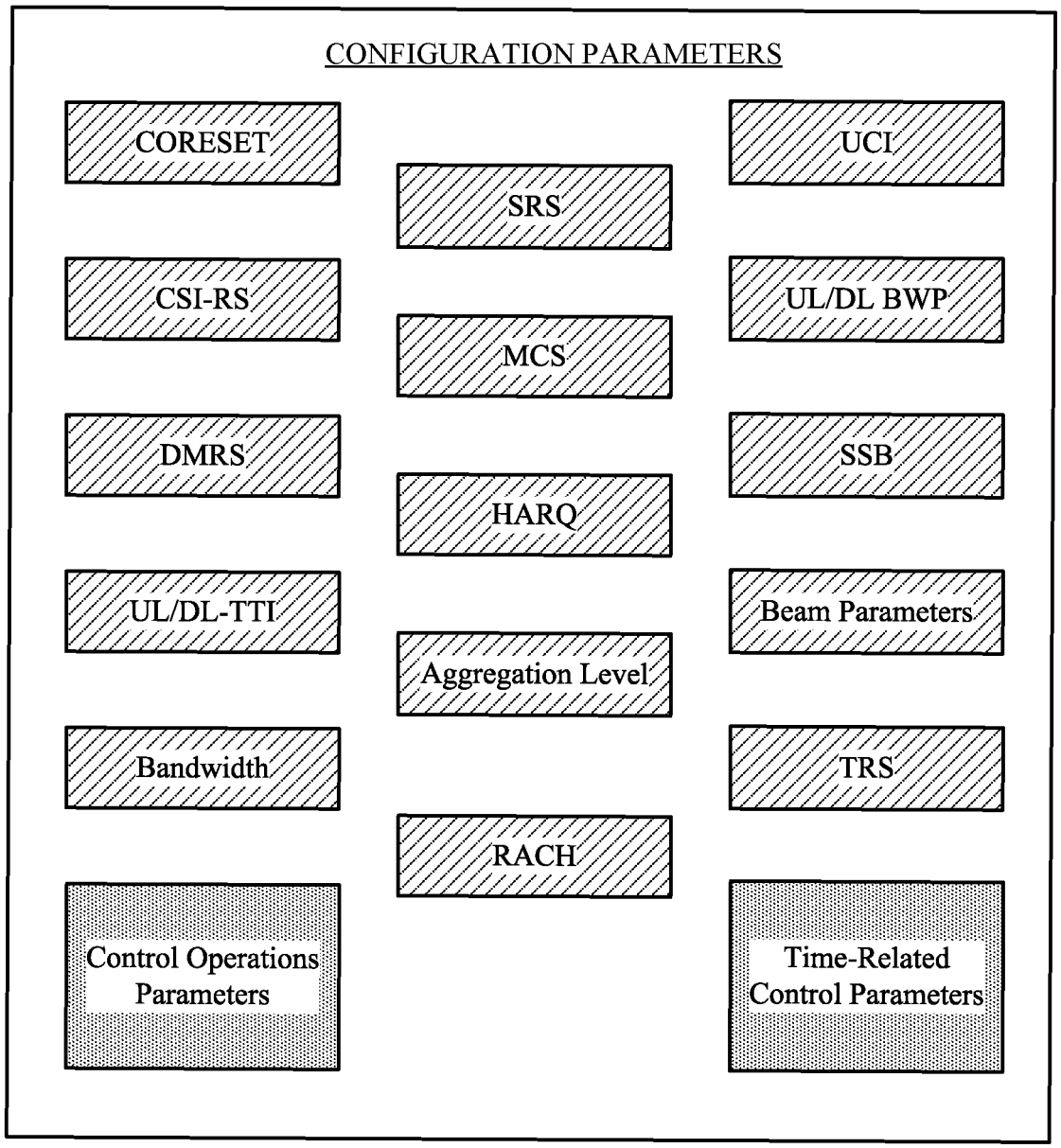
FIG. 4 illustrates example configuration parameters that support beam direction selection for high pathloss mode operations in accordance with one or more aspects of the present disclosure.

FIG. 4 illustrates example configuration parameters 400 that support beam direction selection for high pathloss mode operations in accordance with one or more aspects of the present disclosure. Configuration parameters 400 may include a set of configuration parameters for configuring communications according to different pathloss modes.

In some examples, one or more configuration parameters 400 may be configured to support high pathloss mode communications (e.g., for devices operating in a high pathloss mode, such as a parent IAB node communicating with a child IAB node using a high pathloss communication link). Further, one or more configuration parameters 400 may be configured to support normal mode communications (e.g., for devices operating in a normal pathloss mode, such as a parent IAB node communicating with a child IAB node using a normal pathloss communication link).

In some cases, a subset of configuration parameters 400 may be configurable between pathloss modes. For example, one or more configuration parameters 400 may be variable or dynamic between pathloss modes, while other configuration parameters 400 may be static and remain the same between different pathloss modes. In one example, a subset of the configuration parameters 400 that may be different for high pathloss mode operation compared to normal mode operation. Such parameters may include CORESET parameters (e.g., CORESET #0 information or common CORESET information, CSI reference signal (CSI-RS) parameters (e.g., CSI-RS resource configuration, periodicity, measurement information), and SRS parameters (e.g., SRS configuration, SRS resources). Other configurable parameters may include uplink control information (UCI) parameters (e.g., UCI resources), MCS parameters (e.g., modulation order, coding scheme), and uplink or downlink BWP parameters (e.g., control or data channel configuration parameters, frequency location, numerology, timing information, etc.). Demodulation reference signal (DMRS) parameters (e.g., DMRS resources or mapping type), HARQ parameters (e.g., HARQ feedback information such as #HARQ N1, MCS, etc.), synchronization signal block (SSB) parameters (SSB position, periodicity, and/or power), uplink or downlink TTI information (e.g., uplink TTI duration and location, downlink TTI duration and location), aggregation level parameters, beam parameters (e.g., beam width or index), bandwidth parameters (e.g., cell RS ports, frequency information, etc.), TRS parameters (e.g., rules for interrupting PUSCH), and random access channel (RACH) parameters (e.g., RACH timing and resources), among others may also be configurable between different pathloss modes.

For example, one or more MCS parameters of the configuration parameters 400 may be configurable between pathloss modes. An MCS parameter may be associated with or include an MCS table with a number of entries (e.g., 16 entries). An entry may correspond to a coding rate or modulation order (e.g., quadrature phase shift keying (QPSK), quadrature amplitude modulation (QAM) formats such as QAM16, QAM 64, and the like). In some examples, the MCS table may be configurable based on a pathloss mode. For example, the MCS table used for a normal pathloss operation mode may be different than the MCS table used for a high pathloss operation mode. In some examples, the MCS tables may be different (e.g., each MCS table may include different entries) based on channel conditions. For example, an MCS table may include different entries based on a pathloss dynamic range (e.g., whether the pathloss dynamic range is associated with a normal pathloss operation mode or a high pathloss operation mode), a signal-to-interference-plus-noise ratio (SINR), or any other channel condition metrics.

In some examples, a wireless device (e.g., a base station 105 or a parent IAB node) may send a control transmission (e.g., a physical downlink control channel (PDCCH) transmission) to a receiving wireless device (e.g., a UE 115 or a child IAB node). The control transmission may schedule a shared channel transmission (e.g., a physical downlink shared channel (PDSCH) transmission or a physical uplink shared channel (PUSCH) transmission). The control transmission may also include downlink control information (DCI), which may indicate, to the receiving wireless device, one or more configuration parameters 400. For instance, the DCI may indicate the MCS parameter (e.g., an entry of the MCS table) to the receiving wireless device. The receiving wireless device may determine a coding rate and modulation order based on the indication in the DCI (e.g., the coding rate and modulation order associated with the indicated entry of the MCS table). The receiving wireless device may use the determined coding and modulation order to transmit or receive a scheduled shared channel transmission.

Other configuration parameters 400 may be configured similarly between high pathloss and normal modes. For example, configuration parameters 400 such as time-related control parameters (e.g., processing time related parameters, latency parameters, switching time parameters, scheduling parameters, or any combination of these or similar control parameters) that may be configured the same for both high pathloss and normal modes. Further, other control operation parameters such as timing for beam change (e.g., timing between beam change command and the change of the beam) may be configured the same for both high pathloss and normal modes.

As described herein, the configuration parameters 400 may support techniques for beam direction selection (e.g., in a high pathloss mode). In some examples, the configuration parameters 400 may be configurable between high pathloss and normal modes. A parent or child node may select a set of IAB nodes for communication based on the configuration parameters 400 and an associated pathloss mode (e.g., a high pathloss mode). The parent or child node may also select the set of TAB nodes base on performed measurements (e.g., measured angular separation metrics), a criterion (e.g., an angular separation threshold), a selection scheme, selection factors, or any combination thereof. Additionally or alternatively, the parent or child node may determine a pairing between the RF chains (e.g., where each RF chain corresponds to a communication beam) of the parent or child node and the identified TAB nodes for communication. For example, the parent or child node may select a group of TAB nodes for communication based on whether an angular separation metric between the group of TAB nodes is below an angular separation threshold (e.g., such that a single communication beam of the parent or child node may be paired with the group of TAB nodes for communications).

Figure 5:
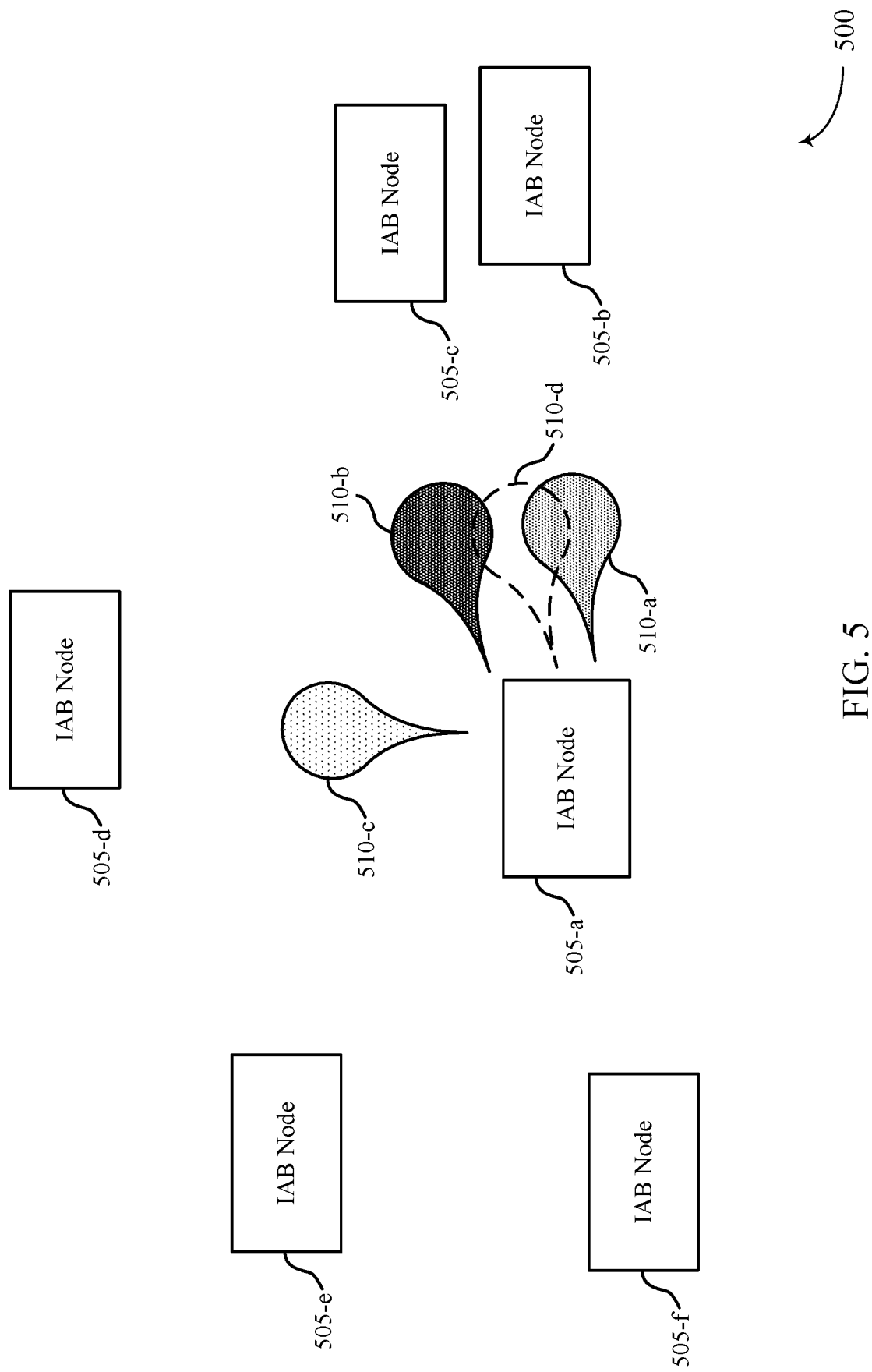
FIGS. 5 and 6 illustrate examples of wireless communications systems that support beam direction selection for high pathloss mode operations in accordance with one or more aspects of the present disclosure.

FIG. 5 illustrates an example of a wireless communications system 500 that supports beam direction selection for high pathloss mode operations in accordance with one or more aspects of the present disclosure. In some examples, the wireless communications system 500 may implement aspects of wireless communications systems 100, 200, or 300. The wireless communications system 500 may include wireless devices, such as TAB nodes 505, which may be examples of parent nodes, child nodes, or both as described with respect to FIG. 2. In some examples, the TAB nodes 505 may also be examples of any wireless devices described herein (e.g., IAB donor nodes 210, TAB relay nodes 215, base stations 105, or UEs 115). In some examples, the wireless communications system 500 may illustrate an TAB network (e.g., as described with respect to FIG. 2), a wireless communications system operating in mmW frequency ranges, or both.

For example, wireless communications system 500 may operate in mmW frequency ranges (e.g., 26 GHz, 28 GHz, 39 GHz, 57-71 GHz, etc.). Signal processing techniques, such as beamforming, may be used by wireless communication devices of the system. For example, a transmitting device (e.g., an TAB node 505) can coherently combine transmission energy over one or more antenna elements (e.g., RF chains) to overcome the path losses at an operating frequency. In other examples, a receiving device (e.g., another TAB node 505) may use beamforming techniques to configure antenna elements for directional signal reception. The wireless communication devices may rely on beam management procedures to monitor the performance of active beams (e.g., communication beams 510) and identify candidate beams that can be utilized in the event the active beam becomes unavailable or otherwise unusable (e.g., due to fading, blockage, etc.).

In some examples of the wireless communications system 500, an IAB node 505-*a* may include one or more antenna elements (e.g., RF chains). Each antenna element may be associated with a communication beam 510 (e.g., an analog beam). The IAB node 505-*a* may use the communication beams 510 (e.g., communication beams 510-*a*, 510-*b*, 510-*c*, or any combination thereof) to target different directions for communications with other IAB nodes, such as IAB nodes 505-*b*, 505-*c*, 505-*d*, 505-*e*, and 505-*f*.

In some examples, the IAB node 505-*a* may determine to communicate with a set of other IAB nodes 505. In such examples, the IAB node 505-*a* may pair a communication beam 510 with one or more IAB nodes 505 from the set of IAB nodes. For example, the IAB node 505-*a* may determine to communicate with IAB node 505-*d* (e.g., based on a set of IAB nodes indicated by a network entity such as a CU). The IAB node 505-*a* may pair communication beam 510-*c* with the IAB node 505-*d* (e.g., based on an indication from the CU) for directional communication. In some examples, the IAB node 505-*a* may determine a number of communication beams 510 to communicate with a set of IAB nodes based on the number of RF chains at the IAB node 505-*a* (e.g., two communication beams 510 associated with two RF chains). In some cases, IAB node 505-*a* may communicate using different RF chains simultaneously (e.g., in overlapping time resources). For example, IAB node 505-*a* may communicate with a first IAB node 505 using a first communication beam 510 and communicate with a second IAB node 505 using a second communication beam 510 in overlapping time resources (e.g., overlapping OFDM symbols).

The IAB node 505-*a* may communicate with the set of IAB nodes based on communication factors. The communication factors may be spatial metrics, power metrics, or other metrics for determining the set of IAB nodes 505 for communication. For example, the communication factors may include an angular separation. The angular separation may be in terms of an AoA or an AoD for a transmission. The AoA may be a measure of the angle that a transmission arrives at IAB node 505-*a* from another IAB node 505. The AoD may be a measure of the angle that a transmission is sent from the IAB node 505-*a* to a receiving IAB node 505.

In some examples (e.g., in normal pathloss mode operation or deactivated high pathloss mode operation), the IAB node 505-*a* may communicate with the set of IAB nodes 505 based on a measured angular separation satisfying a minimum angular separation threshold. For example, the IAB node 505-*a* or a network entity (e.g., a CU) may determine that a measured angular separation between IAB nodes 505-*c* and 505-*d* satisfies (e.g., is greater than or equal to) the minimum angular separation threshold. The IAB nodes 505-*c* and 505-*d* may be included in the set of IAB nodes for communication and may be paired with communication beams 510-*b* and 510-*c*, respectively, for directional communications with IAB node 505-*a* based on meeting the minimum angular separation threshold. The relatively large measured angular separation may provide communication diversity in the wireless communications system 500. For example, if communication beam 510-*b* becomes unavailable or otherwise unusable (e.g., due to blocking), the IAB node 505-*a* may maintain communications with the IAB node 505-*c* (e.g., via the unblocked communication beam 510-*c*).

In other examples (e.g., in high pathloss mode operation), the IAB node 505-*a* may communicate with a set of IAB nodes 505 for communication based on a measured angular separation satisfying an angular separation threshold (e.g., a maximum angular separation threshold for a single beam). For example, the IAB node 505-*a* or the CU may determine that a measured angular separation between IAB nodes 505-*b* and 505-*c* satisfies (e.g., is lower than or equal to) the angular separation threshold. The IAB nodes 505-*b* and 505-*c* may be included in the set of IAB nodes for communication based on IAB node 505-*a* operating in the high pathloss mode. Due to the relatively small angular separation, IAB node 505-*a* may communicate with both of these IAB nodes 505-*b* and 505-*c* using a single communications beam for directional communications. In a first example, IAB node 505-*a* may use a communication beam 510-*a* corresponding to one of these IAB nodes (e.g., IAB node 505-*b*) to serve a group of IAB nodes (e.g., both IAB node 505-*b* and IAB node 505-*c*). In a second example, IAB node 505-*a* may select a communication beam 510-*d* corresponding to the group of IAB nodes (e.g., IAB nodes 505-*b* and 505-*c*), rather than any one IAB node 505.

The relatively small angular separation may enable more robust and efficient communications. For example, the IAB node 505-*a* may determine to operate in a high pathloss mode. The IAB node 505-*a* may increase received power and coherency of transmissions from the selected IAB nodes 505-*b* and 510-*c* (e.g., due to the low angular separation of IAB nodes 505-*b* and 510-*c*). For example, the IAB node 505-*a* may receive transmissions from IAB node 505-*b* and IAB node 505-*c* using a single antenna element (e.g., using communication beam 510-*a* or 510-*d*), which may enable higher data rates and more robust data reception in the high pathloss mode operation.

The IAB node 505-*a* may determine criteria for generating a candidate list of IAB nodes for communication (e.g., based on a current operating mode). The candidate list may include a list of one or more IAB nodes 505 (e.g., out of neighboring IAB nodes 505 capable of communicating with IAB node 505-*a*). In some examples, the CU may transmit the criteria to the IAB node 505-*a*. In other examples, the IAB node 505-*a* may be configured with the criteria.

In some examples, the criteria may include information for generating the candidate list. For example, the criteria may include an indication of a number of IAB nodes 505 to include in the candidate list (e.g., the criteria may specify for IAB node 505-*a* to report four IAB nodes in the candidate list). Additionally or alternatively, the criteria may include an indication of one or more threshold values. The IAB node 505-*a* may use the one or more threshold values to determine whether to include an IAB node 505 in the candidate list (e.g., based on one or more measurements satisfying or failing to satisfy the one or more threshold values). The criteria may also include any other information pertinent for determining the candidate list.

The IAB node 505-*a* may use the criteria to generate the candidate list. For example, the IAB node 505-*a* may determine the candidate list based on the indication of one or more threshold values. In some cases, the IAB node 505-*a* may transmit to and/or receive signals from neighboring IAB nodes 505 (e.g., IAB nodes 505-*b*, 505-*c*, 505-*d*, 505-*e*, and 505-*f*) and may perform measurements for each signal. In some examples, the measurements may be associated with each IAB node 505 and may include power metrics (e.g., based on reference signal received power (RSRP) measurements), spatial metrics (e.g., spatial distances, spatial separations, angular separations), and the like. The IAB node 505-*a* may determine that one or more measurements satisfy the one or more threshold values and may determine to include the associated IAB node 505 in the candidate list. The IAB node 505-*a* may report the generated candidate list (e.g., a list of IAB nodes 505-*b*, 505-*c*, 505-*d*, and 505-*f*) to the network via a network entity, such as a base station CU.

The IAB node 505-*a* may also determine other communication information. For example, the IAB node 505-*a* may determine communication beam information. The communication beam information may include a width of communication beams 510 (e.g., selected or measured by the IAB node 505-*a*). For example, the width of a communication beam 510 may be used to determine whether a group of IAB nodes 505, such as IAB nodes 505-*b* and 505-*c*, can support communications with the IAB node 505-*a* using a single communication beam 510, such as communication beam 510-*a* or 510-*d*. The communications information may also include a number of RF chains associated with the IAB node 505-*a*, a number of communication beams 510 to use for communications with the other IAB nodes 505 (e.g., two communications beams 510 corresponding to two RF chains at IAB node 505-*a*), etc. In some examples, the IAB node 505-*a* may report the communication information to the CU with the reported candidate list.

In some examples, the IAB node 505-*a* may modify or retransmit a candidate list based on a change in a pathloss operation mode. For example, the IAB node 505-*a* may perform a pathloss measurement and may determine to activate or deactivate a high pathloss operation mode. In some examples, the IAB node 505-*a* may transmit an indication that a high pathloss operation mode is activated or deactivated to the CU. The CU may modify the criteria for generating the candidate list based on the operation mode. In some examples (e.g., for a high pathloss operation mode), the CU may indicate different information for the criteria (e.g., different information than for a normal pathloss operation mode), such as a different number of IAB nodes to report, different threshold values, or other modified information. For example, the CU may indicate to the IAB node 505-*a* an angular separation threshold for serving multiple IAB nodes 505 with a single beam (e.g., alternative to indicating a minimum angular separation threshold) based on the high pathloss operation mode. In some other examples, the IAB node 505-*a* may dynamically determine the angular separation threshold in the high pathloss mode based on a selected communication beam width. Additionally or alternatively, the IAB node 505-*a* may modify the criteria based on the pathloss mode. For example, in some cases, the IAB node 505-*a* may indicate additional IAB nodes 505 in the candidate list based on grouping of IAB nodes 505. That is, rather than report four IAB nodes 505 as communication candidates, the IAB node 505-*a* in the high pathloss mode may report four groups of IAB nodes 505 corresponding to four communication beams 510 as the communication candidates. The IAB node 505-*a* may generate the candidate list based on the criteria for a normal pathloss operation mode, the modified criteria for a high pathloss operation mode, or a combination thereof.

In some examples, the candidate list may also include the measurements (e.g., power metrics or spatial metrics) associated with each reported IAB node (e.g., IAB nodes 505-*b*, 505-*c*, 505-*d*, etc.). In other examples, the candidate list may include one or more groups of IAB nodes 505. Each group of IAB nodes may include two or more IAB nodes 505 that may be supported by a single communication beam 510. The IAB node 505-*a* may determine the one or more groups based on determining that a measurement of one or more IAB nodes 505 satisfies a threshold (e.g., a threshold indicated in the criteria). For example, a spatial separation measurement, such as an angular separation metric between IAB node 505-*b* and IAB node 505-*c*, may satisfy a threshold (e.g., may be less than an angular separation threshold). The IAB node 505-*a* may determine that a single communication beam 510-*a* or 510-*d* can support communications with both IAB node 505-*b* and IAB node 505-*c* based on the satisfied angular separation threshold. The IAB node 505-*a* may report IAB nodes 505-*b* and 505-*c* as a group of IAB nodes in the candidate list.

An IAB node 505 may be selected for the candidate list based on a selection scheme. In some examples, the scheme may be based on the pathloss operation mode (e.g., a high pathloss operation mode). The IAB node 505-*a* may determine whether to include an IAB node 505 of a set of neighboring IAB nodes in the reported candidate list based on the selection scheme. That is, the IAB node 505-*a* may select a neighboring IAB node 505 based on selection factors (e.g., the measurements associated with the neighboring IAB node 505). For example, the selection factors may include a received signal strength (e.g., from a power metric such as an RSRP measurement). The IAB node 505-*a* may determine to select an IAB node 505 with a relatively stronger signal. The selection factors may also include a spatial metric. For example, the IAB node 505-*a* may select the IAB nodes 505 based on an angular separation between two or more IAB nodes 505 (e.g., a group of IAB nodes that can support communications with a single communication beam 510). Additionally or alternatively, the IAB node 505-*a* may select the IAB nodes 505 based on if the two or more IAB nodes 505 satisfy a minimum angular separation threshold (e.g., the two or more IAB nodes 505 have a relatively large angular separation for robustness against blocking, bursty interference, etc.).

Such a selection scheme may enable for dynamic candidate list reporting and beam selection (e.g., based on an activated or deactivated high pathloss operation mode). For example, the CU or the IAB node 505-*a* may determine the priority of the selection factors for determining the candidate list based on a pathloss operation mode. The IAB node 505-*a* may generate the candidate list according to the selection scheme. The IAB node 505-*a* may report the candidate list to the CU. In one specific example, the IAB node 505-*a* may determine which neighboring IAB nodes 505 have an RSRP value above a minimum RSRP value and determine if any of these IAB nodes 505 support grouping according to a shared communication beam 510. The IAB node 505-*a* may then report the IAB nodes 505 that are either grouped together or that maximize the angular separation between the reported IAB nodes 505.

A network entity, such as a base station CU, may receive the reported candidate list from the IAB node 505-*a* and may determine the set of IAB nodes 505 for communication with the IAB node 505-*a* based on the received candidate list. In some examples, the CU may receive a candidate list including one or more groups of IAB nodes (e.g., the groups of IAB nodes that can be supported with the same RF chain or communication beam 510). In some cases, the CU may determine which IAB nodes 505 or groups of IAB nodes may be paired with which communication beams 510. In some examples, the CU may transmit an indication of the selected set of IAB nodes to IAB node 505-*a* (e.g., a subset of the candidates reported in the candidate list). In some examples, the indication of the set of IAB nodes may also include the pairing of communication beams 510 with the one or more IAB nodes 505. In some aspects, the CU may receive a candidate list including the list of reported IAB nodes 505, the measurements associated with the reported IAB nodes 505 (e.g., angular separations between certain IAB nodes 505, such as IAB node 505-*b* and IAB node 505-*c*), or other pertinent information (e.g., beam widths for different communication beams 510). The CU may use the received measurements, information, or both to determine groups of IAB nodes that can be supported with the same RF chain or communication beam 510 by IAB node 505-*a*.

The network entity (e.g., the CU) may send the selected subset of IAB nodes 505 to IAB node 505-*a* for communication. For example, based on the reported list of candidates, the network entity may select three IAB nodes 505 corresponding to two RF chains at IAB node 505-*a*. In some cases, these selected IAB nodes 505 may act as parent nodes for IAB node 505-*a*. In other cases, IAB node 505-*a* may act as the parent node to these selected IAB nodes 505. IAB node 505-*a* may communicate with the selected IAB nodes 505 using communication beams 510 indicated by the CU or selected by IAB node 505-*a*.

As illustrated in FIG. 5, the IAB node 505-*a* may discover neighboring IAB nodes 505 (e.g., IAB nodes 505-*b*, 505-*c*, 505-*d*, 505-*e*, and 505-*f*) and may receive signals or transmit signals to the neighboring IAB nodes 505. This discovery may be based on discovery signals between the IAB nodes 505 or messaging from the CU. The IAB node 505-*a* may perform measurements on the signals with these neighboring nodes and select a set of IAB nodes to include in a candidate list. For example, the set of IAB nodes may include four IAB nodes 505, such as IAB node 505-*b*, IAB node 505-*c*, IAB node 505-*d*, and IAB node 505-*f*. The IAB node 505-*a* may select an IAB node 505 to include in the candidate list based on a set of criteria and the signal measurements. For example, the IAB node 505-*a* may determine that the measurements (e.g., power metrics, spatial metrics, etc.) of the IAB nodes 505-*b* and 505-*c* satisfy a criterion for reporting (e.g., in accordance with a determined selection scheme). In some examples, the criteria, the selection scheme, or both may be based on a pathloss operation mode (e.g., an active high pathloss operation mode). The IAB node 505-*a* may report, to a CU, the set of IAB nodes in the candidate list. The IAB node 505-*a* may also report other communications information, such as a number of communication beams 510 associated with the IAB node 505-*a*, beam widths of the communication beams 510, etc.

The CU may select a subset of the IAB nodes (e.g., IAB nodes 505-*b*, 505-*c*, and 505-*d*) in the candidate list for communications with the IAB node 505-*a*. For example, the CU may determine that IAB node 505-*a* includes two RF chains with two associated communication beams 510. The CU may select IAB node 505-*b* and IAB node 505-*c* for communications with IAB node 505-*a* using a single communication beam 510 (e.g., communication beam 510-*a* or 510-*d*) based on an angular separation between these IAB nodes. For example, the IAB nodes 505-*b* and 505-*c* may satisfy an angular separation threshold to support communications on a single communication beam 510-*a* based on a width of the communication beam 510-*a* (e.g., wider communication beams may support a higher angular separation threshold for grouping IAB nodes 505). In some cases, the candidates on the candidate list may be selected based on one or more parameters, such as the power metrics, spatial metrics, a pathloss operation mode, a selection scheme, or any combination thereof. The CU may also select the IAB node 505-*d* for communication with the IAB node 505-*a* using the communication beam 510-*c* (e.g., if IAB node 505-*a* has two RF chains supporting two analog beams). For example, the IAB node 505-*d* and IAB nodes 505-*c* and 505-*b* may satisfy a minimum angular separation threshold to provide diversity (e.g., robustness against blocking) in the communications system.

The CU may send the selected subset of IAB nodes for communications to the IAB node 505-*a*. The IAB node 505-*a* may receive the selected subset of IAB nodes and may communicate with the IAB nodes (e.g., IAB nodes 505-*b*, 505-*c*, and 505-d) using the two communication beams (e.g., communication beams 510-*a* and 510-*c*).

Figure 6:
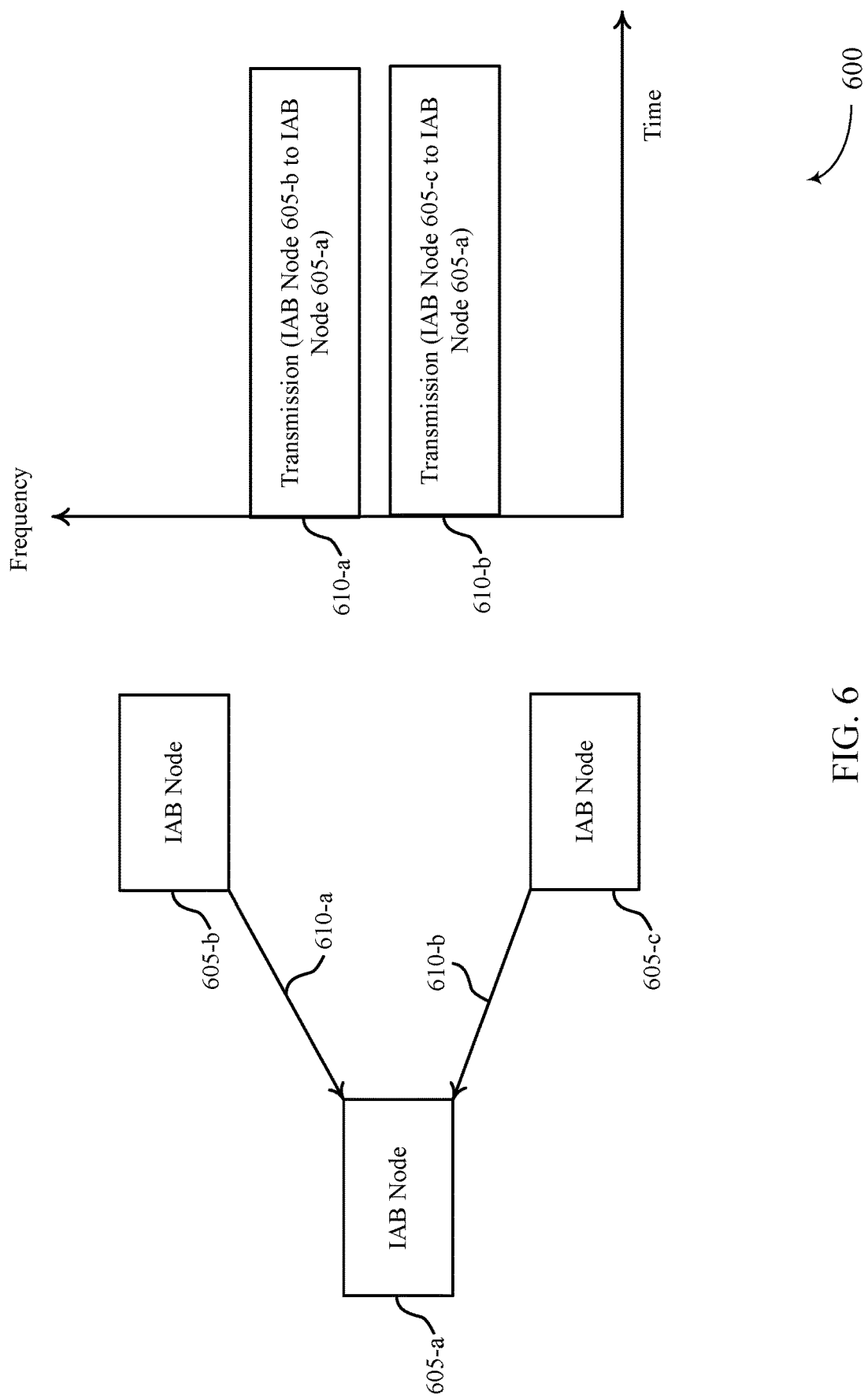

FIG. 6 illustrates an example of a wireless communications system 600 that supports beam direction selection for high pathloss mode operations in accordance with one or more aspects of the present disclosure. In some examples, the wireless communications system 600 may implement aspects of wireless communications systems 100, 200, 300, or 500. The wireless communications system 600 may include wireless devices, such as IAB nodes 605, which may support DU functionality, MT functionality, or both as described with respect to FIGS. 2-5. In some examples, the IAB nodes 605 may also be examples of any wireless devices described herein (e.g., IAB donor nodes 210, IAB relay nodes 215, base stations 105, or UEs 115). For example, the IAB node 605-*a* may be an example of a child node, and the IAB nodes 605-*b* and 605-*c* may be examples of parent nodes. In some examples, the wireless communications system 600 may illustrate an IAB network (e.g., as described with respect to FIG. 2), a wireless communications system operating in mmW frequency ranges, or both.

In some examples, the wireless communications system 600 may operate in mmW frequency ranges. The IAB node 605-*a* may include one or more antenna elements (e.g., RF chains), where each antenna element may be associated with a communication beam (e.g., an analog beam). The IAB node 605-*a* may utilize a set of communication beams to target different directions for communications with other IAB nodes, such as IAB nodes 605-*b*, 605-*c*, or both. In some examples, the IAB node 605-*a* or a network entity may select IAB nodes 605-*b*, 605-*c*, or both for communication from a list of neighboring IAB nodes (e.g., IAB nodes within a certain distance, with a certain signal strength, discovered by the IAB node 605-*a* using discovery signaling, etc.). In such examples, the IAB node 605-*a* may use a single antenna element (e.g., the same RF chain or analog beam) for directional communications with IAB nodes 605-*b* and 605-*c* based on the angular separation between IAB nodes 605-*b* and 605-*c* with reference to IAB node 605-*a*.

For example, the IAB node 605-*a* may receive transmissions 610 from IAB nodes 605-*b* and 605-*c* using the same antenna element (e.g., RF chain). In some examples, the transmissions 610-*a* and 610-*b* from the IAB nodes 605-*b* and 605-*c*, respectively, may be examples of frequency division multiplexed (FDM) transmissions. Receiving the transmissions 610 in this manner may be advantageous, in some examples, because one or more links between IAB node 605-*a* and IAB node 605-*b*, IAB node 605-*c*, or both may be power limited. That is, the transmission power for the link may be a limiting factor for data throughput of a transmission 610. Thus, the IAB node 605-*a* may schedule transmissions 610-*a* and 610-*b* from both IAB node 605-*b* and IAB node 605-*c* in the same time resources, which may increase the received power and aggregate data throughput of the transmissions in time. In some examples, the IAB nodes 605-*b* and 605-*c* may coordinate resource allocation and scheduling for transmissions 610-*a* and 610-*b* to the IAB node 605-*a*. For example, the IAB nodes 605-*b* and 605-*c* may determine that they are operating in a high pathloss operation mode and may reserve resources for the FDM transmissions 610 in a frequency range relatively smaller than a normal operation mode (e.g., to increase the power per link of each transmission 610). In some cases, such as in the high pathloss operation mode, the subchannels for the one or more transmissions 610 may leave relatively large guard frequency bands. The guard frequency bands may enable the IAB node 605-*a* to successfully decode each of the transmissions 610 even if there is timing or frequency misalignments between the transmissions 610 (e.g., between transmission 610-*a* and transmission 610-*b*).

In some examples, such as in downlink communications, the IAB node 605-*a* may receive one or more shared channel transmissions (e.g., PDSCH transmissions). For example, the IAB node 605-*a* may receive transmission 610-*a* and transmission 610-*b* from IAB node 605-*b* and IAB node 605-*c*, respectively, in the same time resources (e.g., in an FDM manner). In other examples, such as in uplink communications, the IAB node 605-*a* may transmit a shared channel transmission (e.g., a PUSCH transmission), a control channel transmission (e.g., a physical uplink control channel (PUCCH) transmission), or both. For example, the IAB node 605-*a* may send uplink transmissions to one or both of the IAB nodes 605-*b* and 605-*c* in the same frequency resources (e.g., in a time division multiplexing (TDM) manner). Such a communications scheme may enable efficient communications (e.g., in a system with downlink heavy traffic) where IAB node 605-*a* communicates with both IAB nodes 605-*b* and 605-*c* using the same communication beam (and, correspondingly, a single RF chain). Other variations of this scheme may be implemented by the IAB system. For example, the IAB node 605-*a* may receive downlink transmissions in a TDM manner, or transmit uplink transmissions in an FDM manner, or both.

Figure 7:
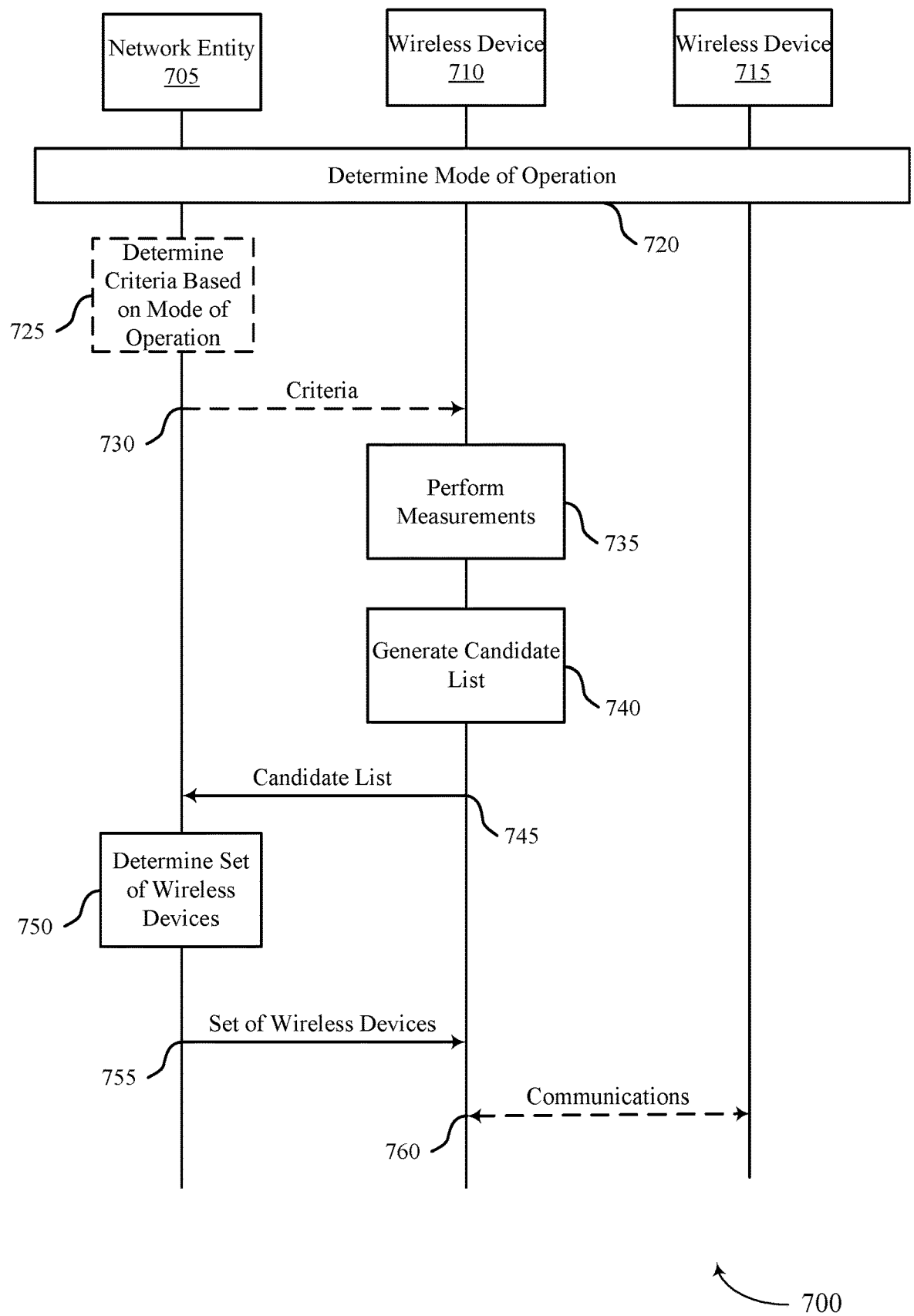
FIG. 7 illustrates an example of a process flow that supports beam direction selection for high pathloss mode operations in accordance with one or more aspects of the present disclosure.

FIG. 7 illustrates an example of a process flow 700 that supports beam direction selection for high pathloss mode operations in accordance with one or more aspects of the present disclosure. The process flow 700 may illustrate an example beam selection scheme for efficient signaling in high pathloss mode operations. For example, network entity 705 may be an example of a network entity (e.g., a CU as described with reference to FIGS. 2-6). Wireless devices 710 and 715 may be examples of one or more IAB nodes as described with reference to FIGS. 2-6 (e.g., parent nodes, child nodes, IAB donor nodes 210, IAB relay nodes 215, IAB nodes 505 or 605, base stations 105, UEs 115, etc.). In some cases, some operations illustrated as being performed by network entity 705 may be performed by wireless devices 710 and 715, or vice versa. Additionally, alternative examples of the following may be implemented, where some operations may be performed in a different order than described or are not performed at all. In some cases, operations may include additional features not mentioned below, or further processes or communications may be added.

At 720, wireless device 710, wireless device 715, network entity 705, or any combination thereof may determine a mode of operation. For example, the wireless device 710 may measure a pathloss of communications with the wireless device 715 and may determine to switch to a high pathloss mode as described with respect to FIGS. 3-6. In some examples, the wireless device 710 may transmit an indication, to the network entity 705 or the wireless device 715, that the wireless device 710 is operating in a high pathloss operation mode.

At 725, the network entity 705 may determine criteria based on the determined mode of operation. In some examples, the criteria may include information for generating a candidate list (e.g., the candidate list described with respect to FIG. 5). For example, the criteria may include an indication of a number of wireless devices to include in the candidate list (e.g., an indication to report a number of IAB nodes in the candidate list). Additionally or alternatively, the criteria may include an indication of one or more threshold values, one or more beam parameters, or some combination thereof. The wireless device 710 may use the one or more threshold values to determine whether to include a wireless device in the candidate list (e.g., based on one or more measurements satisfying or failing to satisfy the one or more threshold values). The criteria may also include any other information pertinent for determining the candidate list. At 730, the network entity 705 may transmit the criteria to the wireless device 710. Additionally or alternatively, the wireless device 710 may be configured with the criteria.

At 735, the wireless device 710 may perform measurements. For example, the wireless device 710 may receive signals from neighboring wireless devices (e.g., including wireless device 715) and may perform measurements on the signals. In some examples, the measurements for a signal may be associated with a wireless device and may include power metrics (e.g., from an RSRP measurement), spatial metrics (e.g., spatial distance, spatial separation, angular separation, etc.), and the like. In some cases, the wireless device 710 may determine the spatial metrics based on location information for the neighboring wireless devices (e.g., global positioning system (GPS) information received from the network). In some aspects, the measurements determined by the wireless device 710 may include angular separations for pairs or groups of neighboring wireless devices. An angular separation may be in terms of an AoA or an AoD. The AoA may be a measure of an angle of an arriving transmission from another wireless device (e.g., wireless device 715). The AoD may be a measure of an AoD for departing transmissions from the wireless device 710 to another wireless device (e.g., wireless device 715).

At 740, the wireless device 710 may generate a candidate list. The candidate list may include a list of one or more potential wireless devices for communication with wireless device 710 (e.g., including wireless device 715). The wireless devices for communication may be a set of wireless devices (e.g., out of neighboring wireless devices, such as IAB nodes within a certain distance, with a certain signal strength, discovered by the wireless device 710 using discovery signaling, etc.). In some examples, the wireless device 710 may determine the candidate list based on the criteria (e.g., an indication of one or more threshold values), the determined mode of operation, or both. The wireless device 710 may determine that one or more measurements (e.g., performed at 735) satisfy the one or more threshold values and may include the associated wireless device(s) in the candidate list (e.g., wireless device 715). At 745, the wireless device 710 may transmit the candidate list to the network entity 705. The wireless device 710 may also report communications information, such as a number of RF chains included in the wireless device 710, a number of communication beams (e.g., associated with each RF chain) to use for communications with the one or more wireless devices listed in the candidate list (e.g., two communications beams associated with two RF chains), a width of each communication beam, etc.

In some examples, the candidate list may also include the measurements (e.g., power metrics or spatial metrics) associated with each reported wireless device (e.g., wireless device 715). In other examples, the candidate list may include one or more groups of wireless devices. In some cases, each group may include one or more wireless devices that may be supported by a single communication beam at wireless device 710. The wireless device 710 may determine the one or more groups based on determining that a measurement of one or more wireless devices satisfies a threshold (e.g., indicated by the network entity 705). For example, a spatial separation measurement, such as an angular separation metric between two wireless devices, may satisfy a threshold (e.g., an angular separation threshold). The wireless device 710 may determine that a single communication beam can support communications with multiple wireless devices based on the satisfied angular separation threshold (and, in some cases, a selected beam width, a beam strength, a beam angle, etc.). The wireless device 710 may report the wireless devices as a group in the candidate list.

At 750, the network entity 705 may determine a set of one or more wireless devices for communication with wireless device 710. In some examples, the network entity 705 may determine the set of wireless devices based on the received candidate list. For example, the network entity 705 may determine which wireless devices or groups of wireless devices may be paired with the communication beams of wireless device 710 (e.g., if the groups of wireless devices are reported in the candidate list).

In some cases, the network entity 705 may receive the candidate list including the list of reported wireless devices. The candidate list may also include measurements associated with the reported wireless devices (e.g., an angular separation between two or more wireless devices) or other pertinent information (e.g., a beam width of each of the communication beams for communicating with one or more wireless devices). The network entity 705 may use the received measurements, information, or both to determine the groups of wireless devices (e.g., the wireless devices that can be supported with the same RF chain or communication beam). The network entity 705 may determine the set of wireless devices for communication with wireless device 710 based on the determined groups. At 755, the network entity 705 may transmit the selected set of wireless devices to wireless device 710 (e.g., a subset of the candidates reported in the candidate list).

At 760, the wireless device 710 may communicate with one or more wireless devices from the set of wireless devices. For example, the wireless device 710 may communicate with the wireless device 715. In some examples, communications with the wireless device 715 may utilize the same communication beam or RF chain as communications with another wireless device (e.g., based on the angular separation of the wireless device 715 and the other wireless device satisfying an angular separation threshold). In some cases, the wireless device 710 may receive FDM transmissions (such as transmissions 610-a and 610-b with reference to FIG. 6) from the wireless device 715 and the other device.

Figure 8:
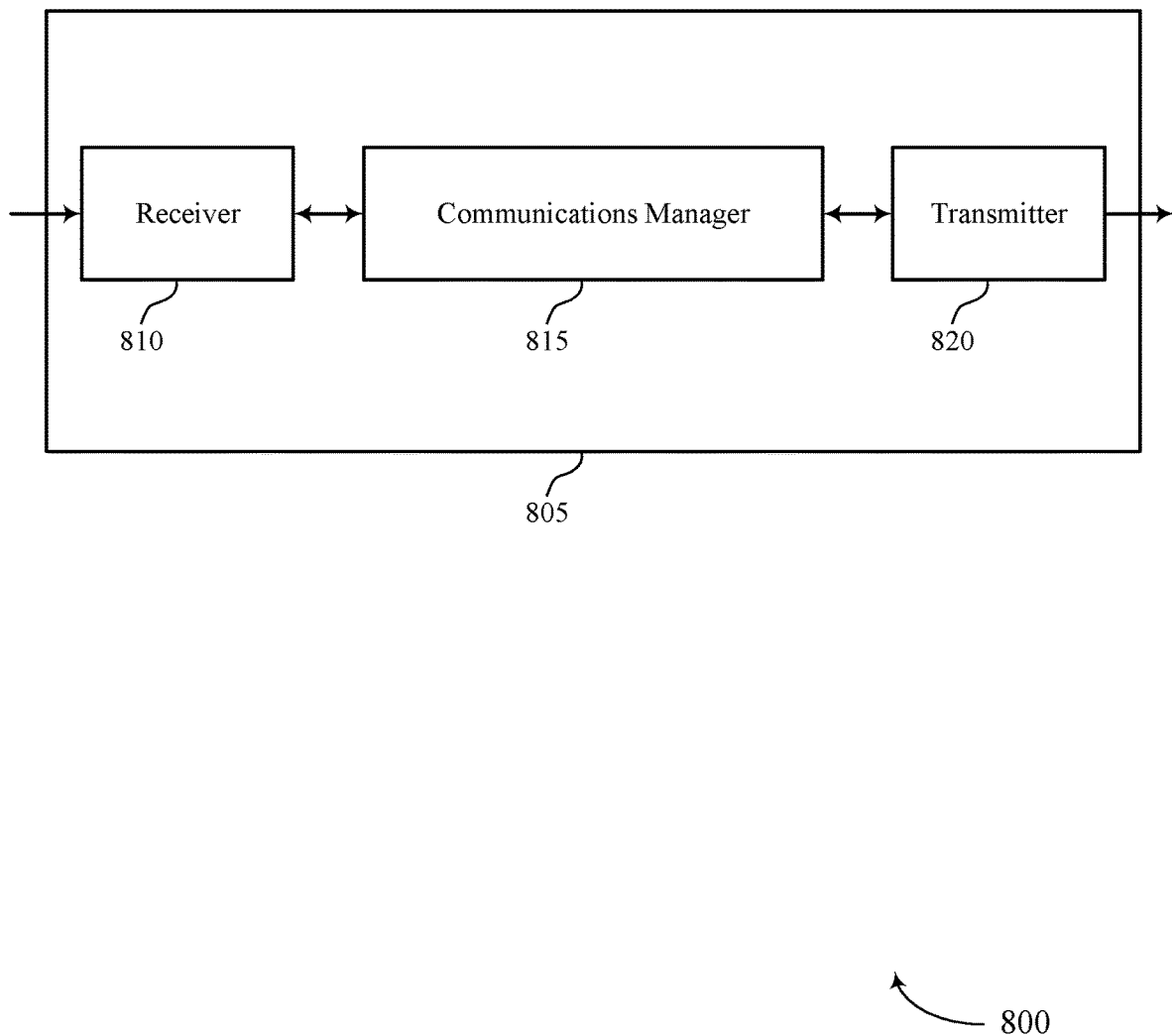
FIGS. 8 and 9 show block diagrams of devices that support beam direction selection for high pathloss mode operations in accordance with one or more aspects of the present disclosure.

FIG. 8 shows a block diagram 800 of a device 805 that supports beam direction selection for high pathloss mode operations in accordance with one or more aspects of the present disclosure. The device 805 may be an example of aspects of an IAB node (e.g., a base station 105) as described herein. The device 805 may include a receiver 810, a communications manager 815, and a transmitter 820. The device 805 may also include a processor. Each of these components may be in communication with one another (e.g., via one or more buses).

The receiver 810 may receive information such as packets, user data, or control information associated with various information channels (e.g., control channels, data channels, and information related to beam direction selection for high pathloss mode operations, etc.). Information may be passed on to other components of the device 805. The receiver 810 may be an example of aspects of the transceiver 1120 described with reference to FIG. 11. The receiver 810 may utilize a single antenna or a set of antennas.

The communications manager 815 may be implemented by a first wireless device. The communications manager 815 may select a set of wireless devices as communication candidates based on a first mode for the first wireless device, where the set of wireless devices includes at least two wireless devices with an angular separation with reference to the first wireless device that is less than an angular separation threshold associated with the first mode. The communications manager 815 may report, to a network entity, a candidate list including the set of wireless devices, receive, from the network entity, a subset of the set of wireless devices based on the candidate list, and communicate with the subset of the set of wireless devices using one or more communication beams, where the communicating includes communicating with the at least two wireless devices using a single communication beam of the one or more communication beams based on the angular separation being less than the angular separation threshold. The communications manager 815 may be an example of aspects of the communications manager 1110 described herein.

The communications manager 815, or its sub-components, may be implemented in hardware, code (e.g., software or firmware) executed by a processor, or any combination thereof. If implemented in code executed by a processor, the functions of the communications manager 815, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 815, or its sub-components, may be physically located at various positions, including being distributed such that portions of functions are implemented at different physical locations by one or more physical components. In some examples, the communications manager 815, or its sub-components, may be a separate and distinct component in accordance with various aspects of the present disclosure. In some examples, the communications manager 815, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 820 may transmit signals generated by other components of the device 805. In some examples, the transmitter 820 may be collocated with a receiver 810 in a transceiver module. For example, the transmitter 820 may be an example of aspects of the transceiver 1120 described with reference to FIG. 11. The transmitter 820 may utilize a single antenna or a set of antennas.

Figure 9:
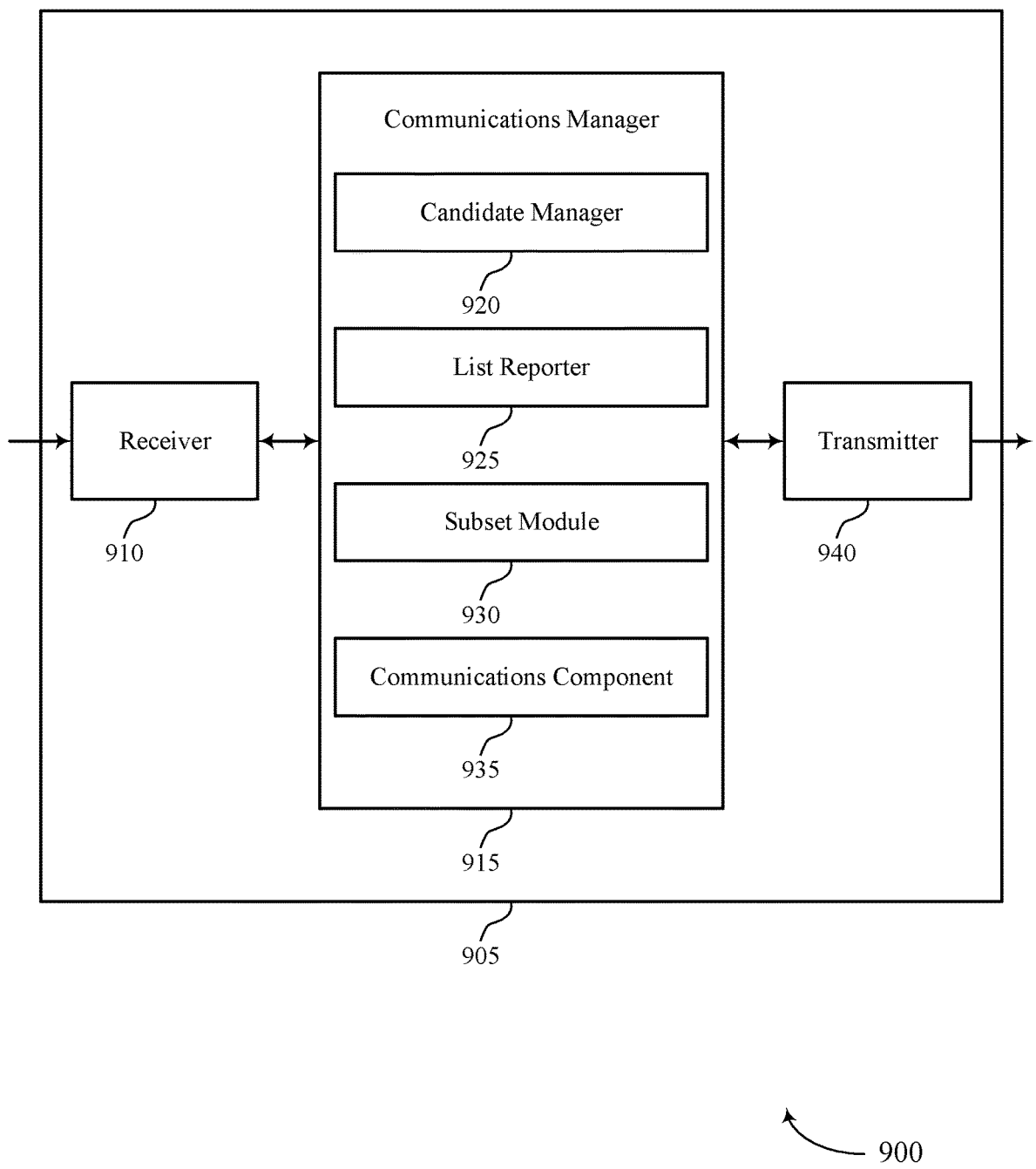

FIG. 9 shows a block diagram 900 of a device 905 that supports beam direction selection for high pathloss mode operations in accordance with one or more aspects of the present disclosure. The device 905 may be an example of aspects of a device 805, an IAB node, or a base station 105 as described herein. The device 905 may include a receiver 910, a communications manager 915, and a transmitter 940. The device 905 may also include a processor. Each of these components may be in communication with one another (e.g., via one or more buses).

The receiver 910 may receive information such as packets, user data, or control information associated with various information channels (e.g., control channels, data channels, and information related to beam direction selection for high pathloss mode operations, etc.). Information may be passed on to other components of the device 905. The receiver 910 may be an example of aspects of the transceiver 1120 described with reference to FIG. 11. The receiver 910 may utilize a single antenna or a set of antennas.

The communications manager 915 may be an example of aspects of the communications manager 815 as described herein. The communications manager 915 may include a candidate manager 920, a list reporter 925, a subset module 930, and a communications component 935. The communications manager 915 may be an example of aspects of the communications manager 1110 described herein and may be implemented by a first wireless device.

The candidate manager 920 may select a set of wireless devices as communication candidates based on a first mode for the first wireless device, where the set of wireless devices includes at least two wireless devices with an angular separation with reference to the first wireless device that is less than an angular separation threshold associated with the first mode. The list reporter 925 may report, to a network entity, a candidate list including the set of wireless devices.

The subset module 930 may receive, from the network entity, a subset of the set of wireless devices based on the candidate list. The communications component 935 may communicate with the subset of the set of wireless devices using one or more communication beams, where the communicating includes communicating with the at least two wireless devices using a single communication beam of the one or more communication beams based on the angular separation being less than the angular separation threshold.

The transmitter 940 may transmit signals generated by other components of the device 905. In some examples, the transmitter 940 may be collocated with a receiver 910 in a transceiver module. For example, the transmitter 940 may be an example of aspects of the transceiver 1120 described with reference to FIG. 11. The transmitter 940 may utilize a single antenna or a set of antennas.

Figure 10:
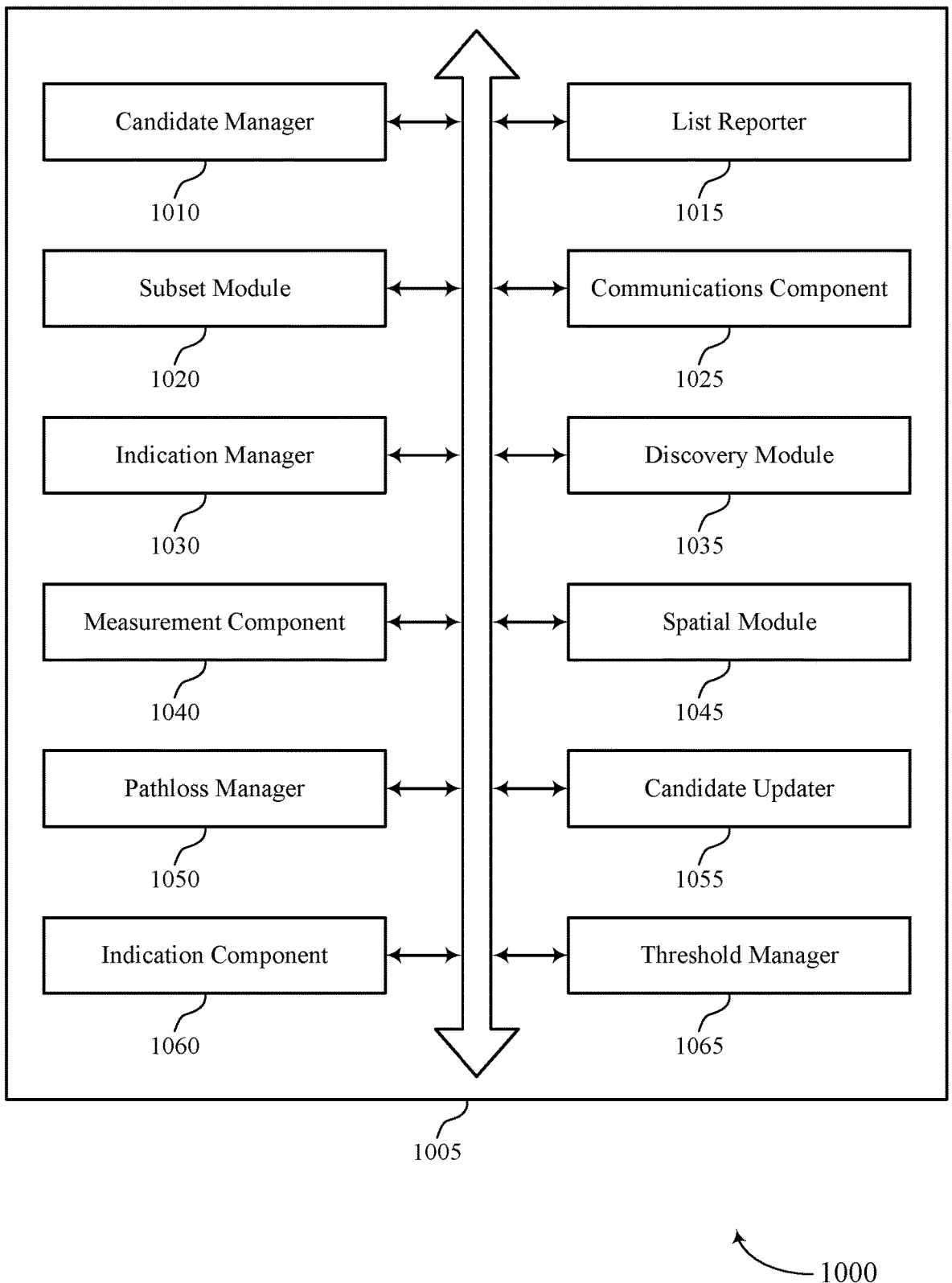
FIG. 10 shows a block diagram of a communications manager that supports beam direction selection for high pathloss mode operations in accordance with one or more aspects of the present disclosure.

FIG. 10 shows a block diagram 1000 of a communications manager 1005 that supports beam direction selection for high pathloss mode operations in accordance with one or more aspects of the present disclosure. The communications manager 1005 may be an example of aspects of a communications manager 815, a communications manager 915, or a communications manager 1110 described herein. The communications manager 1005 may include a candidate manager 1010, a list reporter 1015, a subset module 1020, a communications component 1025, an indication manager 1030, a discovery module 1035, a measurement component 1040, a spatial module 1045, a pathloss manager 1050, a candidate updater 1055, an indication component 1060, and a threshold manager 1065. Each of these modules may communicate, directly or indirectly, with one another (e.g., via one or more buses). The communications manager 1005 may be implemented by a first wireless device.

The candidate manager 1010 may select a set of wireless devices as communication candidates based on a first mode for the first wireless device, where the set of wireless devices includes at least two wireless devices with an angular separation with reference to the first wireless device that is less than an angular separation threshold associated with the first mode. In some examples, the candidate manager 1010 may select the set of wireless devices as communication candidates based on received power measurements for the set of wireless devices. In some examples, the candidate manager 1010 may also select the set of wireless devices as communication candidates based on a maximum number of communication candidates to report. In some cases, the first wireless device or the set of wireless devices or both include DUs or mobile terminals (e.g., UEs) or both in an IAB system.

The list reporter 1015 may report, to a network entity, a candidate list including the set of wireless devices. In some cases, the network entity includes a CU in the IAB system. In some examples, the list reporter 1015 may report, to the network entity, a set of spatial separation metrics indicating with which wireless devices of the set of wireless devices the first wireless device supports communication using a same communication beam. Additionally or alternatively, the list reporter 1015 may report, to the network entity, one or more groups of wireless devices of the set of wireless devices, where each group of the one or more groups of wireless devices includes a set of wireless devices with which the first wireless device supports communication using a same communication beam.

The subset module 1020 may receive, from the network entity, a subset of the set of wireless devices based on the candidate list. The communications component 1025 may communicate with the subset of the set of wireless devices using one or more communication beams, where the communicating includes communicating with the at least two wireless devices using a single communication beam of the one or more communication beams based on the angular separation being less than the angular separation threshold. In some examples, the communications component 1025 may FDM communications with the at least two wireless devices. In some cases, each communication beam of the one or more communication beams corresponds to a different RF chain of the first wireless device. In some of these cases, the communications component 1025 may determine a number of communication beams for the communicating with the subset of the set of wireless devices based on a number of RF chains at the first wireless device.

The indication manager 1030 may receive, from the network entity, an indication of the angular separation threshold associated with the first mode.

The discovery module 1035 may discover a set of wireless devices. The measurement component 1040 may measure an AoA or AoD or both for communications with each wireless device of the set of wireless devices. The spatial module 1045 may determine angular separations for one or more pairs of wireless devices of the set of wireless devices based on the measured AoA or AoD or both, where the selecting is based on the determined angular separations and the set of wireless devices is a subset of the set of wireless devices.

The pathloss manager 1050 may activate the first mode for the first wireless device based on a measurement (e.g., a pathloss measurement). In some examples, the first mode may include a high pathloss mode (e.g., an activated high pathloss mode). In some examples, the pathloss manager 1050 may deactivate the first mode for the first wireless device based on a measurement. In some of these examples, the candidate updater 1055 may select an updated set of wireless devices as communication candidates based on the deactivated first mode, where each wireless device of the updated set of wireless devices has an angular separation with each other wireless device of the updated set of wireless devices with reference to the first wireless device that is greater than an angular separation threshold associated with the deactivated first mode. In some examples, the list reporter 1015 may report, to the network entity, an updated candidate list including the updated set of wireless devices. In some cases, the angular separation threshold associated with the activated first mode is equal to the angular separation threshold associated with the deactivated first mode.

The indication component 1060 may receive, from the network entity, an indication of the maximum number of communication candidates to report. The threshold manager 1065 may determine the angular separation threshold associated with the first mode based on a beam characteristic of the one or more communication beams.

Figure 11:
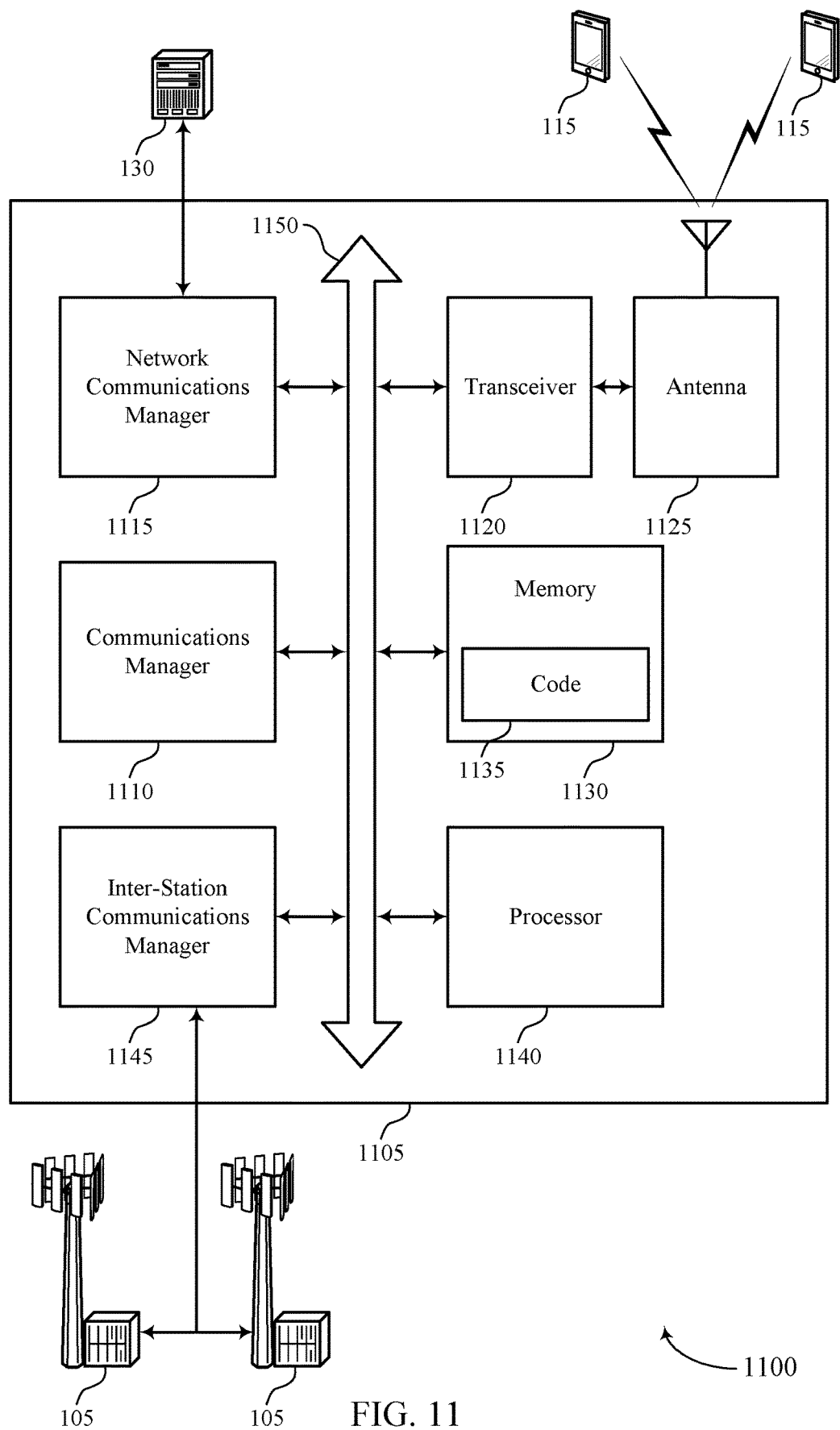
FIG. 11 shows a diagram of a system including a device that supports beam direction selection for high pathloss mode operations in accordance with one or more aspects of the present disclosure.

FIG. 11 shows a diagram of a system 1100 including a device 1105 that supports beam direction selection for high pathloss mode operations in accordance with one or more aspects of the present disclosure. The device 1105 may be an example of or include the components of device 805, device 905, an IAB node, or a base station 105 as described herein. The device 1105 may include components for bi-directional voice and data communications including components for transmitting and receiving communications, including a communications manager 1110, a network communications manager 1115, a transceiver 1120, an antenna 1125, memory 1130, a processor 1140, and an inter-station communications manager 1145. These components may be in electronic communication via one or more buses (e.g., bus 1150).

The device 1105 may be an example of a first wireless device (e.g., an IAB node in an IAB system). The communications manager 1110 may select a set of wireless devices as communication candidates based on a first mode for the first wireless device, where the set of wireless devices includes at least two wireless devices with an angular separation with reference to the first wireless device that is less than an angular separation threshold associated with the first mode, report, to a network entity, a candidate list including the set of wireless devices, receive, from the network entity, a subset of the set of wireless devices based on the candidate list, and communicate with the subset of the set of wireless devices using one or more communication beams, where the communicating includes communicating with the at least two wireless devices using a single communication beam of the one or more communication beams based on the angular separation being less than the angular separation threshold.

The network communications manager 1115 may manage communications with the core network 130 (e.g., via one or more wired backhaul links). For example, the network communications manager 1115 may manage the transfer of data communications for client devices, such as one or more UEs 115.

The transceiver 1120 may communicate bi-directionally, via one or more antennas, wired, or wireless links as described above. For example, the transceiver 1120 may represent a wireless transceiver and may communicate bi-directionally with another wireless transceiver. The transceiver 1120 may also include a modem to modulate the packets and provide the modulated packets to the antennas for transmission, and to demodulate packets received from the antennas.

In some cases, the wireless device may include a single antenna 1125. However, in some cases the device may have more than one antenna 1125, which may be capable of concurrently transmitting or receiving multiple wireless transmissions.

The memory 1130 may include random-access memory (RAM), read-only memory (ROM), or a combination thereof. The memory 1130 may store computer-readable code 1135 including instructions that, when executed by a processor (e.g., the processor 1140) cause the device to perform various functions described herein. In some cases, the memory 1130 may contain, among other things, a basic I/O system (BIOS) which may control basic hardware or software operation such as the interaction with peripheral components or devices.

The processor 1140 may include an intelligent hardware device (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some cases, a memory controller may be integrated into processor 1140. The processor 1140 may be configured to execute computer-readable instructions stored in a memory (e.g., the memory 1130) to cause the device 1105 to perform various functions (e.g., functions or tasks supporting beam direction selection for high pathloss mode operations).

The inter-station communications manager 1145 may manage communications with other base station 105 and may include a controller or scheduler for controlling communications with UEs 115 in cooperation with other base stations 105. For example, the inter-station communications manager 1145 may coordinate scheduling for transmissions to UEs 115 for various interference mitigation techniques such as beamforming or joint transmission. In some examples, the inter-station communications manager 1145 may provide an X2 interface within an LTE/LTE-A wireless communication network technology to provide communication between base stations 105.

The code 1135 may include instructions to implement aspects of the present disclosure, including instructions to support wireless communications. The code 1135 may be stored in a non-transitory computer-readable medium such as system memory or other type of memory. In some cases, the code 1135 may not be directly executable by the processor 1140 but may cause a computer (e.g., when compiled and executed) to perform functions described herein.

Figure 12:
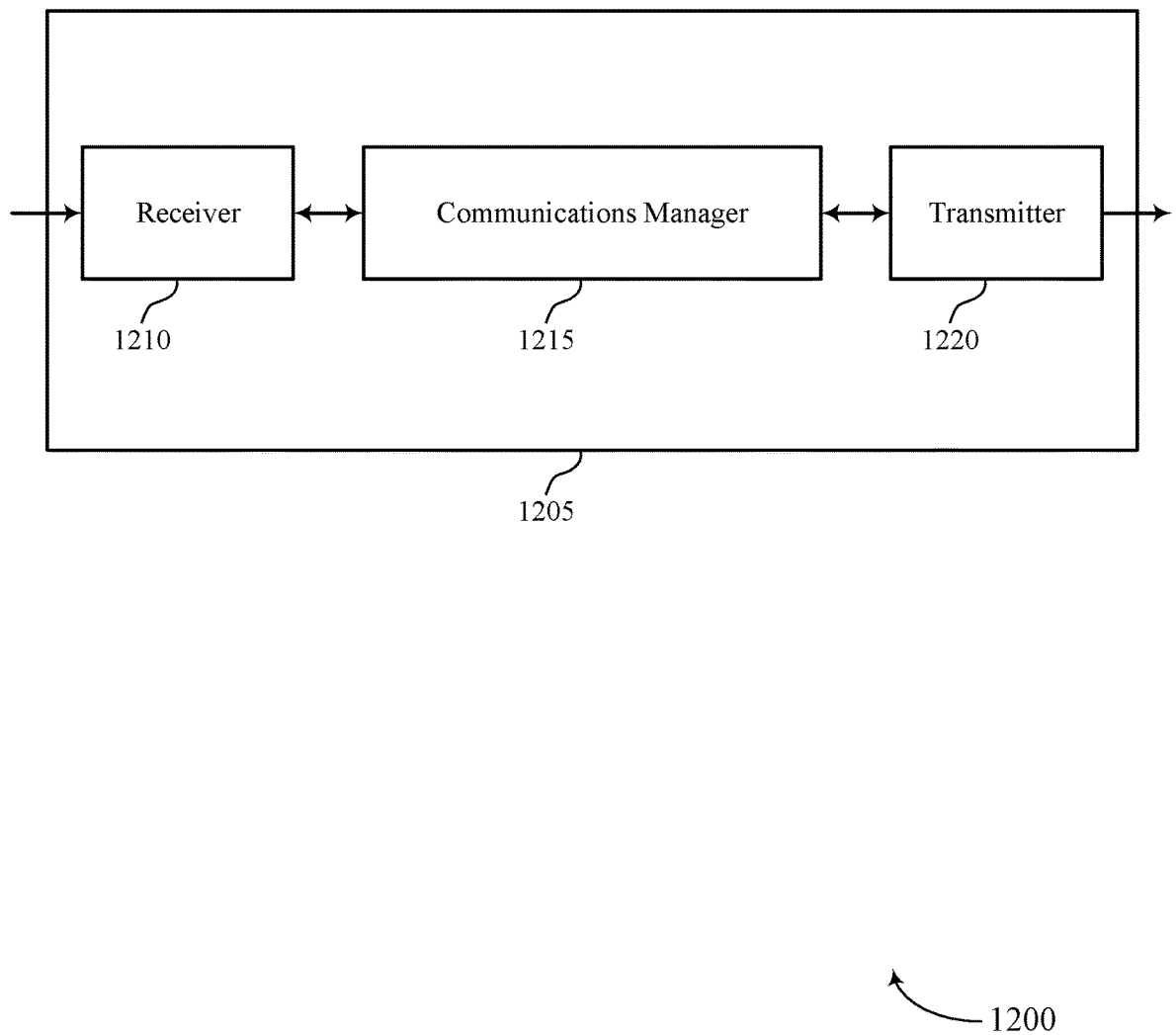
FIGS. 12 and 13 show block diagrams of devices that support beam direction selection for high pathloss mode operations in accordance with one or more aspects of the present disclosure.

FIG. 12 shows a block diagram 1200 of a device 1205 that supports beam direction selection for high pathloss mode operations in accordance with one or more aspects of the present disclosure. The device 1205 may be an example of aspects of a network entity (e.g., a CU) as described herein. The device 1205 may include a receiver 1210, a communications manager 1215, and a transmitter 1220. The device 1205 may also include a processor. Each of these components may be in communication with one another (e.g., via one or more buses).

The receiver 1210 may receive information such as packets, user data, or control information associated with various information channels (e.g., control channels, data channels, and information related to beam direction selection for high pathloss mode operations, etc.). Information may be passed on to other components of the device 1205. The receiver 1210 may be an example of aspects of the transceiver 1520 described with reference to FIG. 15. The receiver 1210 may utilize a single antenna or a set of antennas.

The communications manager 1215 may receive, from a first wireless device, a candidate list including a set of wireless devices, select a subset of the set of wireless devices for communication with the first wireless device based on a first mode for the first wireless device, where the subset of the set of wireless devices includes at least two wireless devices with an angular separation with reference to the first wireless device that is less than an angular separation threshold associated with the first mode, and transmit, to the first wireless device, the subset of the set of wireless devices. The communications manager 1215 may be an example of aspects of the communications manager 1510 described herein.

The communications manager 1215, or its sub-components, may be implemented in hardware, code (e.g., software or firmware) executed by a processor, or any combination thereof. If implemented in code executed by a processor, the functions of the communications manager 1215, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

The communications manager 1215, or its sub-components, may be physically located at various positions, including being distributed such that portions of functions are implemented at different physical locations by one or more physical components. In some examples, the communications manager 1215, or its sub-components, may be a separate and distinct component in accordance with various aspects of the present disclosure. In some examples, the communications manager 1215, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 1220 may transmit signals generated by other components of the device 1205. In some examples, the transmitter 1220 may be collocated with a receiver 1210 in a transceiver module. For example, the transmitter 1220 may be an example of aspects of the transceiver 1520 described with reference to FIG. 15. The transmitter 1220 may utilize a single antenna or a set of antennas.

Figure 13:
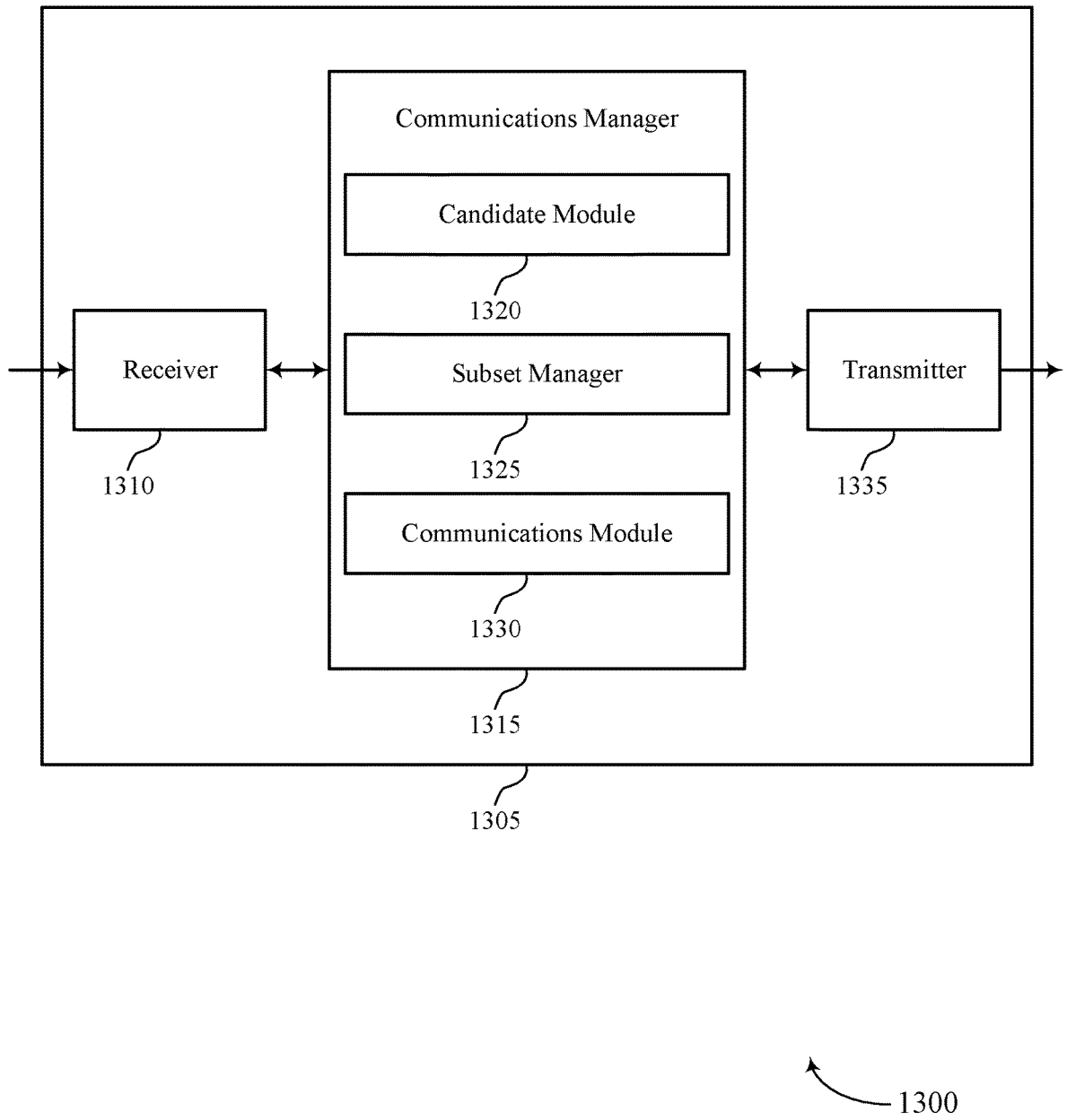

FIG. 13 shows a block diagram 1300 of a device 1305 that supports beam direction selection for high pathloss mode operations in accordance with one or more aspects of the present disclosure. The device 1305 may be an example of aspects of a device 1205 or a network entity (e.g., a CU) as described herein. The device 1305 may include a receiver 1310, a communications manager 1315, and a transmitter 1335. The device 1305 may also include a processor. Each of these components may be in communication with one another (e.g., via one or more buses).

The receiver 1310 may receive information such as packets, user data, or control information associated with various information channels (e.g., control channels, data channels, and information related to beam direction selection for high pathloss mode operations, etc.). Information may be passed on to other components of the device 1305. The receiver 1310 may be an example of aspects of the transceiver 1520 described with reference to FIG. 15. The receiver 1310 may utilize a single antenna or a set of antennas.

The communications manager 1315 may be an example of aspects of the communications manager 1215 as described herein. The communications manager 1315 may include a candidate module 1320, a subset manager 1325, and a communications module 1330. The communications manager 1315 may be an example of aspects of the communications manager 1510 described herein and may be implemented by a network entity.

The candidate module 1320 may receive, from a first wireless device, a candidate list including a set of wireless devices. The subset manager 1325 may select a subset of the set of wireless devices for communication with the first wireless device based on a first mode for the first wireless device, where the subset of the set of wireless devices includes at least two wireless devices with an angular separation with reference to the first wireless device that is less than an angular separation threshold associated with the first mode. The communications module 1330 may transmit, to the first wireless device, the subset of the set of wireless devices.

The transmitter 1335 may transmit signals generated by other components of the device 1305. In some examples, the transmitter 1335 may be collocated with a receiver 1310 in a transceiver module. For example, the transmitter 1335 may be an example of aspects of the transceiver 1520 described with reference to FIG. 15. The transmitter 1335 may utilize a single antenna or a set of antennas.

Figure 14:
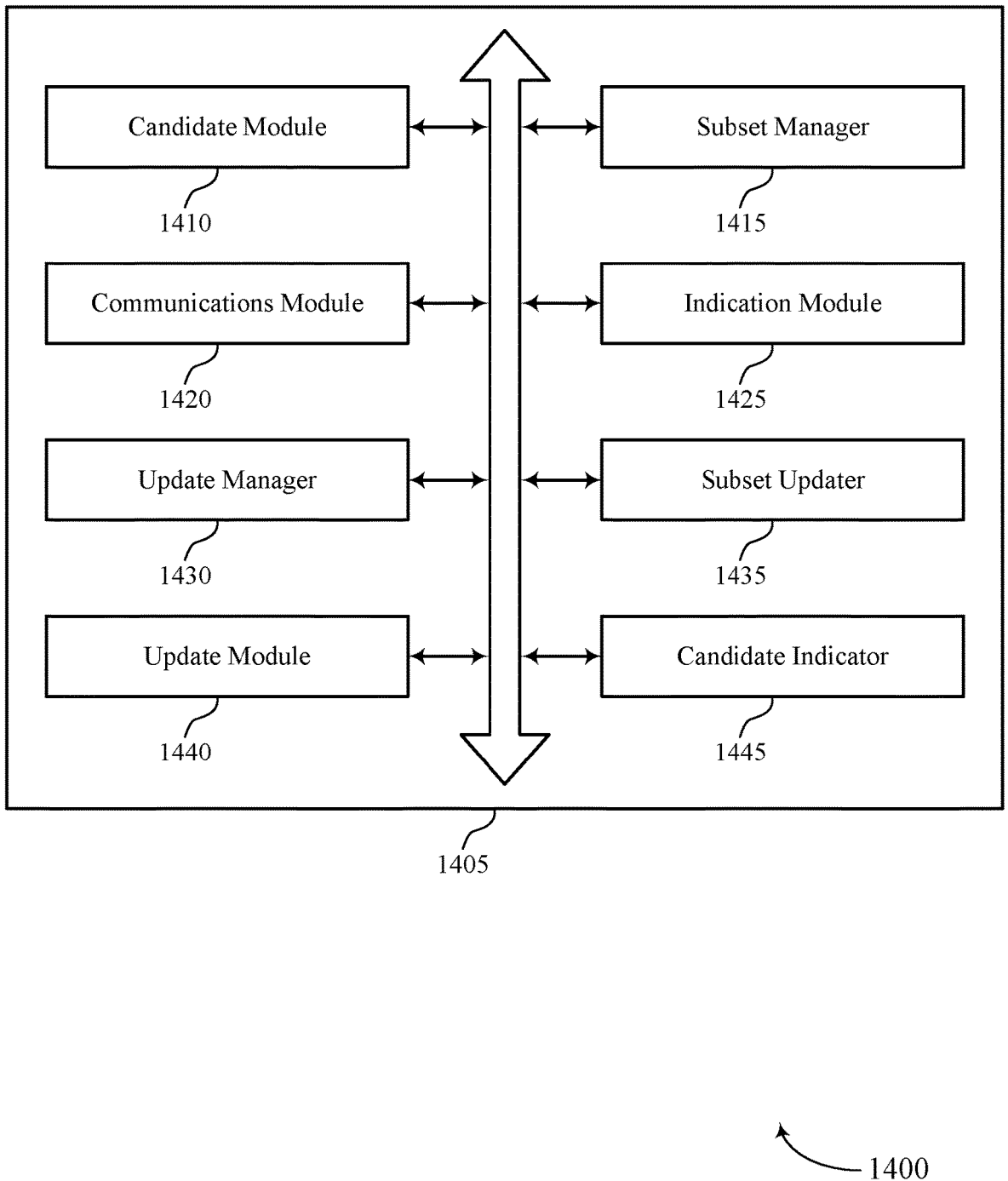
FIG. 14 shows a block diagram of a communications manager that supports beam direction selection for high pathloss mode operations in accordance with one or more aspects of the present disclosure.

FIG. 14 shows a block diagram 1400 of a communications manager 1405 that supports beam direction selection for high pathloss mode operations in accordance with one or more aspects of the present disclosure. The communications manager 1405 may be an example of aspects of a communications manager 1215, a communications manager 1315, or a communications manager 1510 described herein. The communications manager 1405 may include a candidate module 1410, a subset manager 1415, a communications module 1420, an indication module 1425, an update manager 1430, a subset updater 1435, an update module 1440, and a candidate indicator 1445. Each of these modules may communicate, directly or indirectly, with one another (e.g., via one or more buses). The communications manager 1405 may be implemented by a network entity, such as a CU.

The candidate module 1410 may receive, from a first wireless device, a candidate list including a set of wireless devices. In some examples, the candidate module 1410 may receive, from the first wireless device, a set of spatial separation metrics indicating with which wireless devices of the set of wireless devices the first wireless device supports communication using a same communication beam, where selecting a subset of the set of wireless devices is further based on the set of spatial separation metrics. Additionally or alternatively, the candidate module 1410 may receive, from the first wireless device, one or more groups of wireless devices of the set of wireless devices, where each group of the one or more groups of wireless devices includes a set of wireless devices with which the first wireless device supports communication using a same communication beam, where the selecting is further based on the one or more groups of wireless devices. Furthermore, in some examples, the candidate module 1410 may receive, from the first wireless device, a set of received power measurements for the set of wireless devices, where the selecting is further based on the set of received power measurements. In some cases, the first wireless device or the set of wireless devices or both include DUs or mobile terminals (e.g., UEs) or both in an IAB system.

The subset manager 1415 may select a subset of the set of wireless devices for communication with the first wireless device based on a first mode for the first wireless device, where the subset of the set of wireless devices includes at least two wireless devices with an angular separation with reference to the first wireless device that is less than an angular separation threshold associated with the first mode. In some examples, the subset manager 1415 may select the subset of the set of wireless devices such that a number of communication beams for the first wireless device to communicate with the subset of the set of wireless devices is less than or equal to a maximum number of supported communication beams for the first wireless device. In some cases, the maximum number of supported communication beams for the first wireless device corresponds to a number of RF chains at the first wireless device. In some cases, a number of wireless devices in the subset of the set of wireless devices is greater than the maximum number of supported communication beams for the first wireless device. The communications module 1420 may transmit, to the first wireless device, the subset of the set of wireless devices.

The indication module 1425 may transmit, to the first wireless device, an indication of the angular separation threshold associated with the first mode. In some examples, the first mode may include an activated high pathloss mode.

The update manager 1430 may receive, from the first wireless device, an updated candidate list including an updated set of wireless devices based on a second mode for the first wireless device. In some examples, the second mode includes a deactivated high pathloss mode. The subset updater 1435 may select an updated subset of the updated set of wireless devices for communication with the first wireless device based on the second mode for the first wireless device, where each wireless device of the updated subset of the updated set of wireless devices has an angular separation with each other wireless device of the updated subset of the updated set of wireless devices with reference to the first wireless device that is greater than an angular separation threshold associated with the second mode. In some cases, the angular separation threshold associated with the activated high pathloss mode is equal to the angular separation threshold associated with the second mode. The update module 1440 may transmit, to the first wireless device, the updated subset of the updated set of wireless devices.

The candidate indicator 1445 may transmit, to the first wireless device, an indication of a maximum number of communication candidates to report, where the candidate list is based on the maximum number of communication candidates to report.

Figure 15:
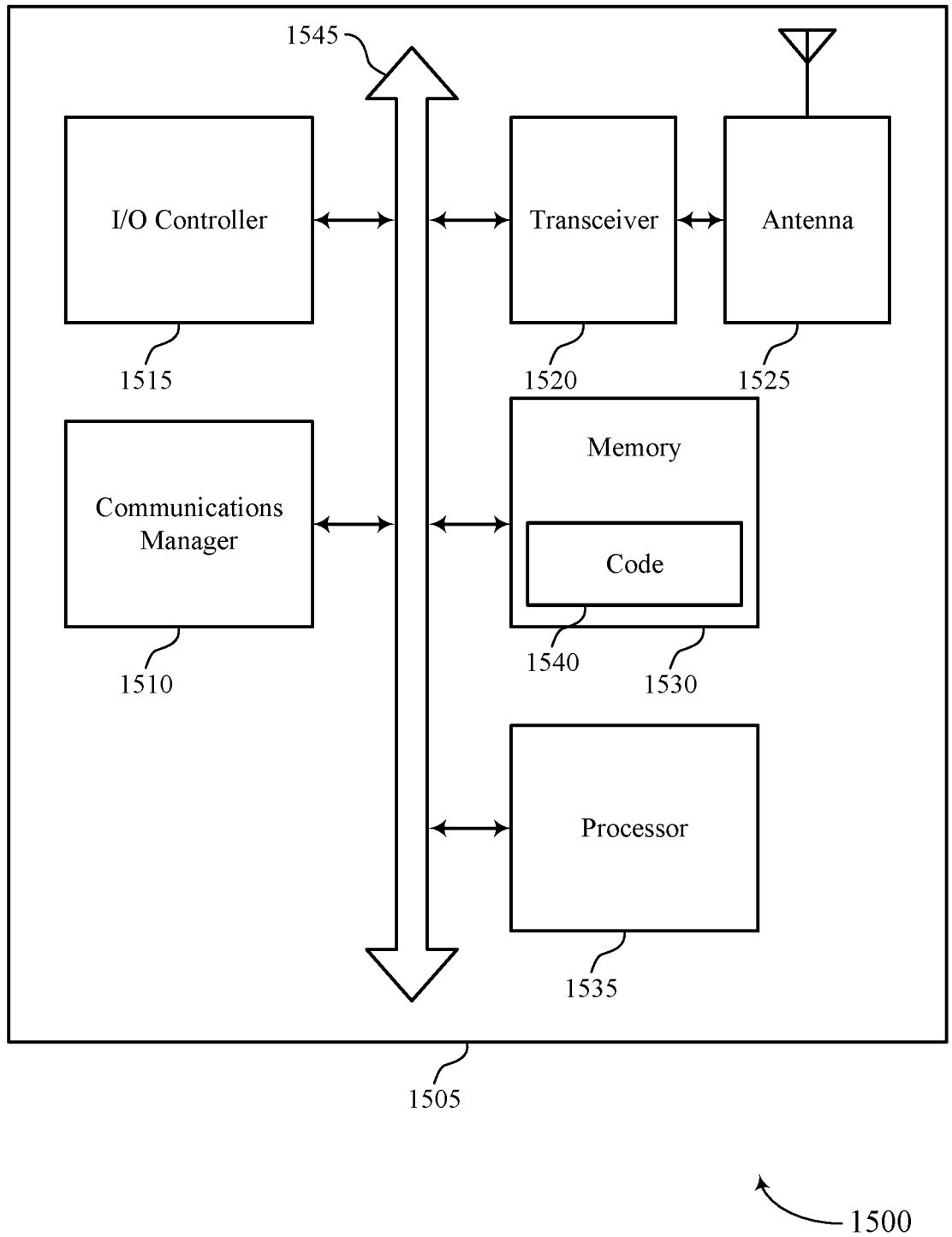
FIG. 15 shows a diagram of a system including a device that supports beam direction selection for high pathloss mode operations in accordance with one or more aspects of the present disclosure.

FIG. 15 shows a diagram of a system 1500 including a device 1505 that supports beam direction selection for high pathloss mode operations in accordance with one or more aspects of the present disclosure. The device 1505 may be an example of or include the components of device 1205, device 1305, or a network entity (e.g., a CU in an IAB system) as described herein. The device 1505 may include components for bi-directional voice and data communications including components for transmitting and receiving communications, including a communications manager 1510, an I/O controller 1515, a transceiver 1520, an antenna 1525, memory 1530, and a processor 1535. These components may be in electronic communication via one or more buses (e.g., bus 1545).

The communications manager 1510 may receive, from a first wireless device, a candidate list including a set of wireless devices, select a subset of the set of wireless devices for communication with the first wireless device based on a first mode for the first wireless device, where the subset of the set of wireless devices includes at least two wireless devices with an angular separation with reference to the first wireless device that is less than an angular separation threshold associated with the first mode, and transmit, to the first wireless device, the subset of the set of wireless devices.

The I/O controller 1515 may manage input and output signals for the device 1505. The I/O controller 1515 may also manage peripherals not integrated into the device 1505. In some cases, the I/O controller 1515 may represent a physical connection or port to an external peripheral. In some cases, the I/O controller 1515 may utilize an operating system such as iOS®, ANDROID®, MS-DOS®, MS-WINDOWS®, OS/2®, UNIX®, LINUX®, or another known operating system. In other cases, the I/O controller 1515 may represent or interact with a modem, a keyboard, a mouse, a touchscreen, or a similar device. In some cases, the I/O controller 1515 may be implemented as part of a processor. In some cases, a user may interact with the device 1505 via the I/O controller 1515 or via hardware components controlled by the I/O controller 1515.

The transceiver 1520 may communicate bi-directionally, via one or more antennas, wired, or wireless links as described above. For example, the transceiver 1520 may represent a wireless transceiver and may communicate bi-directionally with another wireless transceiver. The transceiver 1520 may also include a modem to modulate the packets and provide the modulated packets to the antennas for transmission, and to demodulate packets received from the antennas.

In some cases, the wireless device may include a single antenna 1525. However, in some cases the device may have more than one antenna 1525, which may be capable of concurrently transmitting or receiving multiple wireless transmissions.

The memory 1530 may include RAM and ROM. The memory 1530 may store computer-readable, computer-executable code 1540 including instructions that, when executed, cause the processor to perform various functions described herein. In some cases, the memory 1530 may contain, among other things, a BIOS which may control basic hardware or software operation such as the interaction with peripheral components or devices.

The processor 1535 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1535 may be configured to operate a memory array using a memory controller. In other cases, a memory controller may be integrated into the processor 1535. The processor 1535 may be configured to execute computer-readable instructions stored in a memory (e.g., the memory 1530) to cause the device 1505 to perform various functions (e.g., functions or tasks supporting beam direction selection for high pathloss mode operations).

The code 1540 may include instructions to implement aspects of the present disclosure, including instructions to support wireless communications. The code 1540 may be stored in a non-transitory computer-readable medium such as system memory or other type of memory. In some cases, the code 1540 may not be directly executable by the processor 1535 but may cause a computer (e.g., when compiled and executed) to perform functions described herein.

Figure 16:
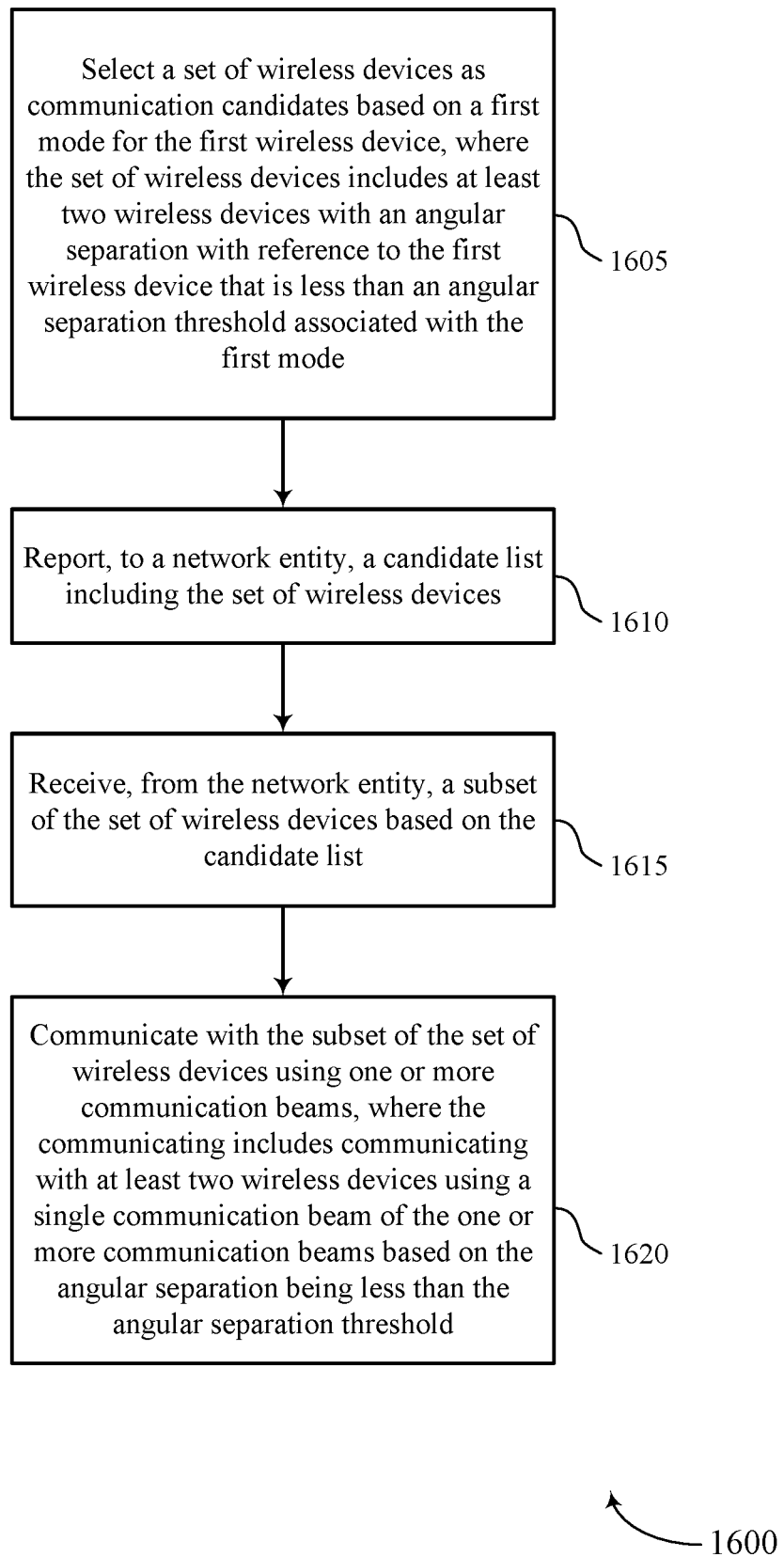
FIGS. 16 through 19 show flowcharts illustrating methods that support beam direction selection for high pathloss mode operations in accordance with one or more aspects of the present disclosure.

FIG. 16 shows a flowchart illustrating a method 1600 that supports beam direction selection for high pathloss mode operations in accordance with one or more aspects of the present disclosure. The operations of method 1600 may be implemented by an IAB node (e.g., a first wireless device, such as a base station 105) or its components as described herein. For example, the operations of method 1600 may be performed by a communications manager as described with reference to FIGS. 8 through 11. In some examples, a first wireless device may execute a set of instructions to control the functional elements of the first wireless device to perform the functions described below. Additionally or alternatively, a first wireless device may perform aspects of the functions described below using special-purpose hardware.

At 1605, the first wireless device may select a set of wireless devices as communication candidates based on a first mode for the first wireless device, where the set of wireless devices includes at least two wireless devices with an angular separation with reference to the first wireless device that is less than an angular separation threshold associated with the first mode. The operations of 1605 may be performed according to the methods described herein. In some examples, aspects of the operations of 1605 may be performed by a candidate manager as described with reference to FIGS. 8 through 11.

At 1610, the first wireless device may report, to a network entity, a candidate list including the set of wireless devices. The operations of 1610 may be performed according to the methods described herein. In some examples, aspects of the operations of 1610 may be performed by a list reporter as described with reference to FIGS. 8 through 11.

At 1615, the first wireless device may receive, from the network entity, a subset of the set of wireless devices based on the candidate list. The operations of 1615 may be performed according to the methods described herein. In some examples, aspects of the operations of 1615 may be performed by a subset module as described with reference to FIGS. 8 through 11.

At 1620, the first wireless device may communicate with the subset of the set of wireless devices using one or more communication beams, where the communicating includes communicating with the at least two wireless devices using a single communication beam of the one or more communication beams based on the angular separation being less than the angular separation threshold. The operations of 1620 may be performed according to the methods described herein. In some examples, aspects of the operations of 1620 may be performed by a communications component as described with reference to FIGS. 8 through 11.

Figure 17:
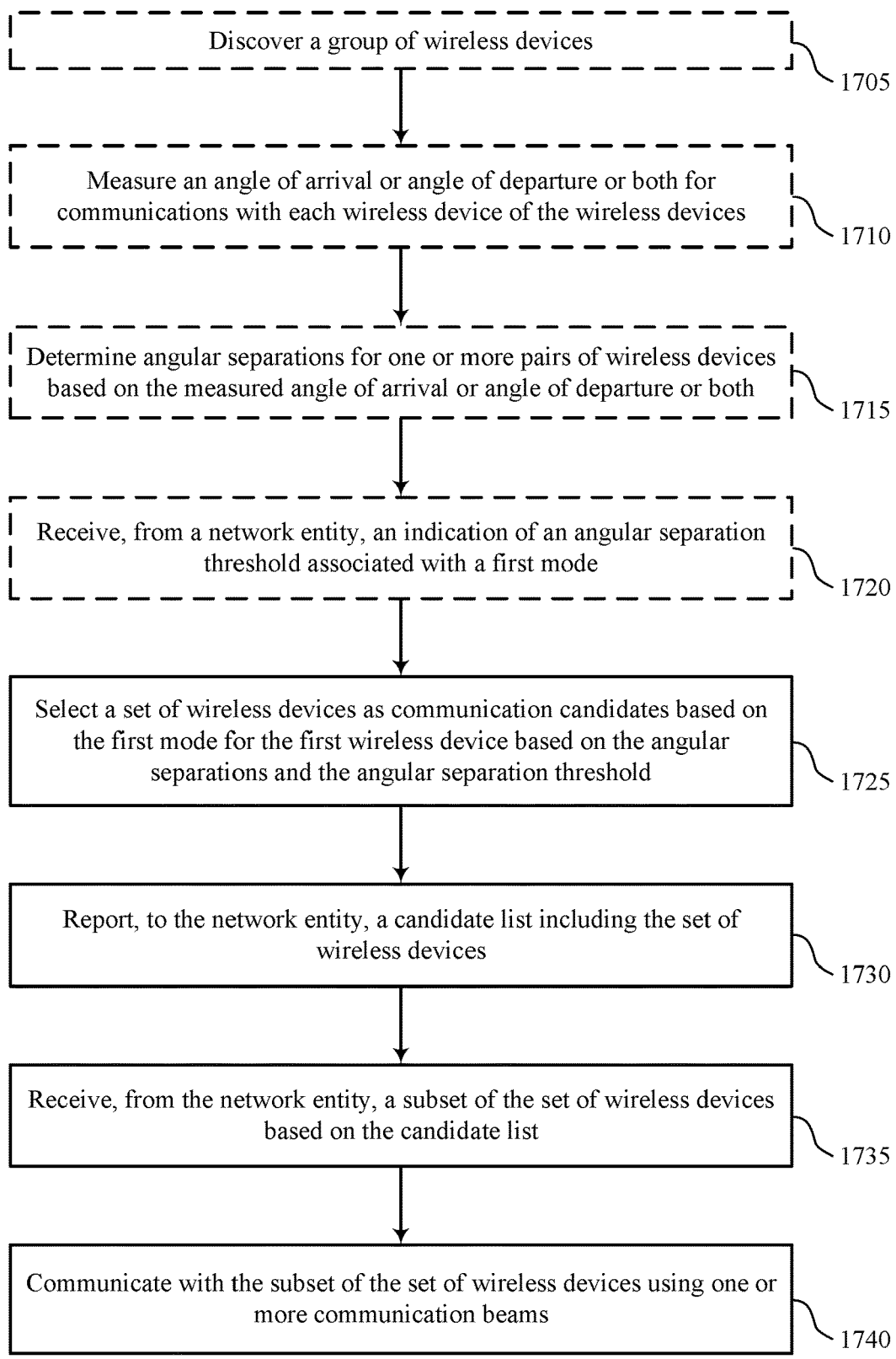

FIG. 17 shows a flowchart illustrating a method 1700 that supports beam direction selection for high pathloss mode operations in accordance with one or more aspects of the present disclosure. The operations of method 1700 may be implemented by an IAB node (e.g., a first wireless device, such as a base station 105) or its components as described herein. For example, the operations of method 1700 may be performed by a communications manager as described with reference to FIGS. 8 through 11. In some examples, a first wireless device may execute a set of instructions to control the functional elements of the first wireless device to perform the functions described below. Additionally or alternatively, a first wireless device may perform aspects of the functions described below using special-purpose hardware.

At 1705, the first wireless device may discover a group of wireless devices. The operations of 1705 may be performed according to the methods described herein. In some examples, aspects of the operations of 1705 may be performed by a discovery module as described with reference to FIGS. 8 through 11.

At 1710, the first wireless device may measure an AoA or AoD or both for communications with each wireless device of the group of wireless devices. The operations of 1710 may be performed according to the methods described herein. In some examples, aspects of the operations of 1710 may be performed by a measurement component as described with reference to FIGS. 8 through 11.

At 1715, the first wireless device may determine angular separations for one or more pairs of wireless devices of the group of wireless devices based on the measured AoA or AoD or both. The operations of 1715 may be performed according to the methods described herein. In some examples, aspects of the operations of 1715 may be performed by a spatial module as described with reference to FIGS. 8 through 11.

At 1720, the first wireless device may receive, from a network entity, an indication of an angular separation threshold associated with a first mode. The operations of 1720 may be performed according to the methods described herein. In some examples, aspects of the operations of 1720 may be performed by an indication manager as described with reference to FIGS. 8 through 11.

At 1725, the first wireless device may select a set of wireless devices as communication candidates based on the first mode for the first wireless device, where the set of wireless devices includes at least two wireless devices with an angular separation with reference to the first wireless device that is less than the angular separation threshold associated with the first mode. The operations of 1725 may be performed according to the methods described herein. In some examples, aspects of the operations of 1725 may be performed by a candidate manager as described with reference to FIGS. 8 through 11.

At 1730, the first wireless device may report, to the network entity, a candidate list including the set of wireless devices. In some cases, the first wireless device may report, with the candidate list, a set of spatial separation metrics, one or more groups of wireless devices, or a combination thereof. The set of spatial separation metrics may indicate with which wireless devices of the set of wireless devices the first wireless device supports communication using a same communication beam. In the one or more groups of wireless devices, each group may include a set of wireless devices with which the first wireless device supports communication using a same communication beam. The operations of 1730 may be performed according to the methods described herein. In some examples, aspects of the operations of 1730 may be performed by a list reporter as described with reference to FIGS. 8 through 11.

At 1735, the first wireless device may receive, from the network entity, a subset of the set of wireless devices based on the candidate list. The operations of 1735 may be performed according to the methods described herein. In some examples, aspects of the operations of 1735 may be performed by a subset module as described with reference to FIGS. 8 through 11.

At 1740, the first wireless device may communicate with the subset of the set of wireless devices using one or more communication beams, where the communicating includes communicating with the at least two wireless devices using a single communication beam of the one or more communication beams based on the angular separation being less than the angular separation threshold. Communicating with at least two wireless devices using a single communication beam may involve FDMing communications with the at least two wireless devices. The operations of 1740 may be performed according to the methods described herein. In some examples, aspects of the operations of 1740 may be performed by a communications component as described with reference to FIGS. 8 through 11.

Figure 18:
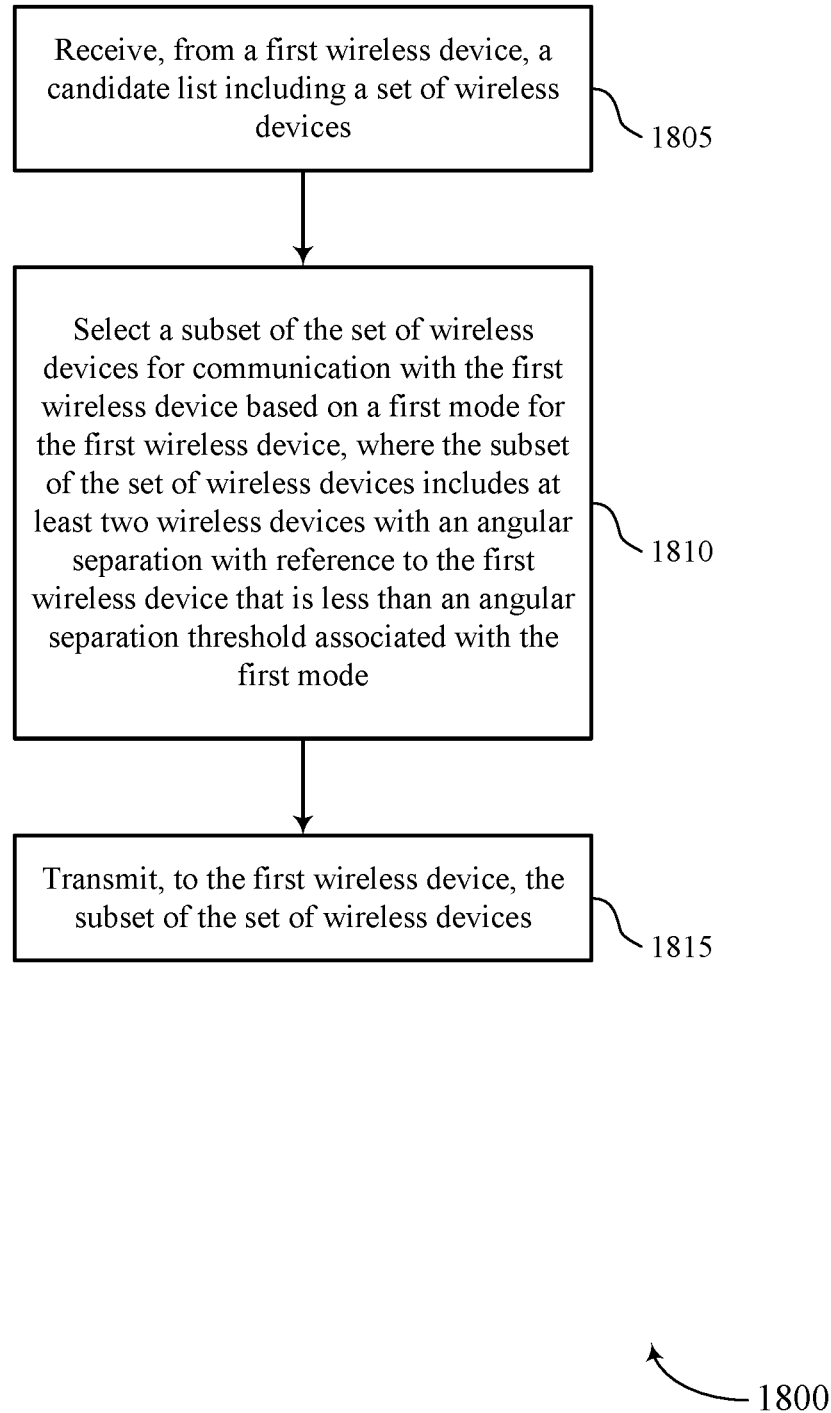

FIG. 18 shows a flowchart illustrating a method 1800 that supports beam direction selection for high pathloss mode operations in accordance with one or more aspects of the present disclosure. The operations of method 1800 may be implemented by a network entity (e.g., a CU) or its components as described herein. For example, the operations of method 1800 may be performed by a communications manager as described with reference to FIGS. 12 through 15. In some examples, a network entity may execute a set of instructions to control the functional elements of the network entity to perform the functions described below. Additionally or alternatively, a network entity may perform aspects of the functions described below using special-purpose hardware.

At 1805, the network entity may receive, from a first wireless device, a candidate list including a set of wireless devices. The operations of 1805 may be performed according to the methods described herein. In some examples, aspects of the operations of 1805 may be performed by a candidate module as described with reference to FIGS. 12 through 15.

At 1810, the network entity may select a subset of the set of wireless devices for communication with the first wireless device based on a first mode for the first wireless device, where the subset of the set of wireless devices includes at least two wireless devices with an angular separation with reference to the first wireless device that is less than an angular separation threshold associated with the first mode. The operations of 1810 may be performed according to the methods described herein. In some examples, aspects of the operations of 1810 may be performed by a subset manager as described with reference to FIGS. 12 through 15.

At 1815, the network entity may transmit, to the first wireless device, the subset of the set of wireless devices. The operations of 1815 may be performed according to the methods described herein. In some examples, aspects of the operations of 1815 may be performed by a communications module as described with reference to FIGS. 12 through 15.

Figure 19:
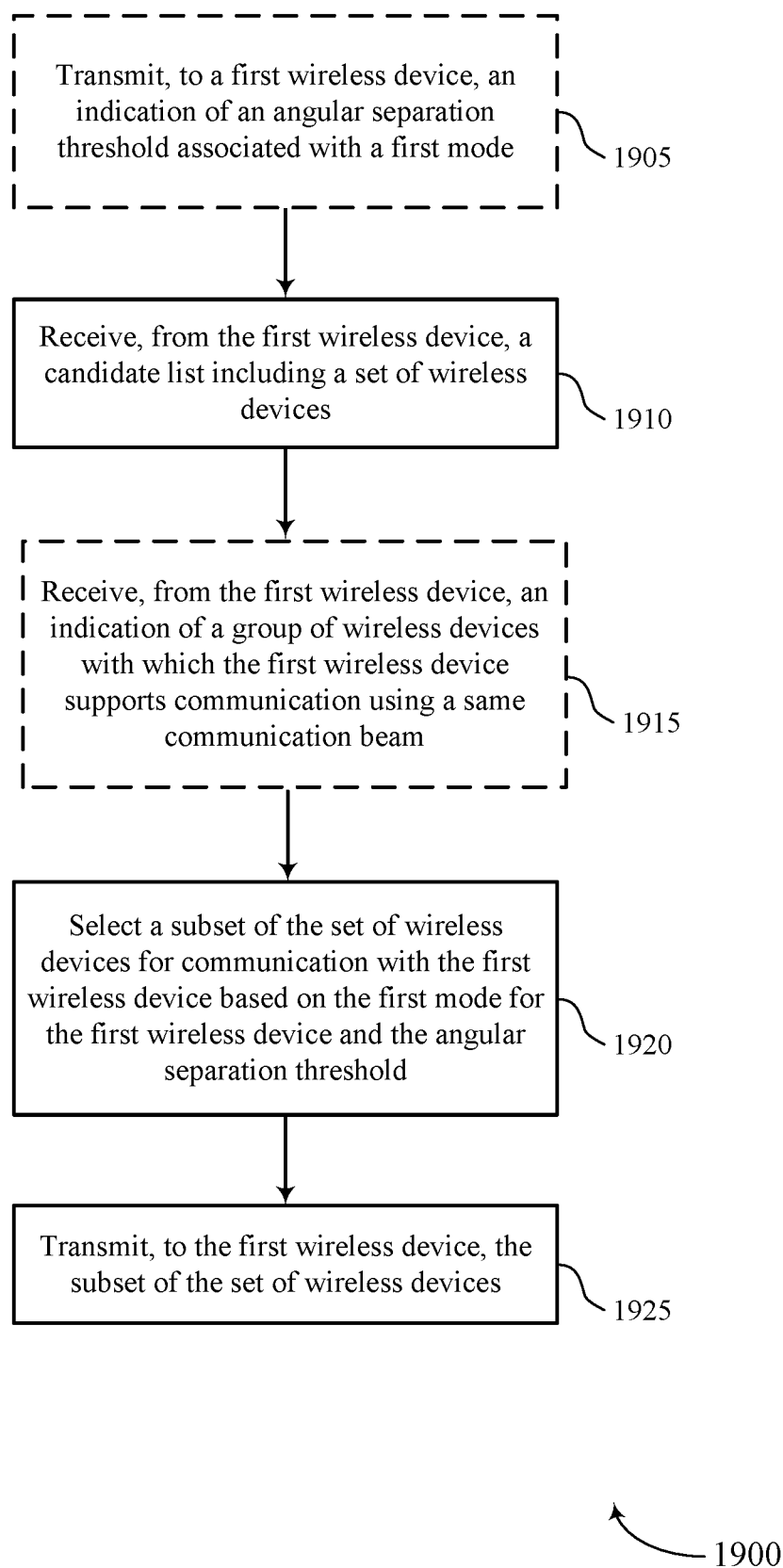

FIG. 19 shows a flowchart illustrating a method 1900 that supports beam direction selection for high pathloss mode operations in accordance with one or more aspects of the present disclosure. The operations of method 1900 may be implemented by a network entity (e.g., a CU) or its components as described herein. For example, the operations of method 1900 may be performed by a communications manager as described with reference to FIGS. 12 through 15. In some examples, a network entity may execute a set of instructions to control the functional elements of the network entity to perform the functions described below. Additionally or alternatively, a network entity may perform aspects of the functions described below using special-purpose hardware.

At 1905, the network entity may transmit, to a first wireless device, an indication of an angular separation threshold associated with a first mode. The operations of 1905 may be performed according to the methods described herein. In some examples, aspects of the operations of 1905 may be performed by an indication module as described with reference to FIGS. 12 through 15.

At 1910, the network entity may receive, from the first wireless device, a candidate list including a set of wireless devices. The operations of 1910 may be performed according to the methods described herein. In some examples, aspects of the operations of 1910 may be performed by a candidate module as described with reference to FIGS. 12 through 15.

At 1915, the network entity may receive, from the first wireless device, an indication of a group of wireless devices of the set of wireless devices with which the first wireless device supports communication using a same communication beam. In some cases, the network entity may receive a set of spatial separation metrics indicating with which wireless devices of the set of wireless devices the first wireless device supports communication using a same communication beam. In other cases, the network entity may receive one or more groups of wireless devices of the set of wireless devices, where each group of the one or more groups of wireless devices includes a set of wireless devices with which the first wireless device supports communication using a same communication beam. The operations of 1915 may be performed according to the methods described herein. In some examples, aspects of the operations of 1915 may be performed by a candidate module as described with reference to FIGS. 12 through 15.

At 1920, the network entity may select a subset of the set of wireless devices for communication with the first wireless device based on the first mode for the first wireless device, where the subset of the set of wireless devices includes at least two wireless devices with an angular separation with reference to the first wireless device that is less than the angular separation threshold associated with first mode. In some examples, the selecting may further be based on the set of spatial separation metrics, the one or more groups of wireless devices, or a combination thereof. The operations of 1920 may be performed according to the methods described herein. In some examples, aspects of the operations of 1920 may be performed by a subset manager as described with reference to FIGS. 12 through 15.

At 1925, the network entity may transmit, to the first wireless device, the subset of the set of wireless devices. The operations of 1925 may be performed according to the methods described herein. In some examples, aspects of the operations of 1925 may be performed by a communications module as described with reference to FIGS. 12 through 15.

Described below are a number of examples of methods, systems or apparatuses including means for implementing methods or realizing apparatuses, non-transitory computer-readable medium storing instructions executable by one or more processors to cause the one or more processors to implement methods, and systems including one or more processors and memory coupled with the one or more processors storing instructions executable by the one or more processors to cause the system or apparatus to implement methods. It is to be understood that these are just some examples of possible examples, and other examples will be readily apparent to those skilled in the art without departing from the scope of the disclosure.

Example 1: A method for wireless communications at a first wireless device, comprising: selecting a set of wireless devices as communication candidates based at least in part on a first mode for the first wireless device, wherein the set of wireless devices comprises at least two wireless devices with an angular separation with reference to the first wireless device that is less than an angular separation threshold associated with the first mode; reporting, to a network entity, a candidate list comprising the set of wireless devices; receiving, from the network entity, a subset of the set of wireless devices based at least in part on the candidate list; and communicating with the subset of the set of wireless devices using one or more communication beams, wherein the communicating comprises communicating with the at least two wireless devices using a single communication beam of the one or more communication beams based at least in part on the angular separation being less than the angular separation threshold.

Example 2: The method of example 1, further comprising: receiving, from the network entity, an indication of the angular separation threshold associated with the first mode.

Example 3: The method of examples 1 or 2, further comprising: discovering a plurality of wireless devices; measuring an angle of arrival or angle of departure or both for communications with each wireless device of the plurality of wireless devices; and determining angular separations for one or more pairs of wireless devices of the plurality of wireless devices based at least in part on the measured angle of arrival or angle of departure or both, wherein the selecting is based at least in part on the determined angular separations and the set of wireless devices is a subset of the plurality of wireless devices.

Example 4: The method of any of examples 1 through 3, wherein the selecting further comprises: selecting the set of wireless devices as communication candidates based at least in part on received power measurements for the set of wireless devices.

Example 5: The method of examples 1 through 4, wherein the reporting the candidate list further comprises: reporting, to the network entity, a set of spatial separation metrics indicating with which wireless devices of the set of wireless devices the first wireless device supports communication using a same communication beam.

Example 6: The method of examples 1 through 5, wherein the reporting the candidate list further comprises: reporting, to the network entity, one or more groups of wireless devices of the set of wireless devices, wherein each group of the one or more groups of wireless devices comprises a plurality of wireless devices with which the first wireless device supports communication using a same communication beam.

Example 7: The method of any of examples 1 through 6, wherein the communicating with the at least two wireless devices using the single communication beam comprises: frequency division multiplexing communications with the at least two wireless devices.

Example 8: The method of any of examples 1 through 7, further comprising: activating the first mode for the first wireless device based at least in part on a measurement, the first mode comprising a high pathloss mode.

Example 9: The method of any of examples 1 through 8, further comprising: deactivating the first mode for the first wireless device based at least in part on a measurement; selecting an updated set of wireless devices as communication candidates based at least in part on the deactivated first mode, wherein each wireless device of the updated set of wireless devices has an angular separation with each other wireless device of the updated set of wireless devices with reference to the first wireless device that is greater than an angular separation threshold associated with the deactivated first mode; and reporting, to the network entity, an updated candidate list comprising the updated set of wireless devices.

Example 10: The method of any of examples 1 through 9, wherein the angular separation threshold associated with the activated first mode is equal to the angular separation threshold associated with the deactivated first mode.

Example 11: The method of any of examples 1 through 10, wherein each communication beam of the one or more communication beams corresponds to a different radio frequency chain of the first wireless device.

Example 12: The method of any of examples 1 through 11, further comprising: determining a number of communication beams for the communicating with the subset of the set of wireless devices based at least in part on a number of radio frequency chains at the first wireless device.

Example 13: The method of any of examples 1 through 12, wherein the selecting further comprises: selecting the set of wireless devices as communication candidates based at least in part on a maximum number of communication candidates to report.

Example 14: The method of any of examples 1 through 13, further comprising: receiving, from the network entity, an indication of the maximum number of communication candidates to report.

Example 15: The method of any of examples 1 through 14, further comprising: determining the angular separation threshold associated with the first mode based at least in part on a beam characteristic of the one or more communication beams.

Example 16: The method of any of examples 1 through 15, wherein: the first wireless device or the set of wireless devices or both comprise distributed units or mobile terminals or both in an integrated access and backhaul system; and the network entity comprises a centralized unit in the integrated access and backhaul system.

Example 17: An apparatus comprising at least one means for performing a method of any of examples 1 to 16.

Example 18: An apparatus for wireless communications comprising: a processor; memory coupled with the processor; the processor and memory configured to perform a method of any of examples 1 to 16.

Example 19: A non-transitory computer-readable medium storing code for wireless communications, the code comprising instructions executable by a processor to perform a method of any of examples 1 to 16.

Example 20: A method for wireless communications at a network entity, comprising: receiving, from a first wireless device, a candidate list comprising a set of wireless devices; selecting a subset of the set of wireless devices for communication with the first wireless device based at least in part on a first mode for the first wireless device, wherein the subset of the set of wireless devices comprises at least two wireless devices with an angular separation with reference to the first wireless device that is less than an angular separation threshold associated with the first mode; and transmitting, to the first wireless device, the subset of the set of wireless devices.

Example 21: The method of example 20, further comprising: transmitting, to the first wireless device, an indication of the angular separation threshold associated with the first mode, wherein the first mode comprises an activated high pathloss mode.

Example 22: The method of examples 20 or 21, wherein the resource reservation reserves an uplink resource on a physical uplink shared channel, the method further comprising: transmitting, to the second wireless device, a data message in the reserved uplink resource on the physical uplink shared channel.

Example 23: The method of any of examples 20 through 22, wherein the receiving the candidate list further comprises: receiving, from the first wireless device, a set of spatial separation metrics indicating with which wireless devices of the set of wireless devices the first wireless device supports communication using a same communication beam, wherein the selecting is further based at least in part on the set of spatial separation metrics.

Example 24: The method of any of examples 20 through 23, wherein the receiving the candidate list further comprises: receiving, from the first wireless device, one or more groups of wireless devices of the set of wireless devices, wherein each group of the one or more groups of wireless devices comprises a plurality of wireless devices with which the first wireless device supports communication using a same communication beam, and wherein the selecting is further based at least in part on the one or more groups of wireless devices.

Example 25: The method of any of examples 20 through 24, wherein the receiving the candidate list further comprises: receiving, from the first wireless device, a set of received power measurements for the set of wireless devices, wherein the selecting is further based at least in part on the set of received power measurements.

Example 26: The method of any of examples 20 through 25, wherein the selecting comprises: selecting the subset of the set of wireless devices such that a number of communication beams for the first wireless device to communicate with the subset of the set of wireless devices is less than or equal to a maximum number of supported communication beams for the first wireless device.

Example 27: The method of any of examples 20 through 26, wherein the maximum number of supported communication beams for the first wireless device corresponds to a number of radio frequency chains at the first wireless device.

Example 28: The method of any of examples 20 through 27, wherein a number of wireless devices in the subset of the set of wireless devices is greater than the maximum number of supported communication beams for the first wireless device.

Example 29: The method of any of examples 20 through 28, further comprising: receiving, from the first wireless device, an updated candidate list comprising an updated set of wireless devices based at least in part on a second mode for the first wireless device, wherein the second mode comprises a deactivated high pathloss mode; selecting an updated subset of the updated set of wireless devices for communication with the first wireless device based at least in part on the second mode for the first wireless device, wherein each wireless device of the updated subset of the updated set of wireless devices has an angular separation with each other wireless device of the updated subset of the updated set of wireless devices with reference to the first wireless device that is greater than an angular separation threshold associated with the second mode; and transmitting, to the first wireless device, the updated subset of the updated set of wireless devices Example 30: The method of any of examples 20 through 29, wherein the angular separation threshold associated with the first mode is equal to the angular separation threshold associated with the second mode.

Example 31: The method of any of examples 20 through 30, further comprising: transmitting, to the first wireless device, an indication of a maximum number of communication candidates to report, wherein the candidate list is based at least in part on the maximum number of communication candidates to report.

Example 32: The method of any of examples 20 through 31, wherein: the first wireless device or the set of wireless devices or both comprise distributed units or mobile terminals or both in an integrated access and backhaul system; and the network entity comprises a centralized unit in the integrated access and backhaul system.

Example 33: An apparatus comprising at least one means for performing a method of any of examples 20 to 32.

Example 34: An apparatus for wireless communications comprising: a processor; memory coupled with the processor; the processor and memory configured to perform a method of any of examples 20 to 32.

Example 35: A non-transitory computer-readable medium storing code for wireless communications, the code comprising instructions executable by a processor to perform a method of any of examples 20 to 32.

It should be noted that the methods described herein describe possible implementations, and that the operations may be rearranged or otherwise modified and that other implementations are possible. Further, aspects from two or more of the methods may be combined.

Techniques described herein may be used for various wireless communications systems such as CDMA, TDMA, FDMA, OFDMA, single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers. A gNB for a macro cell may be referred to as a macro gNB. A gNB for a small cell may be referred to as a small cell gNB, a pico gNB, a femto gNB, or a home gNB. A gNB may support one or multiple (e.g., two, three, four, and the like) cells (e.g., component carriers). A UE may be able to communicate with various types of base stations and network equipment including macro eNBs, small cell eNBs, relay base stations, and the like.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary process that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. An apparatus for wireless communications at a first wireless device, comprising:
   one or more memories; and
   one or more processors coupled to the one or more memories and configured to cause the first wireless device to:
      send a candidate list of communication candidates based at least in part on a pathloss mode for the first wireless device, wherein the communication candidates comprise at least two wireless devices selected based at least in part on an angular separation with reference to the first wireless device that supports communication via a common communication beam;

receive an indication to communicate with a subset of wireless devices included in the candidate list based at least in part on the candidate list; and communicate with the subset of wireless devices via the common communication beam based at least in part on the receipt of the indication to communicate with the subset of wireless devices.

2. The apparatus of claim 1, wherein the pathloss mode comprises a high pathloss mode, and wherein the communication candidates are selected based at least in part on the pathloss mode that is the high pathloss mode.

3. The apparatus of claim 2, wherein the angular separation is less than a threshold angular separation associated with the high pathloss mode, and wherein the one or more processors are further configured to cause the first wireless device to:

receive an indication of the threshold angular separation associated with the high pathloss mode.

4. The apparatus of claim 1, wherein the one or more processors are further configured to cause the first wireless device to:

measure an angle of arrival, an angle of departure, or both, for communications with each wireless device of the at least two wireless devices; and determine the angular separation for the at least two wireless devices based at least in part on the angle of arrival, or the angle of departure, or both.

5. The apparatus of claim 1, wherein the one or more processors are is further configured to cause the first wireless device to:

receive power measurements for the communication candidates, wherein the communication candidates are selected based at least in part on the power measurements for the communication candidates.

6. The apparatus of claim 1, wherein the one or more processors are is further configured to cause the first wireless device to:

report a set of spatial separation metrics that indicates which wireless devices of the communication candidates support communication with the first wireless device via a same communication beam.

7. The apparatus of claim 1, wherein the one or more processors are further configured to cause the first wireless device to:

report an indication of one or more groups of wireless devices of the communication candidates, wherein each group of the one or more groups of wireless devices comprises a plurality of wireless devices that supports communication with the first wireless device via a same communication beam.

8. The apparatus of claim 1, wherein the pathloss mode comprises a high pathloss mode, and wherein the one or more processors are further configured to cause the first wireless device to:

select, based at least in part on a deactivation of the high pathloss mode, an updated set of wireless devices as communication candidates based at least in part on each wireless device of the updated set of wireless devices having an angular separation with each other wireless device of the updated set of wireless devices with reference to the first wireless device that is greater than a threshold angular separation associated with the high pathloss mode; and send an indication of an updated candidate list that comprises the updated set of wireless devices.

9. The apparatus of claim 1, wherein the one or more processors are further configured to cause the first wireless device to:

receive an indication of a maximum quantity of communication candidates to report; and select the communication candidates based at least in part on the maximum quantity of communication candidates to report.

10. The apparatus of claim 1, further comprising:

an antenna configured to send the candidate list.

11. An apparatus for wireless communications at a network entity, comprising:

one or more memories; and one or more processors coupled to the one or more memories and configured to cause the network entity to:

receive a candidate list of communication candidates for a first wireless device, wherein the communication candidates comprise a set of wireless devices; and send an indication of a subset of the set of wireless devices for communication with the first wireless device, wherein the subset is selected based at least in part on a pathloss mode for the first wireless device and based at least in part on the subset of the set of wireless devices having an angular separation with reference to the first wireless device that supports communication with the first wireless device via a common communication beam.

12. The apparatus of claim 11, wherein the pathloss mode comprises a high pathloss mode and the subset of the set of wireless devices is selected based at least in part on that the pathloss mode is the high pathloss mode, and wherein the one or more processors are further configured to cause the network entity to:

send an indication of a threshold angular separation associated with the high pathloss mode, wherein the angular separation is less than the threshold angular separation associated with the high pathloss mode.

13. The apparatus of claim 11, wherein the one or more processors are further configured to cause the network entity to:

receive a set of spatial separation metrics that indicates which wireless devices of the set of wireless devices support communication with the first wireless device via a same communication beam, wherein the subset of the set of wireless devices is further based at least in part on the set of spatial separation metrics.

14. The apparatus of claim 11, wherein the one or more processors are further configured to cause the network entity to:

receive an indication of one or more groups of wireless devices of the set of wireless devices, wherein each group of the one or more groups of wireless devices comprises a plurality of wireless devices that supports communication with the first wireless device via a same communication beam, and wherein the subset of the set of wireless devices is selected based at least in part on the one or more groups of wireless devices.

15. The apparatus of claim 11, wherein the one or more processors are further configured to cause the network entity to:

receive a set of power measurements for the set of wireless devices, wherein the subset of the set of wireless devices is selected based at least in part on the set of power measurements.

16. The apparatus of claim 11, wherein the one or more processors are further configured to cause the network entity to:
select the subset of the set of wireless devices such that a quantity of communication beams for the first wireless device to communicate with the subset of the set of wireless devices is less than or equal to a maximum quantity of supported communication beams for the first wireless device.

17. The apparatus of claim 11, wherein the one or more processors are further configured to cause the network entity to:
send an indication of a maximum quantity of communication candidates to report, wherein the candidate list is based at least in part on the maximum quantity of communication candidates to report.

18. The apparatus of claim 11, further comprising:
an antenna configured to receive the candidate list.

19. An apparatus for wireless communications at a first wireless device, comprising:
one or more memories; and
one or more processors coupled to the one or more memories and configured to cause the first wireless device to:
receive a list of one or more criteria to select communication candidates for a pathloss mode for the first wireless device;
send an indication of a set of wireless devices selected as communication candidates and angular separation information for the set of wireless devices, the set of wireless devices selected as communication candidates based at least in part on the list of one or more criteria; and
communicate with a subset of the set of wireless devices based at least in part on an indication of the subset received in response to the indication of the set of wireless devices and the angular separation information.

20. The apparatus of claim 19, wherein the angular separation information for a wireless device of the set of wireless devices indicates an angular separation of the wireless device with reference to the first wireless device.

21. The apparatus of claim 19, wherein the one or more processors are further configured to cause the first wireless device to:
perform measurements for the set of wireless devices based at least in part on the list of one or more criteria, wherein the set of wireless devices, the angular separation information, or both, is selected based at least in part on the measurements.

22. The apparatus of claim 19, wherein the list of one or more criteria indicates a threshold angular separation, and wherein the one or more processors are further configured to cause the first wireless device to:
determine that a group of wireless devices has an angular separation with reference to the first wireless device that is below the threshold angular separation, wherein the group of wireless devices is in the set of wireless devices based at least in part on the angular separation that is below the threshold angular separation.

23. The apparatus of claim 19, wherein the list of one or more criteria indicates a quantity of wireless devices in the set of wireless devices, and wherein the one or more processors are further configured to cause the first wireless device to:
select the set of wireless devices based at least in part on the quantity indicated by the list of one or more criteria.

24. The apparatus of claim 19, further comprising:
an antenna configured to receive the list of one or more criteria.

25. An apparatus for wireless communications at a network entity, comprising:
one or more memories; and
one or more processors coupled to the one or more memories and configured to cause the network entity to:
send a list of one or more criteria to select communication candidates for a first wireless device, the list of one or more criteria based at least in part on a pathloss mode of the first wireless device;
receive, based at least in part on the list of one or more criteria, an indication of a set of wireless devices selected as communication candidates for the first wireless device and angular separation information for the set of wireless devices; and
send an indication of a subset of the set of wireless devices selected based at least in part on the pathloss mode for the first wireless device and the angular separation information for the set of wireless devices.

26. The apparatus of claim 25, wherein the angular separation information for a wireless device of the set of wireless devices indicates an angular separation of the wireless device with reference to the first wireless device.

27. The apparatus of claim 25, wherein the one or more processors are further configured to cause the network entity to:
determine, based at least in part on the angular separation information, that the subset of the set of wireless devices has an angular separation less than a threshold angular separation associated with the pathloss mode, wherein the subset of the set of wireless devices is selected based at least in part on the determination.

28. The apparatus of claim 25, wherein the one or more processors are further configured to cause the network entity to:
determine, based at least in part on the angular separation information and the pathloss mode, that the subset of the set of wireless devices has an angular separation with reference to the first wireless device that supports communication via a common communication beam, wherein the subset of the set of wireless devices is selected based at least in part on the determination.

29. The apparatus of claim 25, wherein the one or more processors are further configured to cause the network entity to:
receive beamwidth information for the set of wireless devices, wherein the subset of the set of wireless devices is selected based at least in part on the beamwidth information.

30. The apparatus of claim 25, further comprising:
an antenna configured to send the list of one or more criteria.

31. A method for wireless communication at a first wireless device, comprising:
sending a candidate list of communication candidates based at least in part on a pathloss mode for the first wireless device, the communication candidates comprising at least two wireless devices selected based at least in part on having an angular separation with reference to the first wireless device that supports communication via a common communication beam;

receiving an indication to communicate with a subset of wireless devices included in the candidate list based at least in part on sending the candidate list; and communicating with the subset of wireless devices via the common communication beam based at least in part on receiving the indication to communicate with the subset of wireless devices.

32. The method of claim 31, wherein the pathloss mode comprises a high pathloss mode, and wherein the communication candidates are selected based at least in part on the pathloss mode being the high pathloss mode.

33. The method of claim 31, wherein the angular separation is less than a threshold angular separation associated with the high pathloss mode, and wherein the method further comprises:

receiving an indication of the threshold angular separation associated with the high pathloss mode.

34. The method of claim 31, further comprising:

measuring an angle of arrival, an angle of departure, or both, for communications with each wireless device of the at least two wireless devices; and determining the angular separation for the at least two wireless devices based at least in part on the angle of arrival, or the angle of departure, or both.

35. The method of claim 31, further comprising:

receiving power measurements for the communication candidates, wherein the communication candidates are selected based at least in part on the power measurements for the communication candidates.

36. The method of claim 31, further comprising:

reporting a set of spatial separation metrics indicating which wireless devices of the communication candidates support communication with the first wireless device via a same communication beam.

37. The method of claim 31, further comprising:

reporting an indication of one or more groups of wireless devices of the communication candidates, wherein each group of the one or more groups of wireless devices comprises a plurality of wireless devices that supports communication with the first wireless device via a same communication beam.

38. The method of claim 31, wherein the pathloss mode comprises a high pathloss mode, and the method further comprising:

selecting, based at least in part on deactivating the high pathloss mode, an updated set of wireless devices as communication candidates based at least in part on each wireless device of the updated set of wireless devices having an angular separation with each other wireless device of the updated set of wireless devices with reference to the first wireless device that is greater than a threshold angular separation associated with the high pathloss mode; and sending an indication of an updated candidate list comprising the updated set of wireless devices.

39. The method of claim 31, further comprising:

receiving an indication of a maximum quantity of communication candidates to report; and selecting the communication candidates based at least in part on the maximum quantity of communication candidates to report.

40. A method for wireless communications at a network entity, comprising:

receiving a candidate list of communication candidates for a first wireless device, the communication candidates comprising a set of wireless devices; and sending an indication of a subset of the set of wireless devices for communication with the first wireless device, the subset selected based at least in part on a pathloss mode for the first wireless device and based at least in part on the subset of the set of wireless devices having an angular separation with reference to the first wireless device that supports communication with the first wireless device via a common communication beam.

41. The method of claim 40, wherein the pathloss mode comprises a high pathloss mode and the subset of the set of wireless devices is selected based at least in part on the pathloss mode being the high pathloss mode, and the method further comprising:

sending an indication of a threshold angular separation associated with the high pathloss mode, wherein the angular separation is less than the threshold angular separation associated with the high pathloss mode.

42. The method of claim 40, further comprising:

receiving a set of spatial separation metrics indicating which wireless devices of the set of wireless devices support communication with the first wireless device via a same communication beam, wherein the subset of the set of wireless devices is further based at least in part on the set of spatial separation metrics.

43. The method of claim 40, further comprising:

receiving an indication of one or more groups of wireless devices of the set of wireless devices, wherein each group of the one or more groups of wireless devices comprises a plurality of wireless devices that supports communication with the first wireless device via a same communication beam, and wherein the subset of the set of wireless devices is selected based at least in part on the one or more groups of wireless devices.

44. The method of claim 40, the method further comprising:

receiving a set of power measurements for the set of wireless devices wherein the subset of the set of wireless devices is selected based at least in part on the set of power measurements.

45. The method of claim 40, further comprising:

selecting the subset of the set of wireless devices such that a quantity of communication beams for the first wireless device to communicate with the subset of the set of wireless devices is less than or equal to a maximum quantity of supported communication beams for the first wireless device.

46. The method of claim 40, further comprising:

sending an indication of a maximum quantity of communication candidates to report, wherein the candidate list is based at least in part on the maximum quantity of communication candidates to report.

47. A method for wireless communications at a first wireless device, comprising:

receiving a list of one or more criteria for selecting communication candidates for a pathloss mode for the first wireless device;

sending an indication of a set of wireless devices selected as communication candidates and angular separation information for the set of wireless devices, the set of wireless devices selected as communication candidates based at least in part on the list of one or more criteria; and communicating with a subset of the set of wireless devices based at least in part on an indication of the subset received in response to sending the indication of the set of wireless devices and the angular separation information.

48. The method of claim 47, wherein the angular separation information for a wireless device of the set of wireless devices indicates an angular separation of the wireless device with reference to the first wireless device.

49. The method of claim 47, further comprising:
performing measurements for the set of wireless devices based at least in part on the list of one or more criteria, wherein the set of wireless devices, the angular separation information, or both, is selected based at least in part on the measurements.

50. The method of claim 47, wherein the list of one or more criteria indicates a threshold angular separation, and the method further comprising:
determining that a group of wireless devices has an angular separation with reference to the first wireless device that is below the threshold angular separation, wherein the group of wireless devices is included in the set of wireless devices based at least in part on the angular separation being below the threshold angular separation.

51. The method of claim 47, wherein the list of one or more criteria indicates a quantity of wireless devices to include in the set of wireless devices, and the method further comprising:
selecting the set of wireless devices based at least in part on the quantity indicated by the list of one or more criteria.

52. A method for wireless communications at a network entity, comprising:
sending a list of one or more criteria for selecting communication candidates for a first wireless device, the list of one or more criteria based at least in part on a pathloss mode of the first wireless device;
receiving, based at least in part on sending the list of one or more criteria, an indication of a set of wireless devices selected as communication candidates for the first wireless device and angular separation information for the set of wireless devices; and
sending an indication of a subset of the set of wireless devices selected based at least in part on the pathloss mode for the first wireless device and the angular separation information for the set of wireless devices.

53. The method of claim 52, wherein the angular separation information for a wireless device of the set of wireless devices indicates an angular separation of the wireless device with reference to the first wireless device.

54. The method of claim 52, further comprising:
determining, based at least in part on the angular separation information, that the subset of the set of wireless devices has an angular separation less than a threshold angular separation associated with the pathloss mode, wherein the subset of the set of wireless devices is selected based at least in part on the determination.

55. The method of claim 52, further comprising:
determining, based at least in part on the angular separation information and the pathloss mode, that the subset of the set of wireless devices has an angular separation with reference to the first wireless device that supports communication via a common communication beam, wherein the subset of the set of wireless devices is selected based at least in part on the determination.

56. The method of claim 52, further comprising:
receiving beamwidth information for the set of wireless devices, wherein the subset of the set of wireless devices is selected based at least in part on the beamwidth information.

57. A non-transitory computer-readable medium storing code for wireless communications at a first wireless device, the code comprising instructions executable by one or more processors to cause the first wireless device to:
send a candidate list of communication candidates based at least in part on a pathloss mode for the first wireless device, the communication candidates comprising at least two wireless devices selected based at least in part on having an angular separation with reference to the first wireless device that supports communication via a common communication beam;
receive an indication to communicate with a subset of wireless devices included in the candidate list based at least in part on sending the candidate list; and
communicate with the subset of wireless devices via the common communication beam based at least in part on receiving the indication to communicate with the subset of wireless devices.

58. A non-transitory computer-readable medium storing code for wireless communications at a network entity, the code comprising instructions executable by one or more processors to cause the network entity to:
receive a candidate list of communication candidates for a first wireless device, the communication candidates comprising a set of wireless devices; and
send an indication of a subset of the set of wireless devices for communication with the first wireless device, the subset selected based at least in part on a pathloss mode for the first wireless device and based at least in part on the subset of the set of wireless devices having an angular separation with reference to the first wireless device that supports communication with the first wireless device via a common communication beam.

59. A non-transitory computer-readable medium storing code for wireless communications at a first wireless device, the code comprising instructions executable by one or more processors to cause the first wireless device to:
receive a list of one or more criteria for selecting communication candidates for a pathloss mode for the first wireless device;
send an indication of a set of wireless devices selected as communication candidates and angular separation information for the set of wireless devices, the set of wireless devices selected as communication candidates based at least in part on the list of one or more criteria; and
communicate with a subset of the set of wireless devices based at least in part on an indication of the subset received in response to transmitting the indication of the set of wireless devices and the angular separation information.

60. A non-transitory computer-readable medium storing code for wireless communications at a network entity, the code comprising instructions executable by one or more processors to cause the network entity to:
send a list of one or more criteria for selecting communication candidates for a first wireless device, the list of one or more criteria based at least in part on a pathloss mode of the first wireless device;
receive, based at least in part on sending the list of one or more criteria, an indication of a set of wireless devices selected as communication candidates for the first wireless device and angular separation information for the set of wireless devices; and send an indication of a subset of the set of wireless devices selected based at least in part on the pathloss mode for the first wireless device and the angular separation information for the set of wireless devices.

\* \* \* \* \*